US011216895B1

(12) United States Patent
Schwartz et al.

(10) Patent No.: US 11,216,895 B1
(45) Date of Patent: Jan. 4, 2022

(54) SECURITIES CLAIMS IDENTIFICATION, OPTIMIZATION AND RECOVERY SYSTEM AND METHODS

(71) Applicant: Dividex Analytics, LLC, Wilmington, DE (US)

(72) Inventors: Irwin Schwartz, Dover, MA (US); David Pineau, Wellesley, MA (US); Anand Mahurkar, Waltham, MA (US)

(73) Assignee: Dividex Analytics, LLC, Westwood, MA (US)

( * ) Notice: Subject to any disclaimer, the term of this patent is extended or adjusted under 35 U.S.C. 154(b) by 672 days.

(21) Appl. No.: 15/940,413

(22) Filed: Mar. 29, 2018

Related U.S. Application Data

(60) Provisional application No. 62/478,832, filed on Mar. 30, 2017, provisional application No. 62/580,670, filed on Nov. 2, 2017.

(51) Int. Cl.
*G06Q 50/18* (2012.01)
*G06F 16/248* (2019.01)
*G06Q 40/04* (2012.01)
*G06Q 50/00* (2012.01)

(52) U.S. Cl.
CPC ........... *G06Q 50/18* (2013.01); *G06F 16/248* (2019.01); *G06Q 40/04* (2013.01); *G06Q 50/01* (2013.01)

(58) Field of Classification Search
CPC ........ G06Q 50/18; G06Q 40/04; G06Q 50/01; G06F 16/248
See application file for complete search history.

(56) References Cited

U.S. PATENT DOCUMENTS

| 7,593,882 | B2 * | 9/2009 | Hamer | G06Q 10/10 |
| | | | | 705/35 |
| 2006/0080227 | A1 * | 4/2006 | Boglaev | G06Q 40/04 |
| | | | | 705/37 |
| 2007/0078676 | A1 * | 4/2007 | Hamer | G06Q 40/06 |
| | | | | 705/311 |
| 2007/0214095 | A1 * | 9/2007 | Adams | G06Q 50/188 |
| | | | | 705/80 |

(Continued)

OTHER PUBLICATIONS

Benjamin P. Edwards, "Disaggregated Classes," Virginia Law and Business Review 9, No. 3 (Spring 2015): 305-368 (Year: 2015).*

*Primary Examiner* — Carrie S Gilkey
(74) *Attorney, Agent, or Firm* — GTC Law Group PC & Affiliates

(57) ABSTRACT

Systems and methods for securities claims identification, optimization and recovery are disclosed herein. The disclosed system may maximize returns on security claims assets arising from alleged fraud in the purchase or sale of securities in a securities portfolio. In one embodiment, the disclosed system monitors data, including unstructured data, relating to a plurality of entities' securities, and creates an aggregated data set to which machine learning may be applied to identify characteristics indicative of an event of interest, such as fraud. The systems and methods of the present invention may be used to monitor an investor portfolio using analytic tools to identify asynchronous activity or movements in portfolio securities associated with the event of interest, and perform loss and damages valuation analysis, and assist with identifying securities claims and optimize recovery of revenue associated with the securities claims.

8 Claims, 37 Drawing Sheets

(56) References Cited

U.S. PATENT DOCUMENTS

2012/0047056 A1\* 2/2012 Hamer ................... G06Q 40/06
  705/35
2012/0322470 A1\* 12/2012 Said ..................... G06Q 10/107
  455/466

\* cited by examiner

Aggregation Analysis

Client: Company 1
Case: 1000  Company 25  Case Number: 01-AA-0001-AAA  Settlement Fund: $95,000,000
Status: SETTLED  Period Start: 4/22/2004
Claim Deadline: 12/23/2016  Period End: 8/8/2007

Acct Filing Type: AGGREGATE

| AcctId | Acct Short Name | Date Filed | Filer Status | ML | RL | AggFilingStatus | PreClaimId |
|---|---|---|---|---|---|---|---|
| 1 | Co. 1 Aggregate | 12/1/2016 | FILED | $20,743,908 | $4,128,211 | OK-Filed AGGREGATE | 100 |

AGGREGATE Method RL Subtotal: $4,128,211

Acct Filing Type: ACCOUNT

| AcctId | Acct Short Name | Date Filed | Filer Status | ML | RL | AggFilingStatus | PreClaimId |
|---|---|---|---|---|---|---|---|
| 2 | Co. 2 | | NOT FILED | $598,180 | 0 | OK-Filed AGGREGATE | 101 |
| 3 | Company 3 Int'l Mgmt | | NOT FILED | $39,622 | $25,398 | OK-Filed AGGREGATE | 102 |
| 4 | Company 4 3000 | | NOT FILED | $1,655,968 | $295,913 | OK-Filed AGGREGATE | 103 |

ACCOUNT Method RL Subtotal: $321,311

Aggregation Filing Analysis

Recognized Loss  Accounts Filed
Client AGGREGATE Account: $4,128,211  1
SUM of Individual Accounts: $321,311  0

Filing Method: Filed in Aggregate
Analysis Result: OK - Filed Correctly

FIG. 15

Payment & Claims Filed Audit Report

Client: Company 1
Case: 1001   Management

Status: DISBURSED
Pmt Status: PAID

Disburse Date: 1/1/1900
Pmt ProRata: 0.3122

Case Number: 03-AA-00002-AAB 1600   10

| AcctId | Acct Short Name | Filing Date | RL | Pmt # | Check # | Gross Amt | Fee Amt | Net Amt | Recd By | Recd Dt |
|---|---|---|---|---|---|---|---|---|---|---|
| 1 - Claim Filed WITH RL | | | | | | | | | | |
| 5 | Company 5 3000 | 2/9/2016 | $42,532.80 | 1 | | $13,277.43 | $0.00 | $13,277.43 | FRT | 10/27/2016 |
| 6 | Company 6 Enh-R2000 | 2/9/2016 | $12,179.90 | 1 | | $3,802.18 | $0.00 | $3,802.18 | FRT | 10/27/2016 |
| 2 - Claim Filed - NO RL | | | | | | | | | | |
| 7 | Company 7 MIDCAP-FIS | 2/9/2016 | $0.00 | | | | | | | |
| 8 | Company 8 TRANSITION | 2/9/2016 | $0.00 | | | | | | | |

FIG. 16

Payment Audit Report

Client: Company 1
Case: 1001 Management  Case Number: 07-AB-00003-AAC

Case Status: DISBURSED  Disburse Date: 1/1/1900
Pmt Status: PAID  Pmt ProRata: 0.3122

| Acct | Acct Short Name | Pmt # | Filer RL | Expected | Actual | Pmt Variance | Fee Amt | Fee % | Recd Dt | Days to Rec | Pmt Verify |
|---|---|---|---|---|---|---|---|---|---|---|---|
| 10 | Company 10 3000 | 1 | $42,532.80 | $13,278.74 | $13,277.43 | -0.01% | $0.00 | 0.00% | 10/27/2016 | | OK |
| 11 | Company 11 Enh-R2000 | 1 | $12,179.90 | $3,802.56 | $3,802.18 | -0.01% | $0.00 | 0.00% | 10/27/2016 | | OK |

SECURITIES CLAIMS IDENTIFICATION, OPTIMIZATION AND RECOVERY SYSTEM AND METHODS

CROSS-REFERENCE TO RELATED APPLICATIONS

This application claims the benefit of U.S. Provisional Patent Application No. 62/478,832, filed Mar. 30, 2017 and entitled "SECURITIES CLAIMS IDENTIFICATION, OPTIMIZATION AND RECOVERY SYSTEM AND METHODS" (DVDX-0002-P01) and U.S. Provisional Patent Application No. 62/580,670, filed Nov. 2, 2017 and entitled "SECURITIES CLAIMS IDENTIFICATION, OPTIMIZATION AND RECOVERY SYSTEM AND METHODS" (DVDX-0003-P01).

Each of the foregoing applications is incorporated herein by reference in its entirety.

FIELD

The disclosure generally relates to methods and systems for analysis and litigation monitoring, and the performance of risk mitigation analysis to identify securities claims and optimize recovery of revenue associated with securities claims.

BACKGROUND

A securities fraud is committed when a company (e.g., brokerage firm, corporation, investment bank) misrepresents information causing investors to make decisions to buy or sell securities on the basis of the misrepresented information. Information can be misrepresented when the company provides false information, withholds key information, offers bad advice, engages or allows insider trading, etc. Investors that bought or sold securities on United States markets during a "class period" and as a result of the securities fraud suffered economic injury can file a securities fraud class action lawsuit for monetary and/or non-monetary recovery. In a securities fraud class action lawsuit, one investor (e.g., a person or an entity) pursues a claim or claims in court on behalf of themselves and other similarly situated investors that together constitute the "class." The class period typically starts from the time the company first misrepresents information and ends when the truth is publicly disclosed. When the securities fraud class action lawsuit is settled or decided in plaintiffs' favor, each eligible member of the class can receive some recovery.

In many instances, many investors, investment managers, mutual funds, pension funds, etc., are not aware of potential securities fraud arising from their purchase of portfolio securities or miss the opportunity to maximize securities litigation recoveries due to conflicts and system inefficiencies. As a result, they either receive no recovery for securities fraud losses in their portfolio assets or receive substantially less recovery than possible.

SUMMARY

Provided herein are methods and systems for creating an aggregated class action litigation claims database, where the aggregated class action litigation claims database comprises litigation claims data derived from a plurality of databases, and the litigation claims data describes a plurality of investors. Using a graphical user interface dashboard, a query may be created of the aggregated class action litigation claims database for a class action claim criterion of interest, and the query may be automatically repeated according to a schedule set by a user in the graphical user interface dashboard. A query result criterion may be specified, and an alert generated upon the occurrence of the query result criterion, where the alert comprises metadata relating to a nature of the query result criterion and at least one class action litigation claim to which it relates. The alert may be transmitted over a communication channel to a remote client device associated with the user based, at least in part, upon a destination address and a transmission schedule that is associated with the remote client device, wherein the alert activates the graphical user interface dashboard to cause the alert to display on the remote client device and to enable connection with the user interface dashboard when the remote client device is activated.

In embodiments, a class action claim criterion of interest may be a claim of fraud, a measure of trade volatility, or some other claim criterion of interest.

In embodiments, a remote client device may be a phone, a laptop or some other client device type.

In embodiments, an alert may initiate an automated audit of at least one securities portfolio to determine the presence of an entity in the securities portfolio that is also associated with the at least one class action litigation claim.

In embodiments, an aggregated class action litigation claims database may include public and private securities data sources.

Provided herein are methods and systems for creating a plurality of analytic profiles of trading activity associated with a plurality of securities, where the plurality of analytic profiles comprises a probabilistic measure of the presence of fraudulent trading activity associated with each of the plurality of securities. The plurality of analytic profiles may be stored. A price fluctuation in a security may be detected and the price fluctuation of the security analyzed based at least on the stored analytic profiles of trading activity associated with a plurality of securities. A probability of fraudulent trading associated with the security of interest may be estimated based at least upon the analysis, and at least one future trading value of the security predicted.

In embodiments, the stored plurality of analytic profiles may include longitudinal trading data associated with each of the plurality of securities.

In embodiments, the longitudinal trading data may include data from the period prior to, or following, an event of interest. The event of interest may be fraudulent trading activity or some other event type. The prediction may include a recommendation regarding the appropriateness of filing a securities claim related to the security and/or regard joining an existing securities litigation associated with the security, or some other type of recommendation.

Provided herein are methods and systems for receiving unstructured data from a plurality of unstructured data sources, where at least a portion of the unstructured data relates to securities trading metadata. A unified dataset may be created based, at least in part, on the unstructured data, and analyzed using cognitive analytics to identify and label characteristics of interest. Machine learning may be used to identify a plurality of executive profiles based, at least in part, on the characteristics of interest, and the executive profiles stored, including a plurality of entity names with which executives in the executive profiles are associated. Security trading data may be stored, where at least a portion of the security trading data relates to the plurality of entity names. The executive profiles may be analyzed to predict a probability of volatility in the security trading of at least one entity associated with at least one executive profile, and an alert may be sent to a user to indicate the presence of a volatility risk associated with the security trading of the at least one entity.

In embodiments, unstructured data may include social media data, custodian data, audio recordings, financial reports, or some other type of unstructured data. Financial reports may include Securities and Exchange Commission reports.

In embodiments, the use of machine learning may be iterative and repeated at a specified time interval to update the stored executive profiles.

These and other systems, methods, objects, features, and advantages of the present disclosure will be apparent to those skilled in the art from the following detailed description of the preferred embodiment and the drawings. All documents mentioned herein are hereby incorporated in their entirety by reference.

BRIEF DESCRIPTION OF THE DRAWINGS

The disclosure and the following detailed description of certain embodiments thereof may be understood by reference to the following figures:

FIG. 15 shows an abridged sample of the CIOR aggregation analysis utilized in this audit process.

FIG. 16 illustrates a payment and filed claims report as one example output from this process.

FIG. 17 illustrates a payment and filed claims report as one example output from this process.

DETAILED DESCRIPTION

Figure 1:
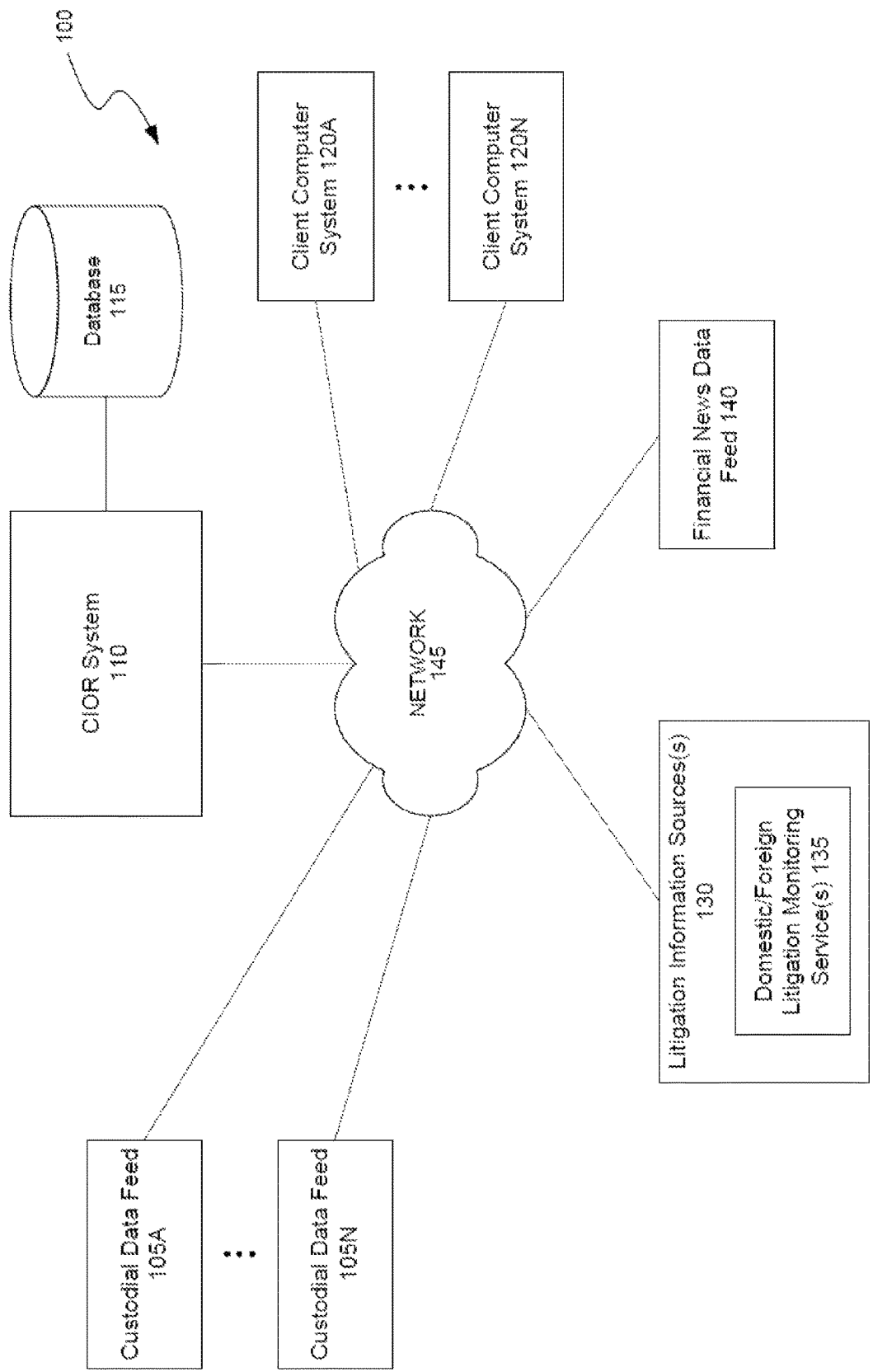
FIG. 1 illustrates a block diagram of an example environment in which a securities claims identification, optimization and recovery system can operate.

Embodiments of the securities claims identification, optimization and recovery system and methods (hereinafter the "CIOR system") disclosed herein provide a platform for optimizing or increasing portfolio value. In some embodiments, the CIOR system includes a platform for monitoring domestic and/or foreign portfolios for asynchronous activity to identify, evaluate, report, optimize and recover revenues associated with alleged securities fraud.

Investment managers have a fiduciary duty to maximize portfolio assets, which includes potential recoveries for material securities fraud losses. Securities fraud claims are typically processed by claims providers without any independent analysis or recovery maximization process, and are largely focused in the United States. Significant percentage of investors miss recoveries due to system inefficiencies, such as, investors not being aware of potentially actionable losses in portfolios, reliance on conflicted advisors which can lead to undue attention on class representative selection, insufficient data for timely analysis of key decisions, elimination of adversarial process due to settlement, large burden on judiciary, failure to optimize recoveries, focus on domestic claims only, no reconciliation from custodians, fragmented service providers, and the like.

Embodiments of the CIOR system provide a solution to the problems of the existing securities fraud claims processing by providing information and analysis, providing tools for identifying asynchronous movements in portfolio securities and reporting impact, opening communication with plaintiff's bar for analysis, providing damages valuation and reporting tools, independent conflict-free legal analysis at filing, settlement, opt out, and objection stages, unique claims filing methodology and reconciliation, hybrid compensation structure (e.g., market-rate monitoring flat fee and percentage of total assets recovered), and the like. In one embodiment, various features and functions of the CIOR system are automated. For example, the legal analysis can be automated to only identify issuers that have been sued for securities fraud or only ones that are the subject of regulatory action. Thus, the analysis and recovery maximization process disclosed herein allows investment managers to maximize their portfolio assets, and thereby execute their fiduciary duty. For example, in one implementation, claims processing using the CIOR system yielded a 375% increase in the value of the claim as compared to using existing processing methods. Across an entire portfolio, the CIOR system has yielded a 20% increase in claims recovery experienced over the previously applied method. In some embodiments, the CIOR system can track one or more metrics for assessing the efficacy of the recovery maximization process for each client. For example, the CIOR system can track the difference between recovery determined based on a baseline claims recovery model and the actual revenue achieved upon settlement and disbursement. In some embodiments, the baseline claims recovery model is based on a 5-year (or another period of time) back-audit of the investor's class action filing recovery patterns.

Various embodiments of the CIOR system will now be described. The following description provides specific details for a thorough understanding and an enabling description of these embodiments. One skilled in the art will understand, however, that the embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Under the U.S. federal law, securities class actions function as "opt-out" classes. This means that investors do not need to participate as named parties in order to recover their pro rata share of a class action recovery. Rather, the investors need only submit a valid proof of claim. Although there are private companies that provide claims filing services, generally certain securities class (e.g., U.S. public pension funds) require that their custodians submit all proof of claims on behalf of the investors. As used herein, a custodian is a financial institution that holds its customer's securities (e.g., assets in a pension plan) for safekeeping and can additionally offer other services such as account administration, transaction settlements, collection of dividends, etc. Generally, major custodians are now consistently completing these forms for U.S. class action recoveries. However, there may be difficulties when a fund switches custodian or when a custodian transfers a fund's securities from one sub-account to another sub-account. For example, if a class period encompasses a period of time (in whole or in part) when a previous custodian was engaged, it may not be clear which custodian is required to submit the proof of claim. Investors can ensure that the terms of their custodial agreements provide a mechanism to address this issue. In addition, when a custodian transfers a fund's securities from one sub-account to another sub-account, the custodian generally records a zero basis in the new account, which causes an undercounting of the fund's recovery. Furthermore, the industry custom and practice among the leading custodians is not to reconcile recoveries and, therefore, these weaknesses in the claims filing system are rarely identified and corrected.

FIG. 1 illustrates a block diagram of an example environment 100 in which a securities claims identification, optimization and recovery system can operate. Although not required, aspects and implementations of the CIOR system 110 will be described in the general context of computer-executable instructions, such as routines executed by a general-purpose computer, a personal computer, a server, or other computing systems. Embodiment of the CIOR system 110 can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Embodiments of the CIOR system 110 can be implemented in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the CIOR system 110 described herein can be stored or distributed on tangible, non-transitory computer-readable media, including magnetic and optically readable and removable computer discs, stored in firmware in chips (e.g., EEPROM chips), an array of devices (e.g., Redundant Array of Independent Disks (RAID)), solid state memory devices (e.g., solid state drives (SSD), Universal Serial Bus (USB)), and/or the like. Alternatively, aspects of the CIOR system 110 can be distributed electronically over the Internet or over other networks (including wireless networks). Those skilled in the relevant art will recognize that portions of the CIOR system may reside on a server computer, while corresponding portions reside on a different computer (e.g., a client computer). Data structures and transmission of data particular to aspects of the CIOR system 110 are also encompassed within the scope of the embodiments.

Referring to FIG. 1, the CIOR system 110 operates in environment 100. Client computer systems 120A-120N, such as desktop computer, laptop computer, tablet, mobile device, or the like, are used by users of the CIOR system 110 to access a web-based interface provided by the CIOR system 110 via networks 145. Examples of the users of the CIOR system 110 include clients or customers (e.g., customer asset manager), admin users and analyst users supporting the CIOR system 110. Networks 145 can include wired and wireless, private networks and public networks (e.g., the Internet). Client computer systems 120A-N use network interfaces to connect and/or communicate with networks 145, either directly, or via wireless routers or cell towers. Network interfaces may employ connection protocols such as direct connect, Ethernet, wireless connection such as IEEE 802.11a-n, and the like to connect to networks 145. The CIOR system 110 is in communication with a database 115 that can include one or more database tables for storing data relating to claims, active cases, claims pipeline, recovery reports, value reports, other raw and/or processed data, client settings and configurations, policies and/or the like.

As illustrated, the environment 100 also includes one or more custodial data feeds 105A-N from the custodians of securities portfolios of investors. The custodial data feeds provide data relating to trades and other activities associated with securities portfolios that can be used by the CIOR system 110 to identify potential claims. The environment 100 also includes one or more litigation information sources 130 that can connect to the CIOR system 110 over network 145 to provide notification and other updates relating to securities litigations which can be used by the CIOR system 110 to evaluate or facilitate evaluation of potential claims to determine whether any of the potential claims are actionable and optimize recovery from the actionable claims. The litigation information sources 130 can include one or more domestic and/or foreign litigation monitoring services 135. In some embodiments, the CIOR system 110 can subscribe to other data feeds such as the financial news data feed 140 for news and other information relating to local and/or global financial markets.

Figure 2:
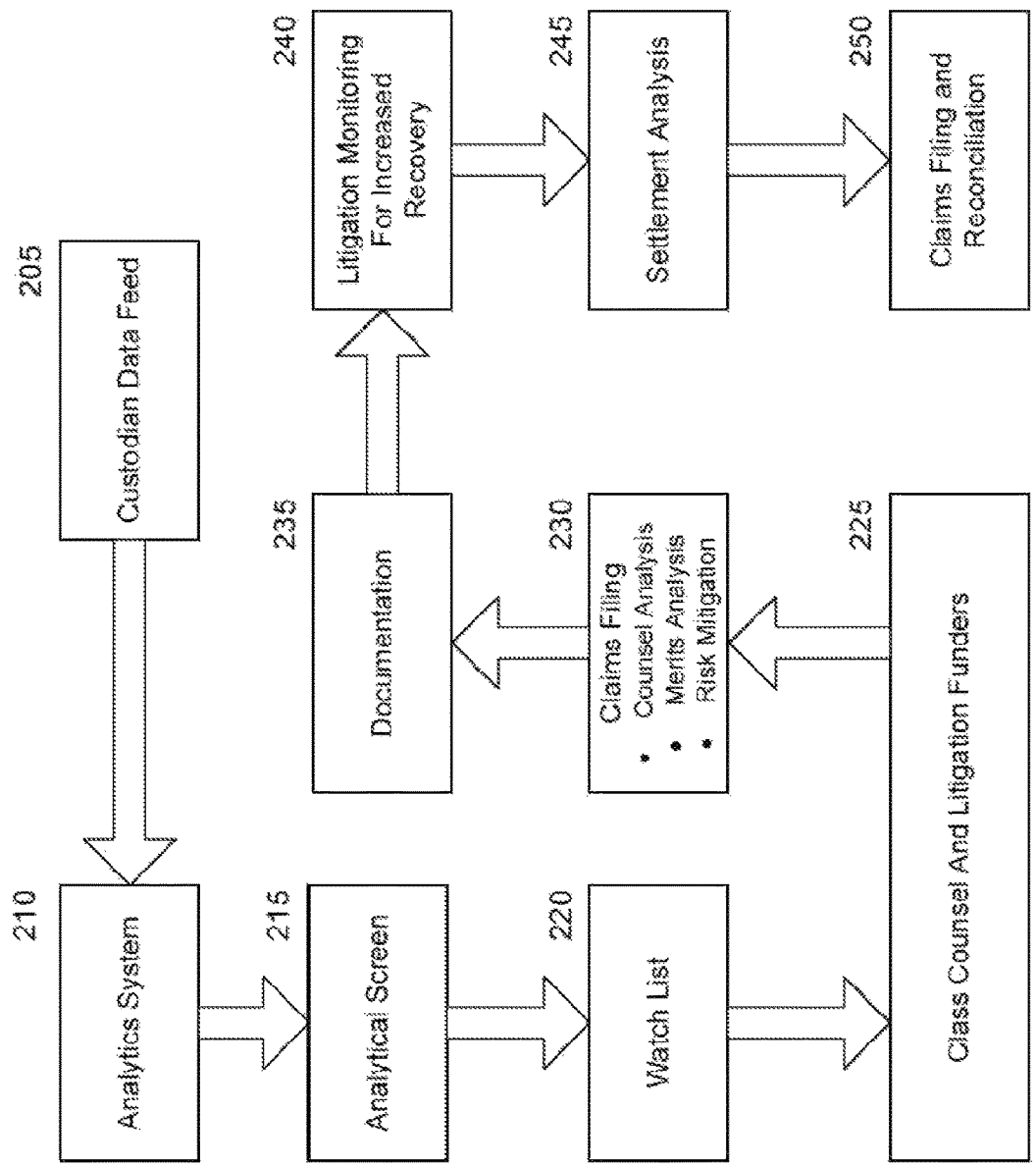
FIG. 2 illustrates a block diagram of an example embodiment for identifying, optimizing and recovering securities claims for securities listed on domestic exchange and foreign exchanges.

FIG. 2 illustrates a block diagram illustrating flow of data in identifying, optimizing and recovering securities claims by the CIOR system (e.g., CIOR system 110 of FIG. 1) for global securities (i.e., securities listed on a domestic exchange or a foreign exchange). Investors do not have the protection of the U.S. securities laws if the securities were purchased on a foreign exchange. The CIOR system can be implemented to identify, optimize and recover claims for global securities litigation by monitoring global securities portfolio to ensure that opportunities to recover assets based on securities fraud are not lost. The CIOR system can further perform an analysis of whether to bring a state law action or participate in an action in a foreign jurisdiction. It should be noted that unlike the U.S. class action process, in foreign actions investors are generally required to "opt-in" to join foreign proceedings at filing or shortly thereafter by pleadings amendment. The "opt-in" process can require affirmative decisions early in the process to join the case in order to recover the investor's share of the proceeds. In many cases, investors may be required to make these decisions before a foreign action is even filed and the CIOR system provides investors insight in that time frame.

The CIOR system includes a custodian data feed (block 205) that provides raw portfolio information (e.g., shares purchased or sold, relevant dates and pricing therefor and/or other trading data) to a trading data analytics system (block 210). The custodian data feed (block 205) can include information that is monitored and/or analyzed to detect asynchronous activity in securities portfolios of investors including institutional investors such as insurance companies, retirement or pension funds, mutual funds, hedge funds, banks, trusts, endowment funds, investment banks, and/or the like.

The information in the custodian data feed (block 205) can be analyzed by analytic tools of the analytics system (block 210) to detect or identify asynchronous activity in a securities portfolio. Identification of an asynchronous activity that include screening portfolio securities into volatility baskets (block 215), evaluating disparate proportionate movement in portfolio securities in which the economic impact to the holdings exceed certain thresholds set by the client, and reporting or flagging any impact. In one implementation, for example, the analytic system (block 210) can include a script or a module for creating a watch list (block 220) or an alert. The watch list can be created to monitor, track and/or compare, for example, per week (or other time period) price change percent for a portfolio security relative to a statistical measure (e.g., mean, median, etc.) of per week price change percent for securities of a sub-industry index (Global Industry Classification Standard (GICS) or other relevant associated indices by industry). The watch list 220 can be customizable based on each client's sensitivity to degree of asynchronous activity as well as intra-day, week and month trading losses per security. In some embodiments, the reports from the watch list can be accessed via a client dashboard. In some embodiments, the custodian data feed can also be monitored using analytic tools (block 210) that have been customized to identify securities listed on a foreign exchange and which meet certain criteria. In embodiments, a methodology may be used that screens for both asynchronous movement between a subject security and better calibrated indices. A trading volume metric may also be integrated into the screening functionality of the CIOR system.

Some or all of the information identified in the watch list (e.g., potential claims identified) can be provided by open arm's length communication to the class counsel of a securities litigation and litigation funders (block 225) for review and/or analysis of the merits of the claims for claims filing at block 230. Litigation funders can be investors who fund the foreign litigation costs in exchange for a fee that can be a percentage of the entire fee to be paid or can be reimbursement of expenses and any costs award. In some embodiments, the claims on the watch list are reviewed or screened using an automated process that correlates information relating to the asynchronous behavior of the securities on the watch list with information such as financial market updates, updates from portfolio entities, market moving or breaking news, legal activity news, and/or other information aggregated from news sites, blogs, Twitter feed, and/or other sources ((e.g., via web crawlers, data feeds, etc.) to determine if the asynchronous behavior exhibited by the securities on the watch list is likely due to securities fraud or due to other events (e.g., drop in stock price of an entity due to news about CEO's health problems).

The class counsel or litigation funders can review the claims in the watch list and determine whether the claims are actionable or non-actionable (block 230). For example, the class counsel can review the trading records, loss and other information, and determine if the investor should be a class representative. In some embodiments, lawsuit class periods are compared to securities' trading history to identify cases where a securities case is a class member and to estimate a loss figure associated with each class action filing. In alternate embodiments, the CIOR system can identify and analyze securities cases to perform this function, and to report its findings on a timely basis. In some embodiments, the CIOR system can utilize analysis, including merits analysis (e.g., evaluating the merits of the case in light of the law in the jurisdiction where the action is being brought) and risk mitigation (e.g., identifying and mitigating risks such as the extent to which a loser pay is covered, potential discovery burdens, and the like) to assist the investor to maximize recoveries.

Unlike the familiar and well-developed securities class action litigation in the United States, outside the United States securities fraud cases involve risk arising from legal costs shifting. While financial institutions (particularly those that manage client/policyholder funds) have a fiduciary duty to seek to recover securities fraud losses in their portfolios, with respect to non-US equities they need to evaluate whether to absorb the risk of an adverse prevailing party fees and costs award. In short, institutional investors are confronted with the difficult task of weighing their duty to recover portfolio losses against the potential Adverse Party Legal Expense (APLE) if they are unsuccessful. For those that elect to join such foreign securities fraud cases, after-the-event APLE insurance (known as "ATE" insurance) can be extremely expensive and made more so if the premiums are financed through litigation funders on a contingency basis, which reduces potential recoveries.

Some embodiments of the CIOR system provide an APLE cover on a before-the-event basis that spreads the risk across multiple claimants in multiple cases pending in multiple jurisdictions, resulting in relatively inexpensive premiums while mitigating risks. Clients can be provided with a direct policy protecting against APLE up to an amount (e.g., $100,000) for each case (and typically up to an annual aggregate) meeting strict objective underwriting criteria. In some embodiments, the APLE insurance can be available only for cases in which the relevant regulator or criminal authority has found significant wrongdoing and is not available for United States-style "strike suits" or speculative securities litigation. Should a particular case require higher limits, the CIOR system can utilize established reinsurance and fronting relationships to obtain highly discounted excess cover to meet any limit profile needed.

In some embodiments, the results from the analysis of the claims, and based on certain policies and procedures, the CIOR system can facilitate determination of how to maximize the value of class action securities litigation claims relating to a portfolio. An evaluation policy that can provide guidance regarding when and how to become involved in securities litigation and, when it is advantageous to seek class representative status in any particular class action, can be adopted to identify, protect, and serve the interests of the investors. Using the evaluation policy, the investment manager or custodian's fiduciary duty can be met by effectively managing claims as fund assets, increase in recoveries on claims can be obtained, fees paid to obtain recoveries can be reduced, future frauds can be deterred by imposing personal liability on bad actors, corporate governance issues can be identified and corporate governance improvements through litigation can be developed, the litigation system can be changed to better protect interests of shareholders and meet some or all of the above. The CIOR system can assist in decision making regarding securities litigation issues from monitoring of cases through selection of counsel.

The CIOR system can further include a presentation layer that aggregates and/or tracks and displays on a dashboard documentation relating to one or more of: watch list, notice of domestic and foreign filings, last-in, first out (LIFO)/first-in, first out (FIFO) and/or other maximum damages analyses, relevant publicly available documents including significant developments in pending litigation, determination of recognized loss and settlement recovery estimates, and the like (block 235).

In some embodiments, the CIOR system monitors class action filings for increased recovery (block 240) (e.g., using Stanford Class Action Clearinghouse web site, private non-law firm monitoring service, and/or other resources). Even if the investor is not a class representative in a class action lawsuit, monitoring of class action filings can provide opportunities for mitigating transaction costs such as attorney fees, and the like. In some embodiments, for example, the CIOR system can monitor class action filings for which a securities portfolio (e.g., a pension fund) has sustained a loss that (i) exceeds its loss threshold per security, which threshold can be customized based on various criteria such as based on stock volatility or asset class or (ii) is substantial and where there are special factors justifying fund's involvement despite the fact that losses are below its loss threshold. The loss threshold can depend on the size of the fund (e.g., public pension fund) and/or other criteria. In some embodiments, the loss threshold for determining whether to monitor the class action filings can be set at the same level or at a different level from the loss threshold used in evaluating whether to add a security to a watch list. For example, for funds with assets greater than $30 Billion, the loss threshold per portfolio security can be $5 Million. Similarly, a loss threshold of $1 Million can be set for funds with assets between $10 and 5 Billion, a loss threshold of $250,000 can be set for funds with assets between $1 and 5 Billion, and a loss threshold of $150,000 can be set for funds with assets below $1 Billion. The CIOR system can utilize a monitoring policy (e.g., monitoring policy for US actions, monitoring policy for foreign actions the foreign actions) so that the relevant deadlines and issues can be resolved in a timely manner.

When the case settles, the CIOR system can perform settlement and opt-out analysis (block 245). The settlement analysis can include a comparison of a settlement amount against an amount calculated based on a damages recovery valuation model, analysis of fairness and reasonableness of proposed transaction costs to the settlement to determine the efficacy to the client, and the like. The claims recovery process can be implemented by filing claims and reconciling any recovery from the settlement to ensure all amounts due are paid by the settlement agent, assuming the investor does not opt out (block 250). The claims can be processed by a claims processor using information from the custodian data feed (block 205). The claims processor can determine how to maximize the value of any litigation claims relating to the portfolio. Using information from the custodian data feed (block 205), during the pendency of any lawsuit and upon its proposed settlement, the claims processor can make a determination as to a viability of case opt-out strategy, any objection to any settlement, any objection to any legal fees application (e.g., from attorneys), investor's recognized loss under the adjudication, and the like.

In some embodiments, the claims processor can also generate and provide a report to allow the investor to select a favorable methodology under which the claims should be submitted. The report can include, for example, recovery calculations on an aggregated and disaggregated basis on a real time basis. When the investor has multiple sub-accounts, the claims recovery can depend on whether an aggregated or disaggregated analysis of the client's portfolio across multiple sub-accounts is used. In the aggregated analysis, holdings are aggregated into a single filing, while in the disaggregated analysis, the claims are filed for each sub-account or in any other segmented way. The selection of one analysis over the other may depend on conditions such as settlement terms, buy in a certain window, sell in a certain window, net seller, and the like. Existing claims processors do not have the flexibility to allow the investor to select a basis (i.e., aggregated or disaggregated analysis) for claims filing, since the basis is selected before an investor account is setup. In the CIOR system, the database(s) storing the investor, trade, and other data are structured in such a way to allow calculations to be performed on both aggregate and disaggregate basis, and allow the investor to select a basis that is aligned with the investor's recovery strategy. For example, the report (e.g., Table 1) from the claims processor can be fed into the presentation layer (e.g., via an application programming interface (API) or other methods) and displayed on a dashboard or other user interface to the investor. The investor can review the report and select a basis based on the recognized loss (RL) amount, and/or other strategic considerations (e.g., to assign recovery to the investment manager who made the loss). In some embodiments, the recognized loss is defined as the amount of the settlement reflecting the loss per share or per unit of security. In some embodiments, the claims processor automatically selects an aggregate or disaggregate basis that maximizes the recovery (i.e., the basis that shows the highest recognized loss).

TABLE 1

Aggregate and Disaggregate Recognized Loss (RL) Comparison

| Case Name | Case Status | Claims Processing Status | Disaggregate RL | Aggregate RL | Delta RL |
|---|---|---|---|---|---|
| ABC Bank, Inc. Securities Litigation | Disbursement | Disbursed | 2,678 | 19,836 | 64% |
| PQ Bank, Inc. Securities Litigation | Disbursement | Disbursed | 4,687 | 5,586 | 19% |
| XY Bank, Inc. Securities Litigation | Settled | Active | 48,246 | 86,785 | 80% |
| TS Bank, Inc. Securities Litigation | Settled | Active | 482,636 | 482,636 | 0% |

The example report from the claims processor depicted in Table 1 above can also include information such as the case name/identifier, securities identifier, case status, claims processing status, recognized loss using disaggregate method, recognized loss using aggregate method, delta of the recognized loss, disaggregate payout, aggregate payout, delta payout, pro rata, and the like. In some embodiments, the claims processor can identify from the trading data if there is zero basis for any sub-accounts, as a result of moving assets from one sub-account to another. The claims processor can then identify zero basis in the claims, and correct for it, to prevent the claims from being rejected.

The claims processor receives the user selection of the aggregate/disaggregate basis for claims recovery (or automatically selects one to maximize recovery) and submits the claims in accordance with the instructions from the investor. The claims processor can reconcile funds obtained from the claims recovery process against the recognized loss, and distribute the funds to the investor (block 250). In cases where the recovery is not reconciled with the recognized loss, the claims processor can generate an alert or notification for further review and/or verification for reconciliation.

Figure 3:
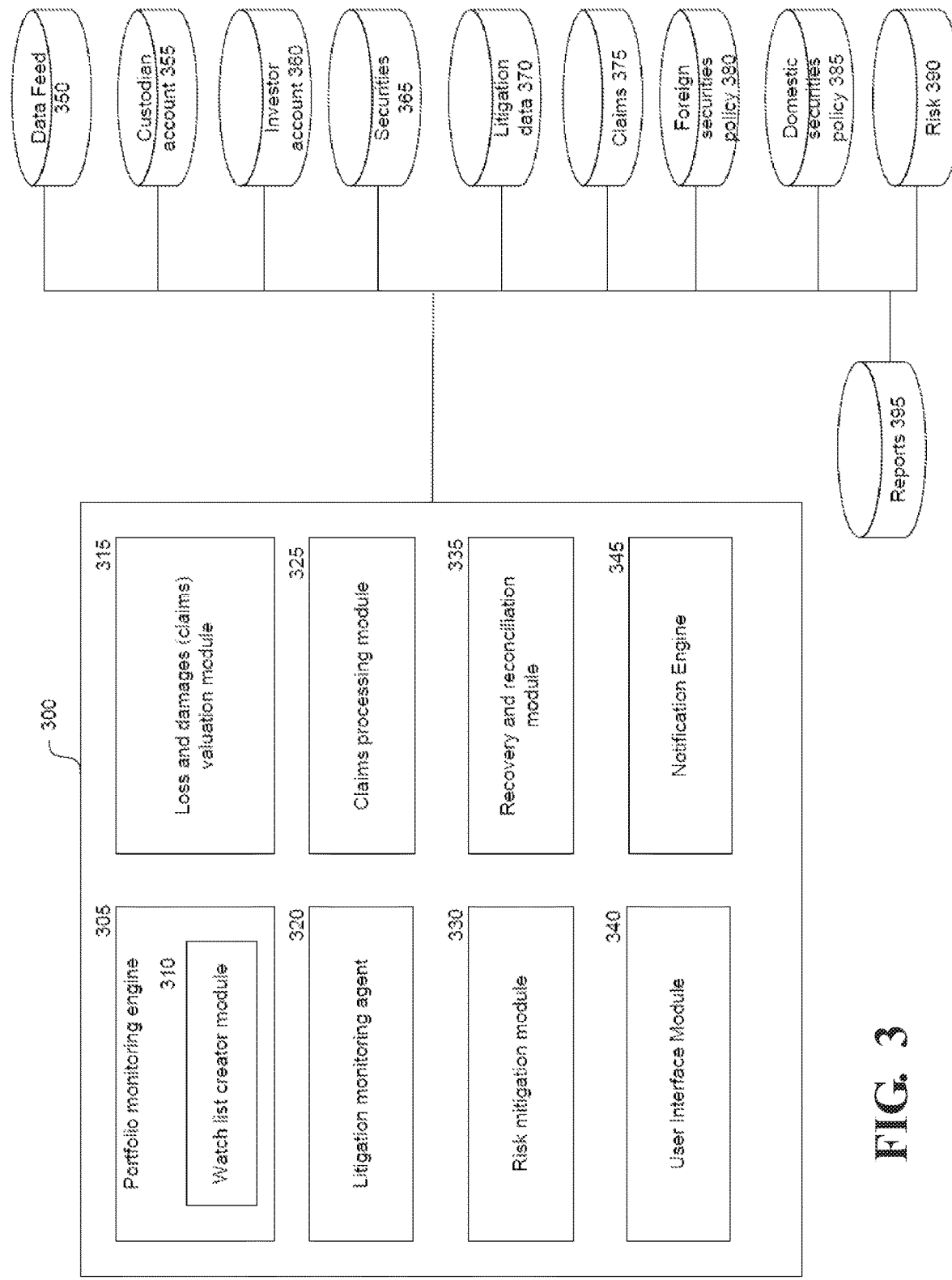
FIG. 3 illustrates a block diagram of an example embodiment of the securities claims identification, optimization and recovery system.

FIG. 3 is a block diagram that illustrates an example embodiment of the CIOR system 300. In some embodiments, the CIOR system 300 includes a portfolio monitoring engine 305 having a watch list creator 310, a loss and damages valuation module 315, a litigation monitoring agent 320, a claims processing module 325, a risk mitigation module 330, a recovery and reconciliation module 335, a user interface module 340, a notification engine 345, among others. The system 300 can be coupled to or be in communication with one or more database tables such as the data feed table 350, a custodian account table 355, an investor account table 360, a securities table 365, a litigation data table 370, a claims table 375, a foreign securities policy table 380, a domestic securities table 385 and a risk table 390, a reports table 395 among others.

As used herein, a "module," "engine" or an "agent" includes a general purpose, dedicated or shared processor and, typically, firmware or software modules that are executed by the processor. Depending upon implementation-specific or other considerations, the module or engine can be centralized, or its functionality distributed. The module or engine can include general or special purpose hardware, firmware, or software embodied in a computer-readable (storage) medium for execution by the processor. One or more of the disclosed modules and agents may be implemented on the same machine or distributed among different machines.

The portfolio monitoring engine 305 can monitor one or more securities portfolios using data from the data feed 350 to identify suspicious losses in a securities portfolio, whether domestic or foreign-exchange traded (i.e., securities claims). Securities, in some embodiments, include debt securities, equity securities, derivative contracts, foreign securities, and/or the like. The information relating to various securities (e.g., securities ID, type, name, issuer, etc.) can be stored in the securities table 365. The portfolio monitoring engine 305 can be configured to detect or identify certain events (e.g., asynchronous movements in equity portfolio securities, minimum loss threshold, etc.) and can create and/or customize a watch list (e.g., via the watch list creator module 310). In some embodiments, the portfolio monitoring engine 305 determines whether there is an asynchronous activity in a portfolio security by determining if a portfolio security moves more than a threshold as compared to the movement of the relevant industry index. For example, if oil and gas index is flat, but there is more than 5% drop in the stock price of a specific oil and gas company, the portfolio monitoring engine 305 can identify the security as having an asynchronous activity, and include it for further evaluation on the watch list. The threshold for determining whether there is an asynchronous activity can be configurable, and can vary with the client. For example, some clients may set a lower threshold to be more aggressive in detecting securities fraud, while other clients may set a higher threshold. In some cases, the portfolio securities can have different volatilities, and thus, the volatility of the securities can be considered when detecting asynchronous activity. For example, shares of a startup company can be more volatile compared to shares of an oil and gas company, and thus a 5% drop in the shares of the startup company may be more common, than a 5% drop in the oil and gas company. In some embodiments, the portfolio securities can be assigned to different volatility baskets (e.g., 10%, 5% and 2% volatility baskets), each of which can have its own threshold for detecting asynchronous activity to account for volatility when detecting asynchronous activity in the portfolio securities. In embodiments, indices may be tracked and utilized by CIOR in a manner similar to individual stocks. Indices may be selected, tracked, locked and the like based upon a criterion, such as industry sector, geography, or some other criterion.

In embodiments, the portfolio monitoring engine 305 can monitor one or more blockchains and/or cryptocurrencies, including but not limited to a public ledger such as that associated with Bitcoin. using data from a data feed 350 to identify suspicious changes, losses, additions, lack of changes or some other parameter of an account, whether domestic or foreign. Securities, in some embodiments, may be registered at least in part in association with a blockchain and/or cryptocurrency. Securities may include, but are not limited to, debt securities, equity securities, derivative contracts, foreign securities, and/or the like. The information relating to various securities (e.g., securities ID, type, name, issuer, etc.) can be stored in the securities table 365 as well as tracked in a ledger that is associated with the blockchain and/or cryptocurrency. The portfolio monitoring engine 305 may be configured to detect or identify certain events (e.g., asynchronous movements in equity portfolio securities, minimum loss threshold, etc. that were registered at least in part using blockchain and/or cryptocurrency) and can create and/or customize a watch list (e.g., via the watch list creator module 310).

In some embodiments, the portfolio monitoring engine 305 may determine whether there is an asynchronous activity in a ledger and/or a portfolio security by determining if a portfolio security moves more than a threshold as compared to the movement of the relevant industry index or there is atypical or suspicious activity occurring in a ledger. For example, if a ledger indicates an aberrant chronology of transactions, the portfolio monitoring engine 305 may identify an associated security as having an asynchronous activity, and include it for further evaluation on the watch list. The threshold for determining whether there is an asynchronous activity may be configurable, and can vary with the client. In embodiments, ledgers associated with a blockchain and/or cryptocurrency may be tracked and utilized by CIOR in a manner similar to individual stocks. Ledgers may be selected, tracked, locked and the like based upon a criterion, such as industry sector, geography, or some other criterion.

In some embodiments, the portfolio monitoring engine 305 determines or track losses on portfolio securities on a day, week, month or other time basis. A minimum loss threshold can be specified to configure the portfolio monitoring engine 305 to flag only those securities having asynchronous activity that meet the loss threshold. Other criteria for flagging asynchronous activity can be configured. The thresholds for domestic and foreign trading losses can also be set separately in some embodiments.

When asynchronous activities are detected in the portfolio securities, the monitoring engine 305 can create an alert and/or generate and/or update the watch list. The watch list (e.g., via the watch list creator module 310) can include information identifying portfolio securities having asynchronous activity, any news stories associated with the issuer of the securities, trading losses including one day, one week and/or one-month losses, and the like for both U.S. and foreign securities. An example, watch list for U.S. and foreign securities is depicted in Table 2 below.

TABLE 2

Watch List for Domestic Securities for Client ABC's Portfolio

| Date | Entity | News | One Day Loss | One Week Loss | One Month Loss |
|---|---|---|---|---|---|
| Feb. 27 | DP Pharma, Inc. | Company failed to disclose that 5% of the patients who were administered xyz injection for treating high blood pressure experienced serious life-threatening reaction. | $[850,256.50] (−17.00%) | $[902,672.20] (−18.03%) | $[1,601,500.00] (−32.03%) |
| Feb. 31 | XYZ Brands Inc. | Filings with the U.S. securities and Exchange Commission contains material omission and/or misstatements concerning the sales processes leading up to the merger between XYZ Brands, Inc. and PQ Brands, Inc. | $[1,005,300.12] (−20.10%) | $[1,230,540.67] (−24.61%) | $[982,205.02] 14.34% |

TABLE 3

Watch List for Foreign Securities for Client ABC's Portfolio

| Date | Entity | New | One Day Loss | One Week Loss | One Month Loss |
|---|---|---|---|---|---|
| Jan. 30 | All Italia Oil and Gas SpA | Allegations from European investors that the company overstated its oil and gas reserves. | $[19,650,200.20] (−26.67%) | $[19,800,400.21] (−27.12%) | $[20,100,200.98] (−28.12%) |
| Feb. 11 | Middle East Energy Industries | Concerns that the company shares were undervalued during its acquisition by China Energy Conglomerate | $[16,500,000.10] (−23.0%) | $[11,500.500.98] 6.56% | $[14.500,000.88] 18.21% |

The loss and damages (claims) valuation module 315 can determine a value of a claim using one or more valuation methods. For example, the module 315 can utilize historical settlement data to create a valuation metric for claims at filing, or even prior to the filing. Based on the valuation, clients can make a decision whether to opt out (or opt in), determine if the settlement is fair, if the attorney fees are fair, and the like.

The litigation monitoring engine 320 can monitor the progression of the litigation, occurrence of any events such as settlement, and the like. The data relating to litigation can be stored in one or more database tables such as litigation data table 370.

The claims processing module 325 processes the claims using one or more methods. For example, the module 325 can process claims using an aggregate analysis, using a disaggregate analysis, trading matching for securities with zero basis, and/or the like. Data relating to claims can be stored in one or more database tables such as the claims table 375.

The risk mitigation module 330 can mitigate risks by identifying and/or analyzing potential issues that can cause risk in order to take actions that can mitigate such risks. For example, if a historical analysis of actions in a foreign jurisdiction is associated with certain risks, such risks can be proactively identified, and an action can be evaluated for merit before the action is filed in the jurisdiction. In some embodiments, the risk mitigation module can offer adverse party cost (loser pays) insurance to clients (and in some instances plaintiff investors that are not clients) involved in litigations outside the United States that meet certain qualification criteria (e.g., meets disclosed underwriting guidelines, a regulator or another authority has found significant wrong doing). The availability of insurance reduces or eliminates risk-based disincentives to the clients seeking to recover portfolio losses due to actionable securities fraud to allow funds (e.g., pension funds) to evaluate each case on its merits. The data relating to risk, insurance premiums, enrollment in insurance and/or the like can be stored in one or more database tables such as the risk table 390.

The recovery and reconciliation module 335 can identify and review class action recoveries (by settlement or trial), provide an alert or notice of settlement recoveries, identify sources of recovery available to satisfy judgment or settlement, factors that are likely to cause increase in recovery to be recognized from an action, and the like.

The user interface module 340 provides graphical user interfaces (e.g., client dashboard) via which clients of the system 300 can interact with the system 300, and utilize its features and functionalities. For example, using the user interface provided by the module 340, a client can configure a watch list based on desired specifications (e.g., for securities with certain volatility, certain market capitalization, etc.), and/or view download, print or email the watch list. The user interface module 340 can also include reporting, charting and/or analysis tools for creating and viewing reports, charts or visualizing analytics data. The notification engine 345 can detect when new updates or reports are available and can send those updates or reports as alerts (e.g., on the client dashboard, via email, via text message). The notification engine 345 can include settings that can be configured by the client to customize the type of events that should be sent as alerts, whether notifications should be sent as they come in or in batches, a frequency of the notifications, the contents of the notifications (e.g., a summary, full report, full report with CSV data). Various reports generated by the CIOR system 300 can be stored in the reports database table 395 in association with the client and/or investor identifier.

The custodian account table 355 can store custodian information (e.g., custodian of pension funds), investor account table 360 can store investor information (i.e., identification and other details relating to investors on whose behalf all proof of claims are filed). The CIOR system 300 can store domestic and foreign securities policies for securities litigation in the US and in foreign jurisdiction in domestic securities policy table 385, and foreign securities policy table 380 respectively.

Figure 4:
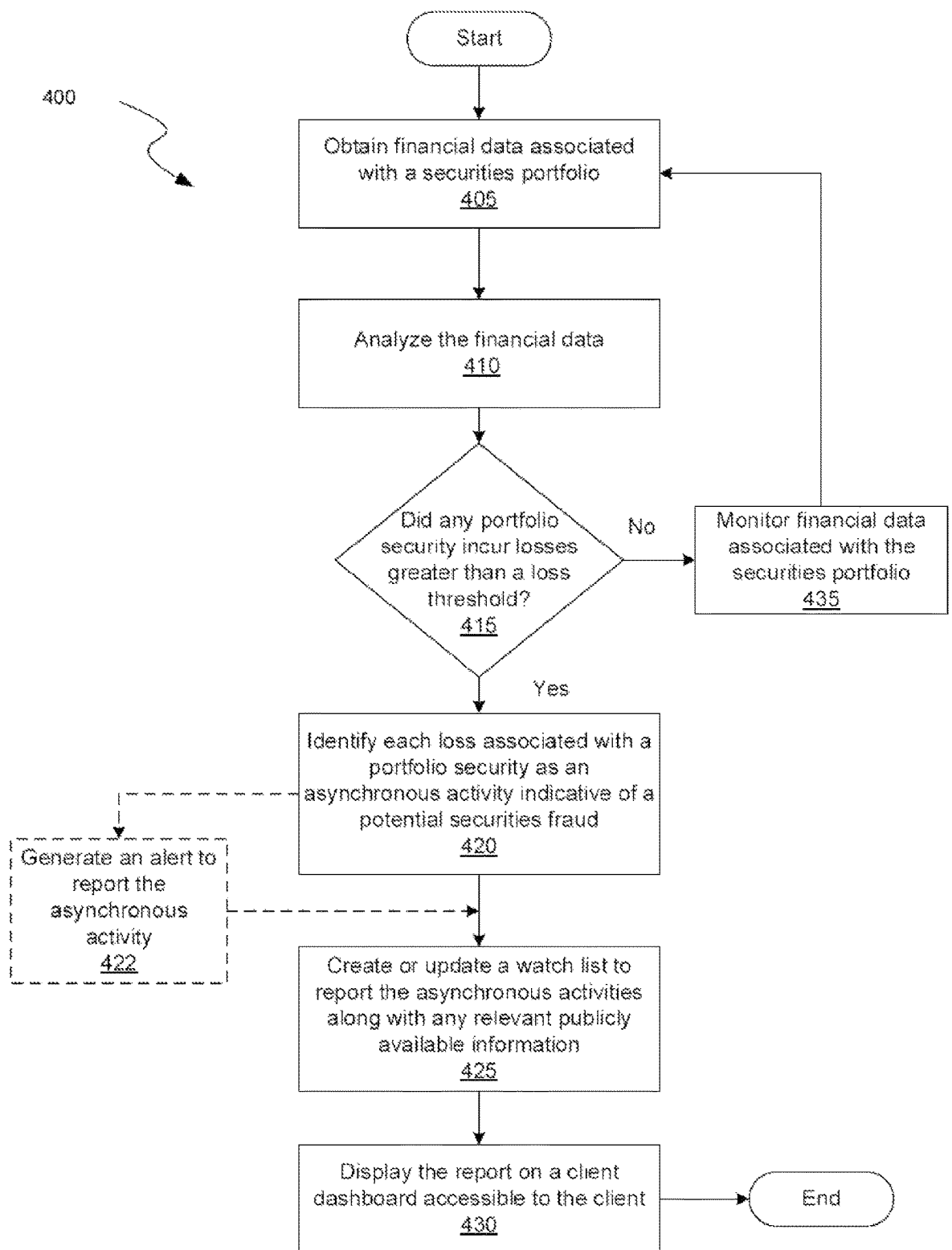
FIG. 4 illustrates a logic flow diagram of an example method of monitoring a securities portfolio to identify and report any asynchronous activity in the securities portfolio.

FIG. 4 depicts a logic flow diagram of an example method 400 of monitoring a securities portfolio to identify and report any asynchronous activity in the securities portfolio. As illustrated, the CIOR system (e.g., CIOR system 300 of FIG. 3) obtains financial data associated with the securities portfolio of an investor at block 405. The financial data can be provided as a data feed by a custodian of the securities portfolio. The financial data can include, for example, securities (e.g., shares) purchased or sold, price and/or other trading data. At block 410, the CIOR system analyzes the financial data to detect any asynchronous activity (e.g., suspicious losses) in the securities portfolio. At decision block, 415, the CIOR system determines if any portfolio security incurred losses greater than a loss threshold. The loss threshold can be a percent of the total value of the securities portfolio in some embodiments. In some embodiments, the CIOR system can determine, based on the analysis, whether a change in the value of a position on a security compared to a change in a value of a relevant industry index is more than a loss threshold. In some embodiments, the loss threshold can be specified by the client. The loss threshold can be specific to whether the portfolio security is a domestic exchange traded security or a foreign exchange security, the volatility basket to which the portfolio security is assigned to, or the like. If no portfolio security incurred any losses greater than the loss threshold or any loss in the value of a position on a security relative to a relevant industry index did not exceed a loss threshold, then the CIOR system can continue monitoring the financial data of the securities portfolio at block 435. However, if any of the portfolio security incurred any losses greater than the loss threshold or any loss in the value of a position on a security relative to a relevant industry index exceeded a loss threshold, the CIOR system can identify each loss associated with a portfolio security as an asynchronous activity that is indicative of a potential securities fraud at block 420. In some embodiments, the CIOR system can generate an alert to report the asynchronous activity to the client at block 422. The CIOR system can create or update a watch list (e.g., Tables 2 and 3) to report all the asynchronous activities detected by the system along with any other relevant publicly available information at block 425. At block 430, the report can be displayed on a client dashboard accessible by the client via a client device.

Figure 5:
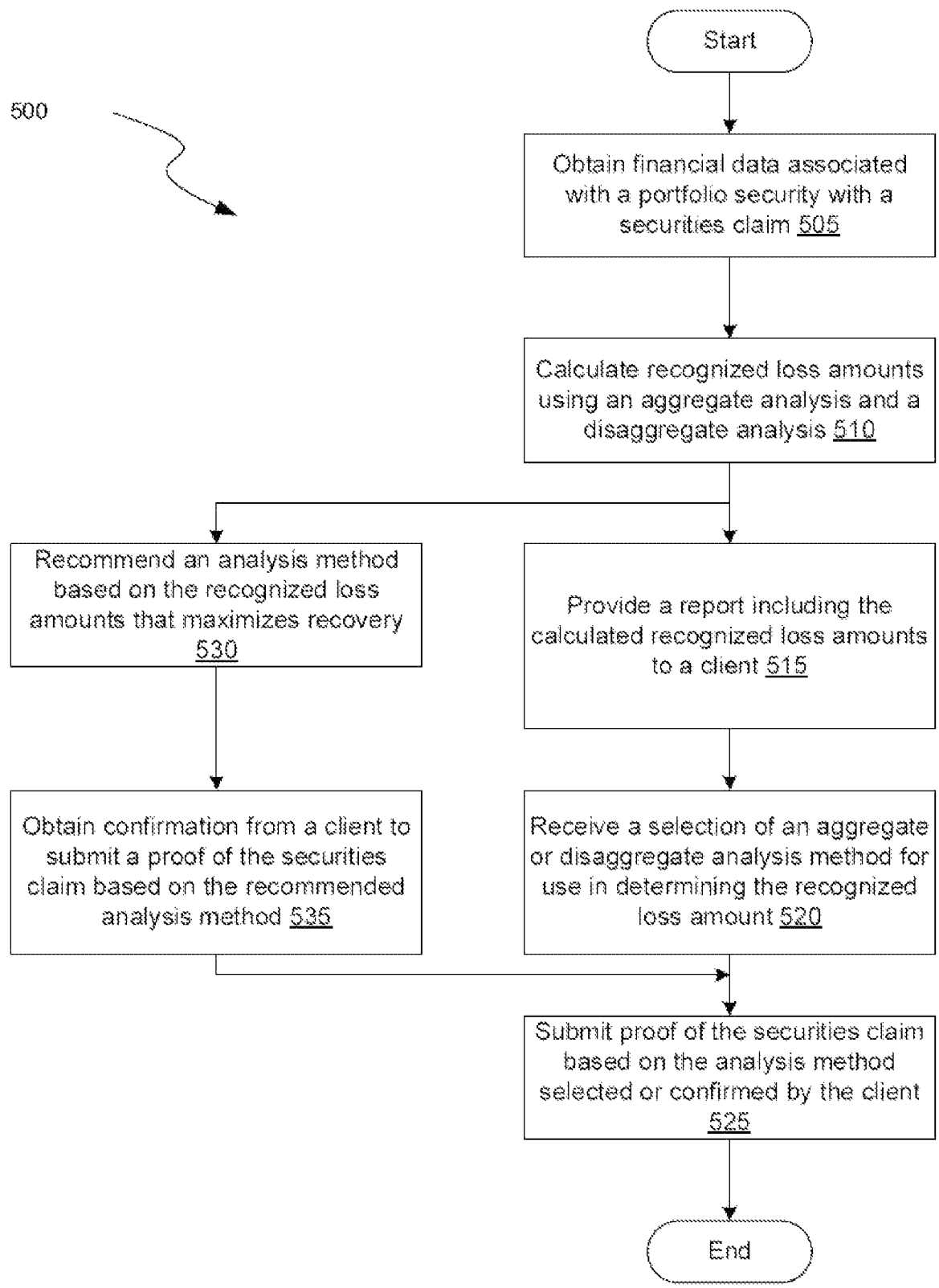
FIG. 5 illustrates a logic flow diagram of an example method of optimizing or maximizing recovery of revenue associated with a securities fraud.

FIG. 5 depicts a logic flow diagram of an example method 500 of optimizing or maximizing recovery of revenue associated with a securities fraud. As illustrated, the CIOR system (e.g., CIOR system 500) obtains financial data associated with a portfolio security associated with a securities claim for a securities fraud at block 505. The financial data can be provided as a data feed by a custodian of the securities portfolio. The financial data can include, for example, securities (e.g., shares) purchased or sold, price and/or other trading data. At block 510, the CIOR system can calculate recognized loss amounts using an aggregate analysis and a disaggregate analysis, each analysis involving a different portfolio allocation method. At block 515, the CIOR system can provide a report including the calculated recognized loss amounts to a client. The report (e.g., Table 1) can also include information identifying the securities litigation, status of the litigation, status of the claims processing, delta or difference between the recognized loss amounts and/or the like. In response to a request from the CIOR system to select an analysis method for calculating the recognized loss amounts, the client can select an analysis method and the CIOR system can receive the client selection at block 520. At block 525, the CIOR system can submit a proof of the securities claim based on the client-selected analysis method. In some embodiments, the CIOR system can recommend or automatically select an analysis method based on the recognized loss amounts to maximize recovery of revenue at block 530. At block 535, the CIOR system can then obtain confirmation from the client to submit a proof of the securities claim based on the recommended or selected analysis method. Upon obtaining confirmation from the client, the CIOR system can submit the proof of the securities claim based on the analysis method confirmed by the client.

The CIOR system, in various embodiments, provides a web-based and/or an application based interface for users (e.g., clients or customers). When clients log in to the CIOR system, the clients can see a dashboard that includes information related to securities litigation assets that the clients are managing. For example, the dashboard can display potential securities claims (e.g., from a watch list), active securities fraud class action cases, claims recovery pipeline, including information on the status of claims filings for settled class actions and calculations of recognized loss, recovery reports and/or the like. In some embodiments, notifications of potential claims (e.g., claims corresponding to asynchronous activities) can be generated and sent to clients via email and can also be displayed on the client dashboard. A notification of a potential claim can include information identifying whether the potential claim is related to a domestic or foreign exchange traded security, security identifier (e.g., CUSIP), relevant dates, amount of securities held, loss amounts and/or other relevant information. Examples of notifications of potential claim are provided below.

Example 1

Foreign—Jill Smith Group
Date(s):
Pension Fund X held 4,745,426 shares
Loss (one-day) $1,784,491.04 USD
JSG LN Equity (London) had a negative 12.07% spread vs. its GICS-defined sub-industry cohort (hotels, resorts and cruise lines).
No securities class action lawsuits have been filed against this company in the past year.
The company has not issued any stock in the last 36 months, but issued rights in June 2012.

Example 2

Domestic
Date(s): May 5, 2013
ABC Foods, Inc.—Class A
ABC US Equity (New York Exchange) had a negative 9.87% spread vs. its GICS-defined sub-industry cohort (Packaged Foods and Meats).
Pension Fund X held 219,027 shares and had a one-day loss of $922,006.20 USD.
An outbreak of bird flu in China caused a drop in ABC's international chicken sales.
No securities class action lawsuits have been filed against this company in the past year.
The company has not issued stock or rights in the past 36 months.

Example 3

Foreign
XYZ (Holdings) Limited
Date(s): May 5, 2013
XYZ Equity (Hong Kong Exchange) had a negative 7.48% spread vs. its GICS-defined sub-industry cohort (Real Estate Development).
Pension Fund X held 425,800 shares and had a one-day loss of $559,212.35 USD.
The company paid a dividend on May $5^{th}$.
No securities class action lawsuits have been filed against this company in the past year.
The company has not issued stock in the past 36 months, but has an assured entitlement (rights offering) to shares in a future offering pending.

Example 4

Foreign
Derby Limited
Date(s): May 5, 2013
DBY Equity (Hong Kong Exchange) had a negative 8.11% spread vs. its GICS-defined sub-industry cohort (Industrial Conglomerates).
PRIM held 1,549,512 shares and had a one-day loss of $1,756,472.71 USD.
The company paid a dividend on May $5^{th}$.
No securities class action lawsuits have been filed against this company in the past year.
The company has not issued stock or rights in the past 36 months, but issued an entitlement (rights offering) of 1 per 10 in 2011.

In some embodiments, notifications of potential claims that occur within a time period (e.g., on the same day) can be batched together and sent to the client (e.g., via email). In other embodiments, notifications can be sent as the potential claims are identified. All the notifications of potential claims can be displayed on the dashboard. Any new or unseen notifications can be identified using a flag or another indicator.

In some embodiments, the CIOR system subscribes to one or more litigation monitoring services to receive information about securities class actions filed in the United States and based on the information, the CIOR system can determine if any of the portfolio securities of a client involved in the securities class action caused the client a loss over a loss threshold. Examples of analyses of losses for portfolio securities associated with securities class actions are provided below. These analyses can be included in a report accessible to the client via the dashboard and/or other communication channels (e.g., email, fax) in some embodiments.

Example 1: PQ Global Markets, Inc.: High Frequency Trading Litigation

Not a stock loss case

Example 2: ABC City Southern (ASU)

On the following dates, Pension Fund X held the number of shares listed and had corresponding losses.

| Date | Shares | Loss ($) |
| --- | --- | --- |
| Jan. 24, 2013 | 58,800 | 1,046,052.00 |
| Feb. 18, 2013 | 52,900 | 226,941.00 |
| Total | | 1,272,993.00 |

ABC City Southern issued stock in April 2010.

Example 3: Life AF, Ltd. (LAF)

On the following dates, Pension Fund X held the number of shares listed and had corresponding losses.

| Date | Shares | Loss ($) |
| --- | --- | --- |
| Dec. 19, 2012 | 87,762 | 452,851.92 |
| Dec. 20, 2012 | 87,762 | 319,453.68 |
| Dec. 21, 2012 | 79,562 | 511,583.66 |
| Jan. 15, 2014 | 34,862 | 49,155.42 |
| Jan. 16, 2014 | 34,862 | 270,180.50 |
| Jan. 23, 2014 | 34,862 | 265,299.82 |
| Apr. 11, 2014 | 30,862 | 258,006.32 |
| Total | | 2,126,531.32 |

Life AF has not issued any stock or rights within the past 36 months.

The company did buyback its own stock in May 2010, July 2012, and February 2013.

Life AF issued $1.15 billion of debt in February 2013.

For foreign securities litigation, the CIOR system can subscribe to one or more foreign litigation monitoring services and perform loss analyses similar to the loss analyses described above for US securities. The CIOR system can then generate a report for the client. An example report can include information identifying the issuer, litigation funding entity, counsel for securities litigation, deadlines for joining the securities litigation, potential claims, a summary of holdings or positions, losses and damages and/or the like. An example report generated by the CIOR system is provided below. The report can be at least partially or fully generated by the CIOR system using a report template by inserting data received from the litigation monitoring service (raw or processed data), input from an advisor associated with the CIOR system, financial data from the custodian data feed, loss and damages calculated by the CIOR system and/or the like.

Example Report

We received notice from XYZ Monitoring Service that Pension Fund X is likely eligible to participate in a proposed class action against ABX Insurance Group Limited in Australia. J. Smith is investigating this class action with the financial support of USAU Litigation Funding Partners Pvt. Ltd ("USAU").

While Pension Fund X suffered substantial losses (over $6 million) in this security, most of its purchases were before the proposed class period and thus Pension Fund X has only a relatively modest interest in the case as proposed. The process for registering for this class action is different than typical class actions. J. Smith requests that investors register online. Institutional investors are not required to provide details of holdings or share transactions and are not required to enter in the agreements as part of the online registration process.

Given the size of Pension Fund X's losses, we propose to press J. Smith to see if the class period can be expanded or whether they may be alternative claims that could be brought on Pension Fund's behalf.

ISIN: AU000000ABX9

Deadline to join: Jun. 13, 2013 (based on our most recent request for an extension from J. Smith).

Class Period: Aug. 20, 2012-Dec. 6, 2012.

Holdings/Positions:
We do not have information about Pension Fund's historical initial position in ABX.

At the beginning of the class period (Aug. 20, 2012), Pension Fund X held 1,520,548 shares (@ $14.63 USD per share). The total value of these holdings was $22,245,617.24 USD.

At the end of the class period (Dec. 5, 2012), Pension Fund X held 1,525,495 shares (@ $14.01 USD). The total value of these holdings was $21,372,184.95 USD. Pension Fund X was a net buyer during the class period.

After the corrective disclosure on December 9, the value of Pension Fund X's 1,525,495 shares dropped to $9.91 USD on Dec. 10, 2012. The total value of these holdings was $15,117,655.45 USD.

Pension Fund X currently holds 1,403,799 shares (@10.41 USD per share). The total value of Pension Fund X's current holdings is $14,613,547.59 USD.

Percentage stock drop:
29.3% stock drop in ABX from end of class period to just after corrective disclosure on December 10.
32.3% stock drop from beginning of class period to December 10.

Losses and Damages:
According to XYZ, Pension Fund X suffered losses of approximately $22,712.46 USD ($24,422 AUD) in losses arising out of its acquisition of 4,947 ABX ordinary shares on Aug. 27, 2012 (during the class period). This figure represents Pension Fund's maximum recoverable damages. (Recoverable damages are losses on shares acquired during the class period).

Between Dec. 5 and Dec. 10, 2012, the value of Pension Fund X's ABX holdings dropped by ~$6.25 million USD following a Dec. 9, 2012 corrective disclosure by ABX. However, these unrecognized losses relate to all of Pension Fund X's holdings, including those acquired BEFORE the class period. (The value of Pension Fund X's holdings dropped ~$7.13 million USD from the beginning of the class period to December 10).

Based on the value of Pension Fund X's holdings from the beginning of the class period (Aug. 20, 2012) to present (May 20, 2013), Pension Fund X has suffered a Net Loss of $7,632,069.65 USD. Please note that this figure does NOT take into account losses or gains due to Pension Fund X's buying or selling shares of ABX. This figure only represents net loss of the value of Pension Fund X's holdings in ABX from Aug. 20, 2012-May 20, 2013.

As described above, the CIOR system can, in some embodiments, perform active case monitoring and claim valuation. For domestic cases, the CIOR system can calculate maximum recoverable damages using a suitable methodology (e.g., the NAPPA damages model, which calculates maximum damages recovery) using transactional data from the custodian or another party (e.g., claims filing agent). One example method of calculating maximum recoverable damages using the NAPPA damages model is provided below:

1. If there are holdings at the start of the class period, the holdings are valued at the closing price the day before the first day of the class period (i.e., the date the fraud is presumed to first affect the market's valuation of the security).
2. As sales occur during the class period, the sales are matched against the initial holdings until all the initial holdings have been "depleted". Gain or loss on these sales is determined by comparing the sales price to the valuation set in step one.
3. If there are subsequent sales during the class period, the subsequent sales are matched against buys during the class period on a FIFO basis, calculating gain or loss.
4. If there are holdings at the end of the class period, they are valued at the PSLRA (Private Securities Litigation Reform Act) "cap" price, and matched against buys on a FIFO basis, to determine unrecognized losses. (If there were initial holdings, but neither buys nor sales, there are no losses.)
5. The amounts calculated in steps 2-4 are summed to establish a proxy for the maximum amount the fund (e.g., pension fund) might expect to recover at the end of the case.

Another method of calculating maximum recoverable damages using the NAPPA damages model is provided below:

1. If there are holdings at the start of the class period, and there are sales during the class period, the holdings are "depleted" by the sales until they are all matched. No gain or loss is calculated.

In some embodiments, FIFO and LIFO losses can be calculated as follows:

A. All trade data is loaded and normalized in a database.
B. The system automatically identifies eligibility against all ongoing class action lawsuit, based on trading history.
C. Based on the results of step B, the system automatically runs the "Buy-Sell-Match" program for each lawsuit in which eligibility has been determined. This program matches purchases and sales of securities and is a necessary step before losses can be calculated. This program can be run twice, once each for both FIFO and LIFO.
D. Trading Loss calculations will be performed against the "Buy-Sell-Match" records created in step C. In general, applicable losses are limited to Buy-Sell-Match records for which the purchase occurs during the class period. For each Buy-Sell-Match record, the loss is equal to the difference between the purchase and sale prices multiplied by the quantity of shares. In the event that the shares were held past the end of the 90-day PSLRA look-back period, however, a holding price will be substituted for the actual sale price.
E. The system generates a report comparing FIFO/LIFO losses for each case-account combination for which eligibility was determined.

The CIOR system can also calculate maximum recoverable damages on an aggregated and disaggregated basis. The calculated damages can be displayed on the client dashboard. The client dashboard can also track and display notice of case developments, case decision deadlines such as statute of limitations deadlines, class representative selection/group action joinder deadlines, opt out deadlines, statute of repose deadlines, settlement objection deadlines and/or the like allowing clients to access all relevant information from a centralized location.

In some embodiments, the CIOR system can generate asset recovery reports that can be accessed via the client dashboard and can be additionally delivered as an alert to clients. Examples of asset recovery reports can include a notice of settlement/right to recover. The CIOR system can calculate an increased recognized loss over baseline and generate a pipeline report. The pipeline report can include information such as a case name, settlement fund, claim deadline, opt out date, estimated pay date, market loss (e.g., FIFO), disaggregate RL, aggregate RL, pro-rata settlement shares, filing method, filed date, claim status and/or the like. The CIOR system can also generate notice of claims submissions, notice of recovery (e.g., including calculation of increased recovery over baseline) and/or other periodic reports.

Figure 6:
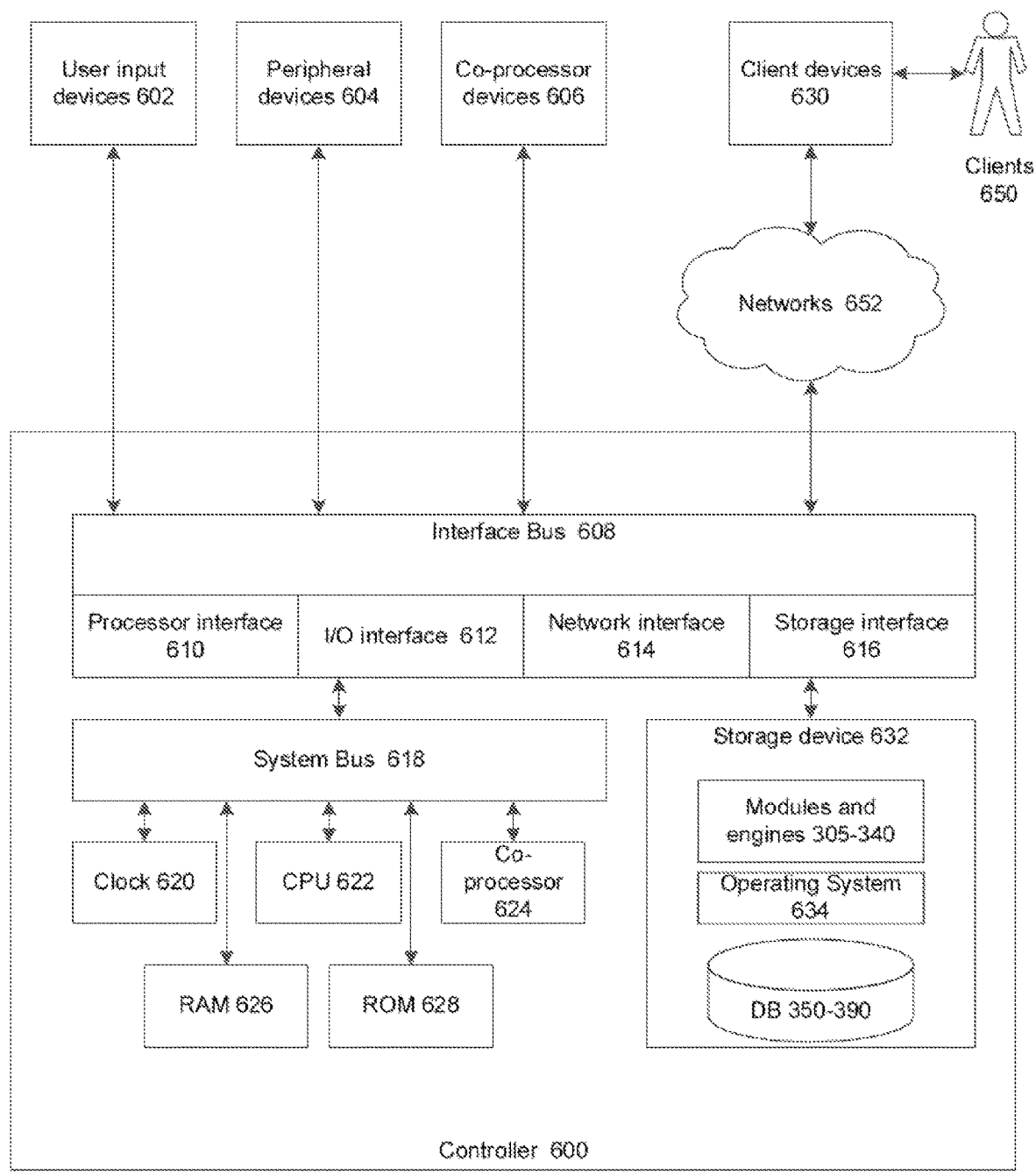
FIG. 6 depicts a block diagram of an example machine implementing the system for securities claims identification, optimization and recovery.

FIG. 6 depicts a block diagram of an example machine or controller 600 in the form of a computer system within which a set of instructions for causing the machine to perform one or more of the methodologies described herein can be executed.

The machine 600 is intended to illustrate a hardware device on which any of the components depicted in the example FIGS. 1, 2 and 3 (and any other component described in this application such as client computer system 120A-N, the CIOR system 110, the CIOR system 300) can be implemented. The machine 600 can be in communication with entities including one or more users (e.g., clients 650), client/terminal devices 630, user input devices 602, peripheral devices 604, an optional co-processor device(s) (e.g., cryptographic processor devices) 606, and networks 110. Users can engage with controller 600 via client devices 630 over networks 652.

Computers employ central processing unit (CPU) or processor (hereinafter "processor") to process information. Processors can include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components can be implemented in software, hardware or both hardware and software. Processors pass instructions (e.g., operational and data instructions) to enable various operations.

The controller 600 can include clock 620, CPU 622, memory such as read only memory (ROM) 628 and random access memory (RAM) 626 and co-processor 624 among others. These controller components can be connected to a system bus 618, and through the system bus 618 to an interface bus 608. Further, user input devices 602, peripheral devices 604, co-processor devices 606, and the like, can be connected through the interface bus 608 to the system bus 618. The Interface bus 608 can be connected to a number of interface adapters such as processor interface 610, input output interfaces (I/O) 612, network interfaces 614, storage interfaces 616, and the like.

Processor interface 610 can facilitate communication between co-processor devices 606 and co-processor 624. In one implementation, processor interface 610 can expedite encryption and decryption of requests or data. Input Output interfaces (I/O) 612 facilitate communication between user input devices 602, peripheral devices 604, co-processor devices 606, and/or the like and components of the controller 600 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 614 can be in communication with the network. Through the network, the controller 600 can be accessible to remote client devices 630. Network interfaces 614 can use various wired and wireless connection protocols such as, direct connect, Ethernet, wireless connection such as IEEE 802.11a-x, and the like. Examples of network 652 include the Internet, Local Area Network (LAN), Metropolitan Area Network (MAN), a Wide Area Network (WAN), wireless network (e.g., using Wireless Application Protocol WAP), a secured custom connection, and the like. The network interfaces 614 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 616 can be in communication with a number of storage devices such as, storage devices 632, removable disc devices, and the like. The storage interfaces 616 can use various connection protocols such as Serial Advanced Technology Attachment (SATA), IEEE 1394, Ethernet, Universal Serial Bus (USB), and the like.

User input devices 602 and peripheral devices 604 can be connected to I/O interface 612 and potentially other interfaces, buses and/or components. User input devices 602 can include card readers, finger print readers, joysticks, keyboards, microphones, mouse, remote controls, retina readers, touch screens, sensors, and/or the like. Peripheral devices 604 can include antenna, audio devices (e.g., microphone, speakers, etc.), cameras, external processors, communication devices, radio frequency identifiers (RFIDs), scanners, printers, storage devices, transceivers, and/or the like. Co-processor devices 606 can be connected to the controller 600 through interface bus 608, and can include microcontrollers, processors, interfaces or other devices.

Computer executable instructions and data can be stored in memory (e.g., registers, cache memory, random access memory, flash, etc.) which is accessible by processors. These stored instruction codes (e.g., programs) can engage the processor components, motherboard and/or other system components to perform desired operations. The controller 600 can employ various forms of memory including on-chip CPU memory (e.g., registers), RAM 626, ROM 628, and storage devices 632. Storage devices 632 can employ any number of tangible, non-transitory storage devices or systems such as fixed or removable magnetic disk drive, an optical drive, solid state memory devices and other processor-readable storage media. Computer-executable instructions stored in the memory can include the system 300 having one or more program modules such as routines, programs, objects, components, data structures, and so on that perform particular tasks or implement particular abstract data types. For example, the memory can contain operating system (OS) component 634, program modules and other components (e.g., 305-345 in FIG. 3), database tables 350-395 (in FIG. 3), and the like. These modules/components can be stored and accessed from the storage devices, including from external storage devices accessible through an interface bus.

The database components 350-395 are stored programs executed by the processor to process the stored data. The database components can be implemented in the form of a database that is relational, scalable and secure. Examples of such database include DB2, MySQL, Oracle, Sybase, and the like. Alternatively, the database can be implemented using various standard data-structures, such as an array, hash, list, structured, structured text file (e.g., XML), table, and/or the like. Such data-structures can be stored in memory and/or in structured files.

The controller 600 can be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines can be located in both local and remote memory storage devices. Distributed computing can be employed to load balance and/or aggregate resources for processing. Alternatively, aspects of the controller 600 can be distributed electronically over the Internet or over other networks (including wireless networks). Those skilled in the relevant art will recognize that portions of the CIOR system (e.g., CIOR system 110, 300) can reside on a server computer, while corresponding portions reside on a client computer. Data structures and transmission of data particular to aspects of the controller 600 are also encompassed within the scope of the embodiments disclosed herein.

The CIOR Marketplace is an additional tool of the CIOR that may be used to support clients with exposure to securities class action cases (or similar legal matters, including international legal matters). The CIOR Marketplace may allow clients an alternative opportunity to recover partial financial compensation for damages related to various securities class action (or similar) cases, and may provide clients a more immediate way to monetize claims or potential claims in securities litigations without the delay of the traditional process. As an additional tool, the CIOR Marketplace may allow strategic management of a client's portfolio of securities class action "assets" and make sure that related assets are allocated to the most advantageous opportunities (i.e. sell high risk claims to fund litigations in better opportunities).

The CIOR Marketplace may also benefit other institutions or individuals who may not currently have a formal business relationship with the CIOR Marketplace. The CIOR Marketplace may offer non-client investors an opportunity to participate and reap the same or similar benefits (as CIOR Marketplace clients). Furthermore, it may offer speculative buyers an opportunity to purchase an asset type (claims or similar) that is not typically available (except via private solicitation), but which may potentially produce investment returns appropriate for that buyer and its risk profile.

The CIOR Marketplace may be an online marketplace/exchange where investors can offer claims (or similar) for sale, and buyers could purchase such assets. The various members of this marketplace may be able to specifically control how offerings are made available, publicly or privately, in order to support their fiduciary responsibility, or conversely, meet requirements for privacy. The CIOR Marketplace may support different types of transactions such as basic auctions, sealed bid auctions, minimum price auctions, fixed price sales, etc. The CIOR Marketplace may function in a similar manner as other known online markets such as eBay™ ticket brokers, and the like. Benefits of the CIOR Marketplace may include, but are not limited to:
  To the seller:
    Access to broader market
    Maximize transactional return
    Immediate monetization (instead of delayed or unknown)
    Efficient transactions facilitated by the CIOR Marketplace (automated payments)
    Do not need to know potential buyers
  To the buyer:
    Increased visibility into dimensions of a claim to support valuation
    Auction bids prevent over bidding on blind auctions
    Clear understanding of commitment to support any potential rejection response
  To both seller and buyer:
    Fast efficient transaction closing, including remuneration
    Clear understanding of terms
      Market will provide standard terms and conditions
      Allow custom terms and conditions Some terms, as used herein, are defined and/or described strictly for informational purposes and are to be read as non-limiting, but rather provide at least one example of meaning as background:
  Securities class action (SCA): Refers to a securities class action filed in the US. This term may also be used generically to represent a group litigation or similar action outside of the US.
  Claim: The actual participation in a settled SCA and/or pending settlement. Typically requires submitting a completed claim form to a claim administrator along with the required documentation.
    "Claim" may be used generically to represent a claim or similar rights. In that case the term may relate to a claim on a settled case or pending settlement, a fraction of a claim, a claim unit, or some other monetary unit or right relating to a financial disbursement, settlement or distribution, rights to submit a future claim in a filed or settled case, or rights to submit a claim or take similar legal action in the future should a case be filed related to a specifically defined securities transaction or group of transactions.
    The term is intended to broadly cover all venues and in addition to referencing a filing in a US SCA case, it can also connote participation in non-US group litigation matters or similar. It is not intended to limit the scope of an offering or potential offering unless specifically defined as such.
    Furthermore, the term may be used generically to represent the rights to recoup any damages via any recognized negotiation or legal action (e.g., private action)
  Claim statuses:
    US SCA cases typically proceed through four statuses:
      Pre-filed (loss, but no case filed yet).
      Filed (case has been filed with a court).
      Settled (a settlement between the class and the defendant entity has been reached and (usually) rules for distribution of a settlement pool to the class have been defined).
      Disbursed (a claim administrator has distributed to all eligible members of the class according to the rules set forth in the allocation plan).
  Allocation plan: Rules that define how to quantify damages for each individual member of a class who submits a claim. Allocation plans are usually unique to a specific case and the rules for calculating damages are also usually unique. The two most common loss metrics are:
    Recognized loss (RL): The most common damage calculation. RL is usually based on a formulaic calculation of an investor's actual trading history.
    Damaged shares (or similar term): In these cases (such as merger and acquisition-based SCA cases), losses are based on holdings as of a particular date.
  Investor: Any entity or individual who actually transacted securities trades in the affiliated security/stock.
    This entity will typically become the seller of a claim in the CIOR Marketplace.
    Alternatively, an investor may also choose to buy claims from other sellers if it believes the investment is worthwhile.
  Client: Refers to an entity that has a formal relationship with the CIOR Marketplace for the purpose of analyzing and optimizing the client's return on claims arising from its global portfolios.
  Member: A known participant in the CIOR Marketplace. A member may be an entity or individual who has registered with the CIOR Marketplace. A member may be an individual, but would typically be an entity such as a pension fund, hedge fund, or other investment institution.
    Membership in the CIOR Marketplace may require application and approval or otherwise be limited by the CIOR Marketplace.
    The CIOR Marketplace may offer multiple levels of membership with a premium membership offering more tools, or other preferential treatment, to the member.
  User: Refers to the actual individual interacting with the CIOR Marketplace
  Offering: The transaction of placing a claim (or similar) in the CIOR Marketplace. Typically, an offering is at the claim-level; meaning the intersection of a loss arising from an investor's portfolio and a potential or actual SCA case.
    Alternatively, an offering may be a group of claims or rights. There is no limit on how a seller might group those claims (i.e. by case, account, or in entirety).
  Seller: Refers to a CIOR Marketplace member who offers a claim on a settled case, rights to submit a future claim in a filed or settled case, or rights to submit a claim or take similar legal action in the future should a case be filed related to a specifically defined securities transaction or group of transactions.
    A seller will typically be the investor, but is not limited to being the investor (as in the case of a re-sale of a claim).

Buyer: Refers to a CIOR Marketplace member who seeks to buy claims through offerings on the CIOR Marketplace. Typically, the buyer would financially compensate the seller upon purchase of the offering.

Other terms:
  Start and end date: The period of time by which a claim is calculated to reflect the artificial inflation of a security price, the end of which is marked by curative information becoming public and thereby causing the security's price to decline.
  Non-US case names and terms.

In embodiments, the CIOR Marketplace may create a centralized market where an investor can offer claims or similar rights to a broader audience of potential buyers. The CIOR Marketplace may allow a seller to selectively offer:
  A single claim filed for one account in one case.
  Rights to file claim in a single account.
  Multiple filed claims:
    Spanning single legal entity.
    Spanning multiple individual unrelated portfolios.
  Rights to file a claim in a settled SCA case (when such claim has yet to be submitted).
  Rights to file a claim in a filed SCA case (where the seller has a relevant transaction history, but the case has not settled yet).
  Rights to file claims in future (unfiled) SCA cases if such a case is filed (this is typically done when selling all rights for an account or portfolio as when closing/liquidating a fund).
  Or some combination of the above by individual account, grouping of accounts, entire portfolio, or subset defined by security or other possible distinctions.

The CIOR Marketplace may allow a seller to limit an offering to a specific buyer or group of buyers, or offer to all members of the marketplace.

The CIOR Marketplace may allow a buyer to search for offerings from specific sellers, or related to specific cases, and allow a more efficient economic transaction.

The CIOR Marketplace may support an optimized/maximized return for the seller by assuring that more interested buyers are aware of the offering and have the opportunity to bid in a competitive manner, and allow a seller to determine the economic nature of the sale of the claim, including but not limited to a standard auction, minimum bid, fixed price, sealed bid auctions, and the like.

The CIOR Marketplace may allow sellers to improve the value of claims by providing a more comprehensive and transparent view of the overall claim, including providing access to associated documentation (typically the more accurate the documentation, the greater the claim quality), including but limited to trade histories, claim metadata (administration identification numbers, filing dates, etc.), correspondence with a claim administrator, custodian or broker reports to substantiate the validity/accuracy of the trades. The CIOR Marketplace may also provide a clear explanation of investor viability and willingness to support any response necessary in the event of a claim rejection or other event, including for example potential warranties and potential redress for rejection in the event that a seller fails to fulfill an obligation.

In embodiments, the CIOR Marketplace may provide enhanced tools to support the valuation of the offerings. These may be provided to all members, or offered as part of a premium membership. Such enhanced tools may include, but are not limited to, recognized loss calculations for the specific claim in settled cases with published allocation plans, additional proprietary research that may indicate historic trends, such as industry metrics and historic analysis by, for example, industry, claim administrator, and/or law firms involved in a class action. The CIOR Marketplace may provide central access to related materials if available, such as corporate reports (valuable in cases not yet settled if they disclose comments about insurance or other indications of planning for settlement fund). For non-US cases, there may be other relevant information that may have value to buyers. Examples may include, but are not limited to, country/jurisdiction rules or summaries thereof and information about litigation funder. The CIOR Marketplace may support the sale of more than one claim in a single case from a single legal entity such that the resultant claim can be filed (or existing claim can be modified) to most advantageously reflect transactions in order to optimize RL. This may be accomplished in part by properly reflecting the actual cost basis of trade lots associated with free transfers (and otherwise carrying a zero cost basis)—by performing transfer process, and/or by optionally aggregating multiple accounts into a single aggregated filing for a single legal entity whose trades in the stock may have occurred over multiple accounts.

In embodiments, the CIOR Marketplace may provide clear terms and conditions for all participants and relevant transactions. Alternatively, the Marketplace may allow and support the specification of distinct terms and conditions for a given offering. The CIOR Marketplace may provide clarity for the financial settlement of the Sale Transaction, and provide tools to facilitate monetary transfer in support of transaction settlement (i.e., ACH payment, wire transfer, SWIFT or other appropriate funds transfer). The CIOR Marketplace may store a permanent history of the offering, sale, and all related materials in the event that such information is needed at a later date for an audit, data loss replacement, or dispute resolution, provide easy access to history of member transactions for reporting and analytics, and/or otherwise facilitate a much more efficient transfer of claims or rights related to securities class action cases than is currently available without such a CIOR Marketplace.

The current/typical lifecycle for a claim in a US securities class action case may follow steps generally corresponding to the following:
  1. Investor purchases securities in an entity on a public market with the intent to achieve capital gains on the investment.
  2. Entity error, fraud or malfeasance becomes public and the value of the entity's stock declines.
  3. An investor (or group of investors) financially harmed by decline in stock value, files a SCA suit (or more than one suit) against the entity and (sometimes) its leadership and affiliates, like accountants and investment bankers (each individual suit defines a start and end date).
  4. Prior to specified dates in each suit other investors may consider joining the SCA, seeking to be active as lead plaintiff, or taking other action such as private group action.
  5. During the pendency of some suits, the investors will have decisions to make with respect to opting out of an SCA to bring a separate action.
  6. Parties reach a settlement agreement that involves some financial compensation to the class. Terms of the settlement typically include:
     a. The financial pool to be distributed amongst the investors known as the settlement funds.
     b. The rules for investors to file a claim.

c. The rules for allocation of settlement funds, known as the allocation plan, are agreed upon and made public. The allocation plan includes rules for calculating recognized loss as the damages metric used in allocation of the settlement funds.

d. Appointment of a claim administrator to manage the claim filing process, accept claims, validate claims, calculate each investor's rights to recover against the settlement fund, and manage disbursement.

7. Investor files a claim with a claim administrator along with any required supporting documentation (typically a history of stock holdings and transactions across a specified period) according to the rules specified in the settlement's allocation plan.

8. A claim administrator processes the submitted claim, validates the claim and the accompanying documentation and issues the claimant (the investor) a claim number. Optionally, the claim administrator may request additional documentation such as trade confirmations to verify the securities trading history (and support the claim).

9. After management of the entire claim submission process, the claim administrator will sum all of the amounts of the rights to recover or recognized loss submitted by investors to determine the total recognized loss for all investors filing a claim. Using that total, the claim administrator will calculate every claimant's pro rata portion of settlement fund.

10. The claim administrator will disburse payments for all eligible claims according to each claim's pro rata portion of the settlement funds (after net of expenses and holdbacks). Optionally, the claim administrator may choose to withhold a certain portion of the total settlement pool for "second disbursements" or for redress of any errors or problems during process.

The following outlines a list of key considerations in understanding the typical SCA process: In most suits, each investor is compensated based upon their pro rata portion of recognized loss (as defined by the allocation plan) relative to the total recognized loss of all claims filed and accepted. The majority of cases use "recognized loss" as the metric for measuring damages. The pro rata is the calculated as the ratio of net settlement fund divided by total recognized loss for all accepted claims. An investor's settlement payment is typically calculated by multiplying the pro rata by the investor's individual recognized loss. This is the same as dividing the individual investor's RL by the total RL and multiplying by the net settlement funds. Many factors may influence the ultimate settlement payment made to an investor, including their own recognized loss, which can be impacted by, for example, holdings prior to the period, timing and volume of stock purchases during the class period, timing and volume of sales during the class period, holdings at the end of the period (and occasionally sales afterward), and resultant capital gains or losses as a result of those transaction histories. Trading in stock options may also impact recognized loss calculations. For investors who use multiple accounts under a single legal entity or EIN, the following factors may influence the calculation of damages: The existence of stock transfers amongst accounts via free delivers and free receives. (Since these transactions usually use a zero cost basis, they can obviate gain/loss calculations for associated trading lots), and whether an investor files claims for each of its qualifying accounts with trades in the stock, or whether it aggregates all of those trades into a single claim. The ultimate settlement payment made to an investor may be further impacted by the overall "quality" of the claim, including factors such as whether the trading history is complete and accurate, if the trading history can be substantiated by custodian records and reports if asked to verify, if the investor and its agents are still in existence and able to respond to inquiries from a claim administrator, if the claim has been accepted by the claim administrator, and/or if there are any rejections or requests for information been issued by the claim administrator. The ultimate settlement payment made to an investor may be further impacted by the collective aggregate damages of the investors, which can in turn be impacted by the number of claimants filing claims (with each individual claimant's claim similarly impacted by the factors described above), as well as the overall volume and claimed recognized loss of claims permanently rejected by claim administrator. The ultimate settlement payment made to an investor may be further impacted by the total value of settlement fund. Since these funds are usually provided by the entity, the amount of can greatly be impacted by the entity's fiscal health and numerous other factors, including, without limitation:

Solvency of the entity at the time of settlement.

The entity's ability to continue in its normal course of business.

Other legal consequences associated with, or related to, the events that provoked the SCA.

The entity's insurance coverage.

Relative financial damage caused to all parties (how great were the losses).

Subsequent recovery of the entity's stock price and overall market capitalization.

Relative level and date range of alleged fraud (versus unintentional errors).

Relative comparison to similar previous class actions.

Class, and lead plaintiffs' interest in future success of the entity.

The ultimate settlement payment made to an investor may be further impacted by administrative and legal costs netted from the settlement fund, as well as any funds held back for second disbursement or redress of specific claimant issues. Legal fees may vary for each case and can substantively reduce net settlement funds in certain cases.

Cumulatively, the above listed factors impacting a settlement payment may cause uncertainty in predicting the ultimate claim payment amounts in a typical class action settlement. Prior to settlement, an investor's entitlement to recovery cannot be calculated until a plan of allocation is written at the time of settlement. Although recognized loss calculations frequently correlate to market losses on securities purchased during the period that the market in the entity's securities was allegedly inflated due to fraud, they are rarely defined as simply as market loss. Further, the settlement fund is not disclosed until settlement. After settlement it may be impossible to know the collective recognized loss of all investors because those amounts are based on each investor's own unique trading history. It may be impossible to know how many eligible claimants will actually file a claim. Less impactful, but also relevant are the unknown nature, quality, and volume of rejections and their impact on the overall damages total. SCA cases typically take months and usually years from filing through complete disbursement and the specific timeframes are nearly impossible to predict given the multitude of factors. This creates uncertainty as to when an investor will be able to recoup any damages. The longer the delay, the lower the present value of the claim at filing and settlement dates.

In a typical SCA lifecycle, the investor cannot recoup any recovery until the entire lifecycle has played out (and the settlement funds have been disbursed by the administrator). An investor's claim in a specific SCA can be transferred to another party. This transfer is typically made as a sale of the claim in exchange for financial consideration from the purchaser. In most suits, an investor can also sell the rights to participate in a settled SCA (prior to investor filing an actual claim), the rights to participate in a future settlement for a case in filing, the rights to participate in future unfiled SCA cases based upon the trading history of a specific stock, and/or the rights to participate in future unfiled SCA cases based upon the trading history of all stocks in a portfolio or account. There is no current formal or organized marketplace for the exchange of SCA claims, or rights to file a claim, (or similar international rights), such transactions have typically been made between private parties after direct solicitation by one of the parties. As with most markets, the financial terms of the transaction are based upon an agreement between the buyer and seller on the relative value of the claim. The tremendous uncertainty previously discussed makes valuation of the claim very difficult and the uncertainty of timing makes calculation of present value uncertain. This creates a speculative transaction.

Currently, a seller can only offer SCA claims to potential buyers that it, or its agents, currently knows. There is no mechanism for offering claims for sale to a broader market or audience of sellers. There is not even a reasonable locale for advertising such an offering to potential buyers. Claim payments are typically paid to the entire group of investors at the same time. Claim payments are rarely disbursed at different cycles to different claimants. This means that every claimant must wait for the claim administrator to complete the administration of the process. This usually takes months to years depending on the size/scope of the class and the complexity of the case, as well as other factors. Large, complex SCA cases can take many years from claim filing to disbursement, and longer from case filing to disbursement. The entire class typically must wait until all claims are validated and accepted by the claim administrator. A filing period may be referred to as a claim administration period. The process might require certification by the court because, for example, the court may certify the group of investors that are entitled to receive a share of the settlement fund and then approve the plan of allocation by which those investors are paid.

The following example embodiment lists potential steps involved in CIOR Marketplace usage and assumes that a client has been advised to file a claim in a settled US SCA case after a thorough analysis of the client's options. This example then assumes that the client, in conjunction with the CIOR Marketplace, has decided to offer that claim for sale at some point in time after filing claim:

1. The CIOR client/investor purchases securities in an entity on a public market for long term investment purposes.
2. Entity error, fraud or malfeasance becomes public and the value of the entity's stock declines.
3. The CIOR Marketplace identifies the impact to client portfolio (this may include, but is not limited to identifying portfolio losses, calculating and publishing those losses for reporting to the client. The CIOR Marketplace may combine the identification of curative information coming into the public domain with the impact on portfolio holdings for the purposes of early identification and developing remediation strategies).
4. An investor (or group of investors) financially harmed by the disclosure of the entity error, fraud or malfeasance ("curative disclosure") and its associated impact on the entity's stock value, files a SCA suit (or more than one suit) against the entity and (sometimes) its leadership.
5. The CIOR Marketplace identifies the impact to investor portfolios, that a new SCA case has been filed and researches the clients' trading history to determine if the client was impacted by the curative disclosure event.
6. The CIOR Marketplace performs a thorough analysis of the facts associated with this case, including:
   a. Case filings.
   b. Client trading histories.
   c. Client trading in other entity securities such as preferred stock or corporate bonds.
   d. A client investor's business relationship with an entity (i.e. does the investor or its parent do business with an entity or otherwise have a commercial relationship?).
   e. General market factors.
   f. Curative disclosure(s).
   g. Entity financial state.
   h. Prior entity SCA cases.
   i. Case factors (e.g., inflated market periods, counsel, lead plaintiff, etc.).
   j. Historic trends in SCA, particularly in similar industries and entities.
   k. Entity insurance, solvency and other factors that may impact the likely settlement fund.
7. Based on that Analysis, the CIOR Marketplace may counsel/advise a client investor on the appropriate action to take. Possible actions to take include, but are not limited to:
   a. File its own SCA.
   b. Involve itself in an existing SCA case in order to:
      i. Attempt to become lead plaintiff in an existing case.
      ii. Influence the change of the class period so that it benefits the client.
      iii. Influence other factors in the case such as appointment of class counsel and fee agreements that are cost inputs to total value of group recovery.
   c. Take a private action.
   d. Take no additional action and plan to participate as a group investor member.
   e. An investor may actively support the defendant in SCA, but this is highly unlikely.
   f. Given a significant business relationship with an entity, client and the CIOR Marketplace may determine that appearance of litigation may be counter to commercial interests (and that the best course of action is to sell rights to the claim).
   g. Take no action, including claim filing (typically rare, example may be if filing exposed proprietary trading program or otherwise compromised the investor).
   h. Additional non-US matter actions:
      i. Agree to participate in or select among group litigation option(s).
      ii. Negotiate terms with the litigation funders.
      iii. Solicit competitive litigation funders or other parties to join case.
      iv. Advise on risk mitigation tactics for joinder in non-US matter actions.
8. This example embodiment assumes that the CIOR has ultimately advised the client investor to participate as a normal class member (and consider selling claim rights at a later point).

9. The SCA parties reach a settlement agreement that involves some financial compensation to the class. Terms of the settlement may include:
   a. Settlement fund.
   b. Rules for claim submission.
   c. Allocation plan.
10. The investor (or its agent) files a claim in a SCA case by submitting claim and transactions history to a claim administrator.

In an alternate embodiment, the following example lists potential steps involved in CIOR Marketplace usage:
1. An investor determines that its preference for liquidity on the claim is immediate rather than to wait for recovery through continued litigation process.
2. The investor offers the claim for sale on the CIOR Marketplace:
   a. Specifies the case.
   b. Provides the trading history.
   c. Provides associated documents (e.g., cover letter, spreadsheet, etc.).
   d. Provides claim metadata (e.g., filing number, dates, filing agent, etc.).
   e. Optionally provides custodian reports or trade confirmations.
3. The investor determines if this offering should be limited to a specific audience or available to all members.
4. A seller defines terms:
   a. Auction method.
   b. Auction close date.
   c. Minimum bid.
   d. Willingness to support rejection response.
5. Optionally, the seller may define specific terms and conditions associated with this particular offering, or may reference general terms applied to all of its offerings.
6. Buyers are alerted to the offering via a CIOR Marketplace alert (an alert may be sent for each offering, or as part of a periodic list of offerings, depending on member preferences). When a claim is posted on the CIOR Marketplace, there may be an automated notice to the audience to provide visibility for each offering within the terms of the offering:
   a. A CIOR Marketplace alert may be sent to a client device that is associated with a member.
   b. Receipt of the CIOR Marketplace alert at the client device associated with the member may cause the client device to activate. Activation as used herein may include, but is not limited to, waking the client device from a "sleep mode" or other state of battery conservation in which the full functionality of the device (e.g., illumination of the screen) is not activated, including but not limited to activation from an offline state of operation to an online state, where "online" as used here refers to a network connection such as the Internet, intranet (e.g., an enterprise network), a distributed computing network (e.g., a cloud network), a Wi-Fi network, a Bluetooth™ connection, a near field communication network, or some other type of connection.
   c. Activation of the device may include activation of an application or plurality of applications running on the client device, such as a financial, trading, or other application associated with the CIOR Marketplace.
7. Buyers login and navigate to the offering.
8. Buyers analyze the value of the specific offering based on their own proprietary valuation strategy. In the process they may choose to use the following tools or data associated with the offering, including:
   a. Data provided by the seller as part of the offering (e.g., trading history, claim metadata, etc.).
   b. Research tools about an entity accessed via the CIOR Marketplace site.
   c. Case documentation provided by CIOR Marketplace site including settlement documents, allocation plan, and the like.
   d. Optionally, a buyer membership may include these functionalities:
      i. Basic transactional metrics (e.g., positions before/after period, volume of buys in period, "market loss" as defined by industry, sells in period).
      ii. Recognized loss calculations for the claim calculated by the CIOR Marketplace or its agent and based on the allocation plan.
      iii. Other analytical tools or data provided by the CIOR Marketplace.
9. The buyer decides to attempt to purchase the offering and makes a monetary bid based on its own valuation of the offering.
10. Other buyers may also decide to bid on the offering.
11. The auction plays out to its conclusion depending upon the type of auction selected by the seller and the relative economic interest of the buyers. At its conclusion, an agreement is reached whereby the buyer will compensate the seller for the rights to future settlement payments based on the claim.
12. The CIOR Marketplace may provide a mechanism for documenting and executing an agreement:
   a. May include eSignature or similar execution solution (which might be necessary to make the bid binding).
   b. The CIOR Marketplace maintains a permanent record of the agreement should such ever be necessary for dispute resolution.
13. Buyer pays the seller per the agreement.
   a. Optionally, the CIOR Marketplace provides a mechanism to facilitate that financial transaction (such as ACH payment, wire transfer, SWIFT payment, etc.).
14. If exchange occurs after a claim filing deadline, the buyer and seller may collaborate to notify the claim administrator of the change in claim ownership.
   a. Optionally, the CIOR Marketplace may provide a tool to generate a detailed notification and automatically send to the administrator, such as an email, automated letter generation, text, or some other form of alert or notification.
   b. If a claim administrator allows payee designation to be changed for the claim record, the buyer may receive payment directly upon disbursement.
   c. If the claim administrator does not support change in payee designation, then the buyer and seller will need to negotiate a process for redirecting payment to the buyer.
15. Optionally, the CIOR Marketplace may provide additional tools to support members in management of their transactions as well as reporting for their transactional histories. Examples may include:
   a. Tools to track case statuses for cases affiliated with a buyer's purchases.
   b. Alerts to buyers when the CIOR Marketplace learns of disbursement dates.
   c. Estimated payment amounts if case pro rata and RL are known (probably as a premium service). Tools for evaluating litigation funders and risk mitigation available to support non-US claims.

Additional examples of CIOR Marketplace usage may include, but are not limited to, presenting variations on auction type (e.g., basic auction, basic auction with buy it now, minimum price auction, fixed price, request for sealed bids—usually allows last and final bidding), Additional examples of CIOR Marketplace usage may include, but are not limited to, the inclusion of special terms and conditions (e.g., terms for settlement of the auction transaction and terms for post-sale seller support).

Additional examples of CIOR Marketplace usage may include, but are not limited to, providing a definition of seller support (i.e., confirm requests).

Additional examples of CIOR Marketplace usage may include, but are not limited to, presenting a status of claim, such as selling future rights (not related to a current litigation) by security and/or by portfolio/account/group of accounts, selling future rights for a filed case, selling future rights in a settled case (i.e. claim has not been filed yet), any international distinctions to consider.

Additional examples of CIOR Marketplace usage may include, but are not limited to, presenting seller limitations (e.g., offering open to all members of the CIOR Marketplace or offering limited to specific member(s)).

Additional examples of CIOR Marketplace usage may include, but are not limited to, grouping accounts whereby the CIOR Marketplace may allow the seller to group multiple accounts together for one offering and/or the Marketplace may support a means for the buyer to group multiple accounts into single bid.

The CIOR Marketplace may support multiple levels of service/premium membership.

The CIOR Marketplace may provide claim analytics (i.e., claim metrics, RL, etc.).

The CIOR Marketplace may present variations on claim "ownership" (e.g., claim filed by a buyer, claim filed by a seller, but able to transfer, and/or claim filed by a seller—cannot be transferred).

A plurality of factors may influence an investor to offer a claim, rights, or similar for sale, including but not limited to the following:
  A commercial relationship with an entity (i.e., they do not want to appear to be in litigation against a portfolio entity, customer or partner).
  Desire for short-term returns in lieu of waiting for longer term upside (i.e., sell claims near quarter end to support quarterly performance).
  Liquidation or other act of closing a fund or account.
  Corporate rules or guidance predisposed against participation in litigation.
  The CIOR Marketplace advises that the investor should monetize rights. Reasons may include but are not limited to:
    The CIOR Marketplace analysis reveals that SCA will likely produce poor results, such as:
    Large pool of damaged claimants.
    Financial viability of an entity.
    Legal assessment:
      Issues.
      Venue.
      Counsel.
    Insufficient corporate insurance.
    Uncertainty about non-US venue.
    Opportunity to use proceeds to support other action (i.e., non-US).
    Market interest in specific case.
    Analysis of current transaction in the CIOR Marketplace indicates a disproportionate level of interest in related offerings:
      Case may be driving interest.
      Seller may have a reputation for offering valuable claims.
      A certain buyer may be overly-aggressive.

In embodiments, the CIOR Marketplace may be a web-based application that is accessible via web browser, mobile app, or similar client interface. Data may be stored centrally in a database associated with the application. Alternatively, the CIOR Marketplace application may be setup as a client server application on a proprietary network (e.g., Bloomberg™), and/or operate in conjunction with a plurality of remotely placed databases and other computing architecture, such as a distributed or cloud-based architecture. In embodiments, a variety of current technologies and architectures may be employed to support the CIOR Marketplace. A preferred embodiment may include secure connectivity to all participating members, partners, and partner sites. Participation in the CIOR Marketplace may require membership and authentication of membership to utilize the CIOR Marketplace application. A member may be an individual or a group of associated individuals (such as employees of the same company). Each individual interacting with the CIOR Marketplace may have at least one user record, where each user record may be uniquely associated with a member. The CIOR Marketplace may use unique IDs to identify distinct members and users.

In embodiments, the CIOR Marketplace database(s) may be the repository for most or all data associated with running the CIOR Marketplace application. Examples of objects that may be stored in the database include, but are not limited to:
  Member
  User
  Case
  Account
  Security
  Security transaction history
  Entity
  Offering
  Terms
  Case metadata
  Claim
  Claim metrics
  Marketplace transaction
  Contact information
  Allocation plan rules
  Cost basis lot The CIOR Marketplace may support storage of various files and data associated with a case, an offering, a claim, marketplace transaction, deal terms, or any other relevant object. The CIOR Marketplace may utilize technology to support the closing/settlement of a CIOR Marketplace transaction. Such technology may include, but is not limited to, eSignature for agreement execution, financial solutions to support payment (e.g., ACH payments, wire transfers, SWIFT, blockchain, crypto-currencies, etc.), and automated email to distribute necessary instructions, data, and associated information/files to relevant parties.

The CIOR Marketplace may use data security technologies to protect and/or encrypt any or all communications, to protect data at rest and in transit, and/or to authenticate individual users.

The CIOR Marketplace may support search by case, member (a buyer can search for certain sellers, sellers can search for buyers), or some other factor, and may also support search by recognized loss calculations (i.e., find all offerings with RL>than $100,000).

The CIOR Marketplace application may include, but is not limited to the following elements and pages:
Home page
User login
User profile page
Member profile page
User home page:
  "My Offerings"
  "My Transaction History"
  Search links
  Alerts
Search forms:
  Case search
  Member search
  RL search
Case page
Create offering
Offering detail page
Bid page
Terms page
File maintenance
Alerts
Security:
  Authentication
  Two-factor authentication and login
  Biometrics
  Conditional access levels
    Access level based on title
    Access level based on subscription type
    Access level based on a time duration
Claim administrator page
Processes:
  Send emails
  Calculate claim metrics
  Calculate recognized loss
  Analyze transaction history (cost lots in prep for RL)

Figure 7:
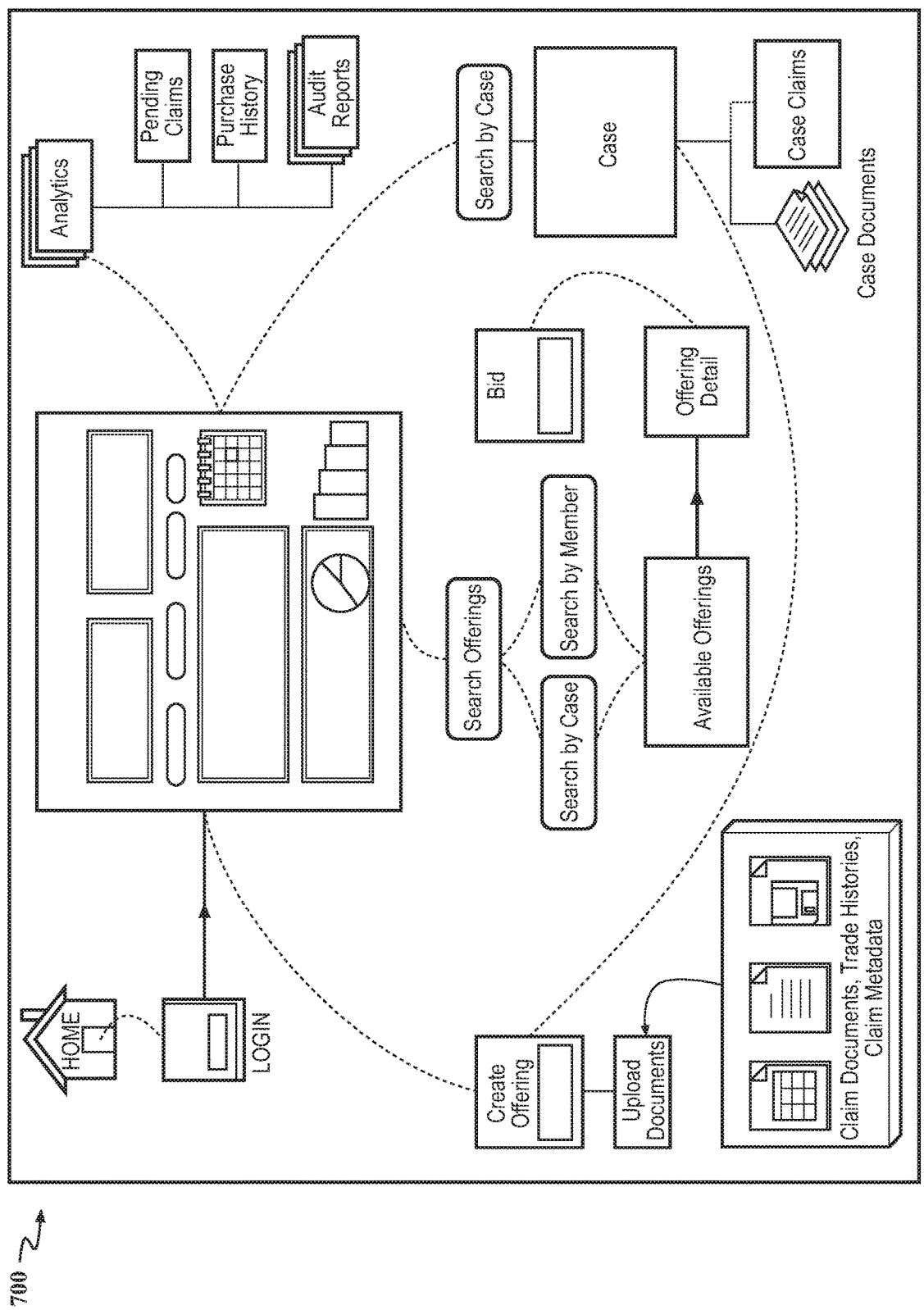
FIG. 7 depicts an embodiment of an architecture for the claims identification, optimization and recovery system marketplace.
Figure 8:
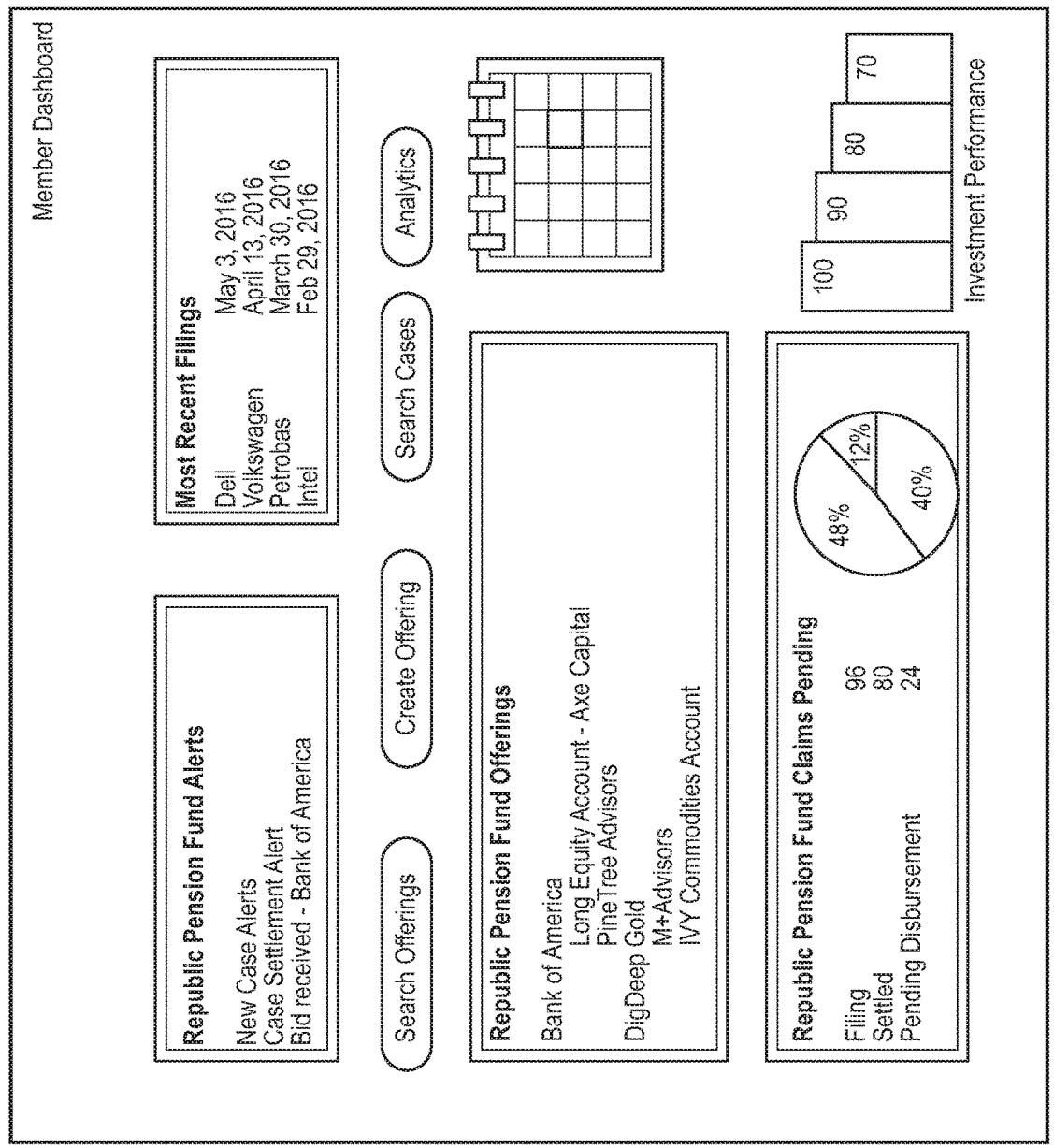
FIG. 8 illustrates an embodiment of a member dashboard layout for the claims identification, optimization and recovery system marketplace.

FIG. 7 provides a simplified illustration of a website embodiment of the CIOR Marketplace and FIG. 8 provides a simplified illustration of a CIOR Marketplace member's dashboard.

Below is a simplified comparison of the current state of the market claims recovery as compared to that of the CIOR Marketplace:

| Current State | CIOR Marketplace |
| --- | --- |
| An investor/seller must know potential buyer(s) and must solicit a bid from them by direct contact | An investor/seller does not need to know any buyers and can offer claim for sale merely by placing claim (or similar) in the CIOR Marketplace. A seller can make offering to the entire universe of CIOR Marketplace members, or can limit the offering to just specific members. A seller does not need to contact any buyers directly. |
| A seller is typically forced to accept bids at the bid price offered by the buyer or the limited pool of buyers. | The open marketplace and access to many buyers assures that seller offer is subject to competitive bidding and seller will receive optimum returns for the offering. |
| Sellers must directly contact buyers each/every time they decide to pursue the sale of a claim. | The CIOR Marketplace allows sellers to list a claim as an offering any time they decide it's prudent to sell a claim greatly simplifying the offering process. |
| Most current transfer are facilitated as sealed bids, which may cause a buyer to unnecessarily overbid for a claim. | The CIOR Marketplace assures a more efficient and competitive bid process which should result in a more fairly negotiated price for both parties. |
| Parties must wait for responses and communications from each other. | Timelines can be defined so all parties are aware of deadlines and participation in an open bid creates incentive to interact in a timely manner. |
| Rules and terms may be unclear and may need to be written and distributed with each solicitation adding tasks and complexity to each offer. | Standardized CIOR Marketplace rules and terms may be consistently applied to all related sales/auctions. Such terms may be public and easily accessible. Alternatively, specific terms and conditions can optionally be attached to an offering by the seller or a bid by the buyer. |
| No valuation methodology for claims. | Real-time bid and ask valuation from the CIOR Marketplace |

In embodiments, the CIOR Marketplace and system may offer analytics for plan sponsors and fund managers to effectively manage alerts, watch lists and predictions from structured and unstructured data to improve recoveries owed them from securities litigation payouts.

In embodiments, the CIOR system may be used to advise institutional investors with respect to their exposure to recovery rights for securities fraud arising out of their portfolios. The CIOR system may continuously monitor user portfolios for any changes in the price of US and international securities that meet certain criteria of, for example, financial loss in terms of percentage (%) or dollar ($) value. A subset of daily price changes may be caused by curative information coming into the market. The CIOR system may analyze a host of news and other information sources to determine if the cause of a price change is potentially due to securities fraud, or some other causal factor of interest.

A securities fraud lifecycle may comprise the following general stages:

Stage 1—Typical securities fraud, undetected, will generally cause a security to trade at an inflated price compared to its intrinsic value. During this stage, the financial statements of the entity and other public statements may contain clues about the fraud.

Stage 2—As soon as the fraud becomes public through news sources, the entity's security typically suffers a sharp fall in price. Continuous monitoring of a security's price and monitoring of a variety of news sources (e.g., Bloomberg™, Reuters™ and similar third-party providers) that contain such disclosures may be important to determine if the price change is in fact related to fraudulent activity.

Stage 3—Frequently, lawsuits file disclosure regarding the securities fraud and related information, the archives relating to which may be found on public sources such as http://securities.stanford.edu and https://lexmachina.com.

Stage 4—The liquidity events or recoveries from the lawsuits (mitigation) of the securities frauds generally trail disclosure of the fraud by 36 months or more.

By collecting, storing, analyzing and summarizing domestic and international securities that suffered a significant price fall compared to relevant MSCI indices on daily closing prices and by using public news sources, the CIOR system may, for example, identify the top and bottom 10% of securities price falls that are likely caused by securities fraud with an associated level of probability assigned to each security by the CIOR system. Securities fraud may be demonstrated by filing of a lawsuit and sustained underperformance of the stock price relative to associated MSCI index.

In an example of the types of data that may be used by the CIOR system for processing fraud-related analysis, the CIOR system may utilize:

1. A listing of instances of price change from a specified date range of securities that have met a criterion of a specified quantum of price fall. The data points may include entity name, entity ticker and date of price fall. These instances of price fall may involve thousands of unique securities which represent the overall scope of securities belonging to its client portfolio of interest.
2. A listing of fraudulent securities with the dates going back to a specified point in time that signify the date of disclosure of fraud in the media. The disclosure itself or its source may or may not be included.
3. From the foregoing two sources, there may be a common set of fraudulent securities representing some subset of the universe of analyzed securities for the time period of interest.
4. News from Bloomberg™ pertaining to securities on the day of price fall event and, for example, one week prior.
5. Daily closing stock price from Bloomberg™ pertaining to securities on the day of price fall event and, for example, one week prior.
6. MSCI Industry Indices on the day of stock price fall and, for example, one week prior.

The CIOR system may perform cognitive text analytics on such historical news data and stock price reaction to news for both fraudulent as well as non-fraudulent securities. In embodiments, the CIOR system may perform the following analytic steps as part of analyzing a portfolio of securities for the presence of fraudulent activity:

1. Data preparation phase: Gather structured data in the form of, for example, name of security, date of fraud disclosure, daily closing securities prices and unstructured data in the form of news published by Bloomberg™ for a given universe of fraudulent and non-fraudulent securities suffering price fall.
2. Training Dataset and Prediction Dataset: Historical data set may be divided into two sets, for example, a training data set and a prediction data set.
3. Cognitive Analysis: Unstructured text data may be analyzed using cognitive analytics to extract meaningful information such as, for example, entities (e.g., name of security, regulatory authority, name of the court, related parties) keywords (e.g., fraud, police, crime), tone (e.g., joy, anger sadness, fear, disgust) and sentiment (e.g., positive, negative) and key concept (e.g., insider, legal, investigation).
4. ID variable and Target variable: A price fall event represented by a combination of security name and date of price fall may constitute an ID variable. A stock price fall of, for example, 3.9% or more than the relevant MSCI Index which has persisted for 90 days and the filing of a securities fraud lawsuit may be considered as a positive case of securities fraud. An outcome of securities fraud as Y/N may constitute predicted variable.
5. Automated Modelling: The training data set may be used for training the CIOR system to identify patterns in unstructured data and relate it to previously known outcome of fraud and non-fraud cases and build models to arrive at estimates of the probability of fraud.
6. Automated Scoring: Models built using a training data set may be applied to a prediction data set and a probability of fraud may be scored for each record representing a price fall event.

Figure 9A:
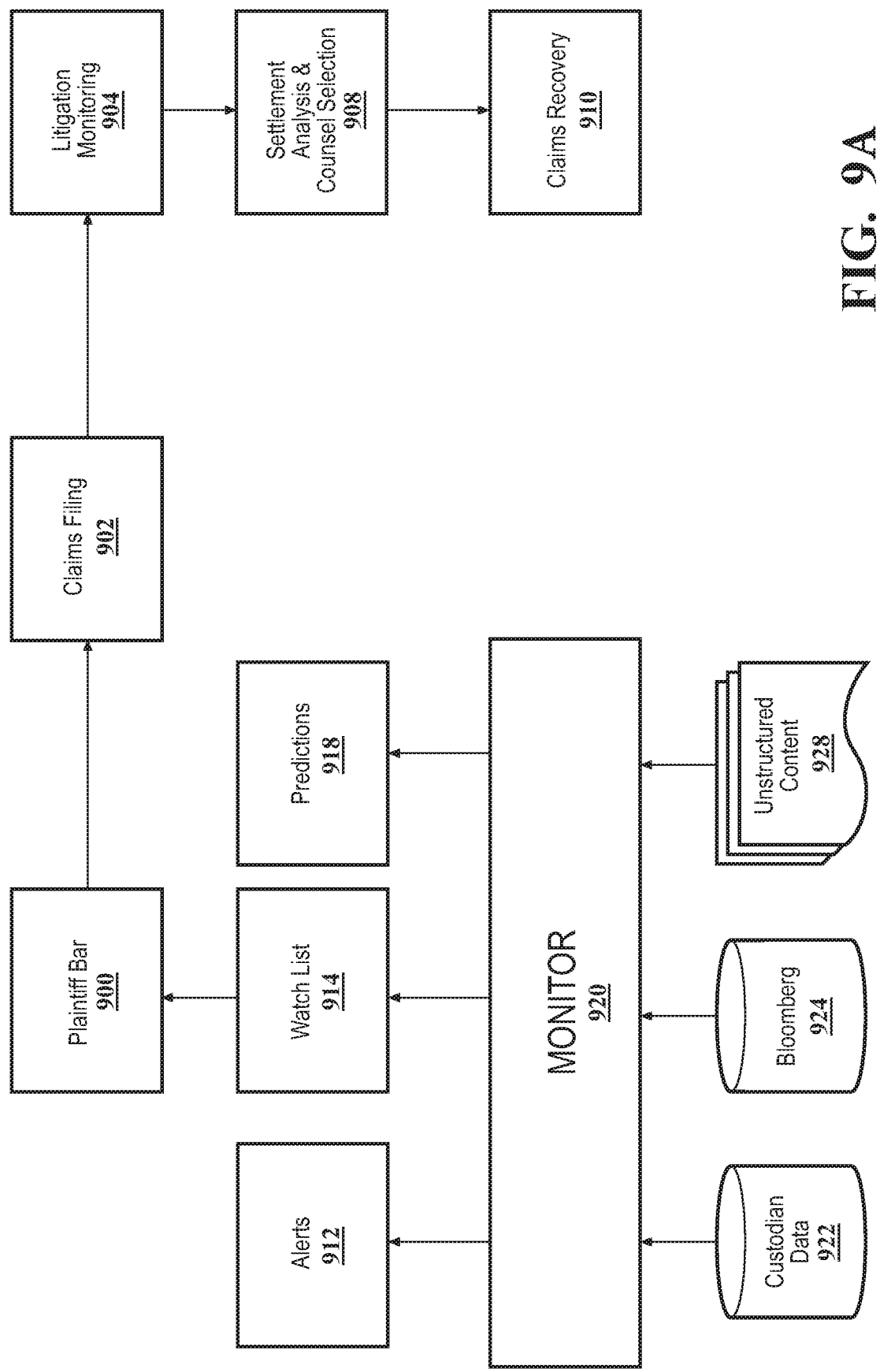
FIGS. 9A and 9B present simplified diagrams of aspects of the analytics platform of the claims identification, optimization and recovery system.
Figure 9B:
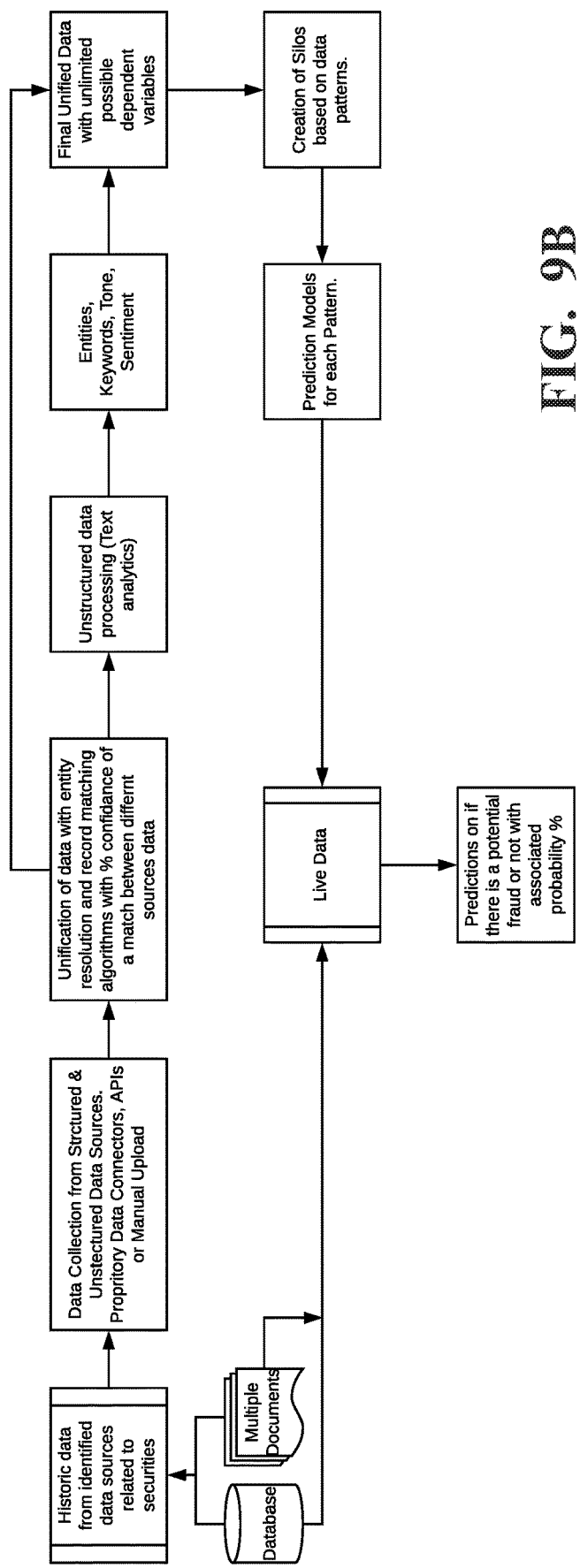

FIGS. 9A and 9B, illustrate aspects that may be included in the CIOR analytics platform. Referring to FIG. 9B, in embodiments, an aggregated dataset may be referred to as a "live" dataset containing data that is iteratively updated, in real time, to contain a live or current view of the data fields of interest. The data fields of interest may be drawn from multiple documents and databases, including without limitation, historical data sources related to, for example, securities information. This data may be collected from a plurality of structured and unstructured data sources, as described herein, through the use of proprietary data connectors, APIs, manual upload or entry, or some other means of data transfer. The unification of the data with records pertaining to entities of interest, and the securities and security data of such entities, may be accomplished through entity resolution, record matching algorithms, or other data merging means and methods to achieve a sufficient confidence rate in data matches among the data sources and entity-specific information obtained (e.g., trading in an entity's securities). Structured and unstructured data may be processed, as described herein, to obtain a reduced data set pertaining to specific data fields of interest, including without limitation, keywords among the unstructured data, the overall tone of the data as indicated by keywords (e.g., skeptical, analytical), the sentiment of the data (e.g., positive or negative), and the presence or lack thereof of reference to an entity name of interest (e.g., "Company X," or "Company Y"). To this aggregated data set that is based on such structured and/or unstructured data, the CIOR system may add metadata, including without limitation, trading data relating to an entity's securities, time data, or some other set of dependent variables. This aggregated data set may be further segregated into "data silos" on the basis of specific queries of interest. This segmentation of the data into silos may reduce the computing time required to accomplish a research or query objective, and the time required to build predictive models. Predictive models, as further described herein, may include, without limitation, predicting a probability value associated with a given security's trading pattern being indicative of fraudulent activity.

1. Data Integration: To manage equity portfolio, assets, securities fraud litigation and related payouts, fund managers need to look in multiple silos of data. With the increase in unstructured data (e.g., blogs, reports, tweets, social media posts etc.). The CIOR analytics platform integrates different silo and types of data to create unified and contextual data. This unified data is typically referred as big data. Examples of different silos are custodian data, data from Bloomberg™, social media unstructured content, SEC reports, audio from conference calls, and the like. Data used in the CIOR analytics platform may also include environment, sustainability and governance data (or "ESG data"), which may be used to refine analyses run on the platform. ESG data generally refers to data relating to issues such as climate change, human rights, corporate governance and other factors that may be used to rate certain risk factors or opportunities of an entity or security and the risks of investments therein.
2. Cognitive Analytics: This unified data is then processed through cognitive layer of the CIOR. It processes text (unstructured) data through the text analytics to find keywords, sentiments, patterns and entities in order to correlate data to get greater insights on what's going on with equity portfolios or securities fraud litigation. Cognitive analytics also enables finding personalities of the key executives of the entities. CIOR Analytics' cognitive system adds insight about the key executives' nuance of tone, sentiments, emotional state, which can provide leading indicators for potential issues with the entity.

Through machine learning algorithms, the cognitive analytics layer of the CIOR analytics platform may create alerts, watch lists and predictions. The CIOR analytics platform may enhance the discovery capabilities of cognitive systems to mine deeper insights from vast amounts of data. It may uncover patterns and opportunities that would be difficult to see or find through traditional research methods.

3. Predictive/prescriptive analytics (leading indicators): The unified data at the data integration level offers unique opportunity to create hundreds of variables. It also offers opportunities to create variables from unstructured data. With more variables the accuracy of prediction increases. Through historic data, the CIOR analytics platform may learn the patterns and predict with greater accuracies future probabilities and trends. The CIOR analytics platform's predictive analytics layer may predict missing data elements with greater accuracy. This may improve data "cleanliness" and having cleansed and accurate data for better insights for predicting, for example, possible frauds and/or future stock prices for better planning of funds.

4. Predictive/prescriptive analytics for use in hedging against fraud: In some instances, the COIR system may be employed in conjunction with a hedging strategy to mitigate the losses related to securities' price fluctuations and resulting from, for example, fraud. The profile over time of a diminution in the value of a stock or security resulting from fraud may, in many instances, be differentiated from the profiles resulting from other non-fraud factors related to changes in the value of a stock or security.

Figure 36:
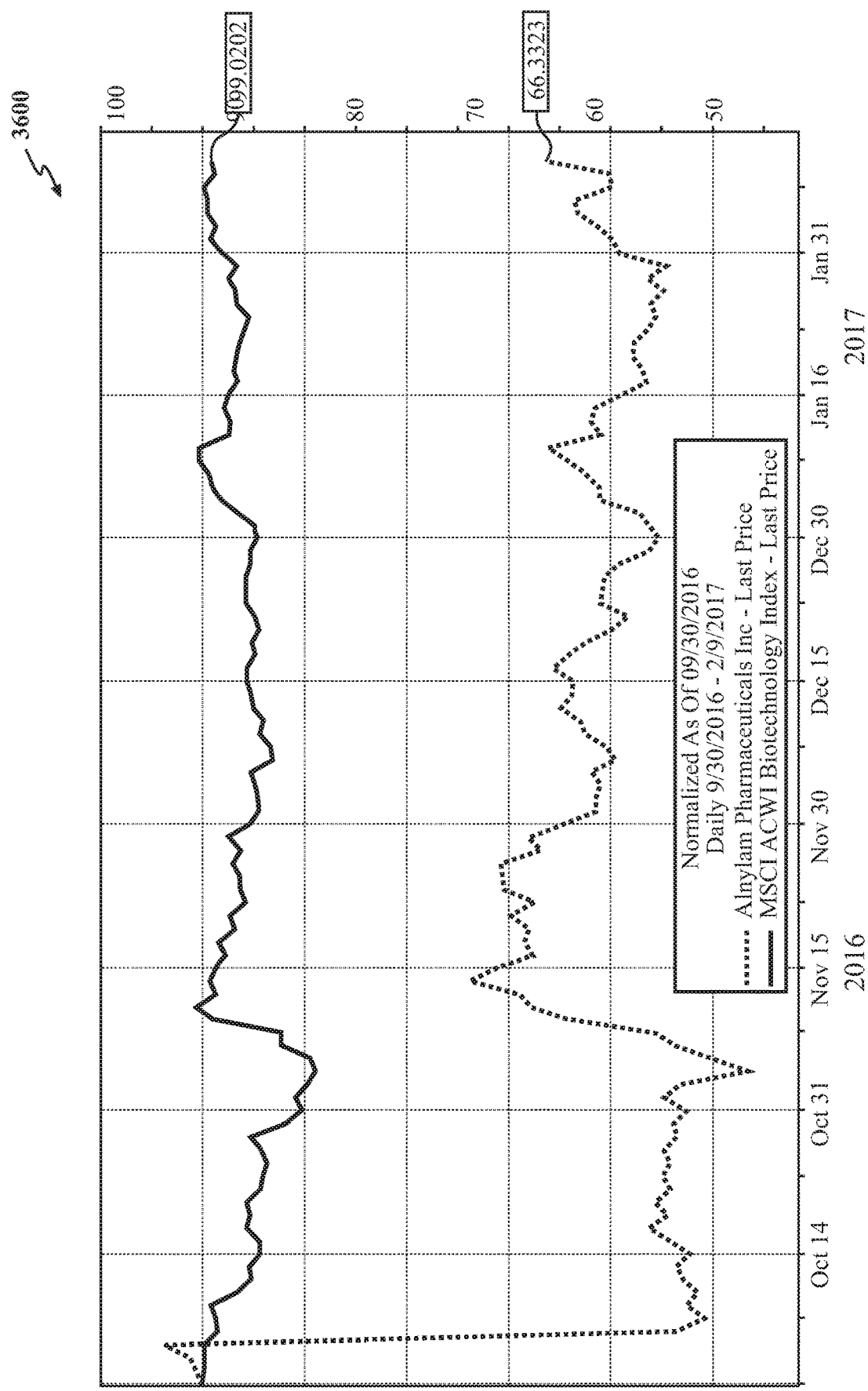

FIGS. 18-23 depict examples of stocks for which there was a recovery following a significant price drop in the stock price, and a recommendation of filing a case would be a possible outcome of analysis using the CIOR system. FIGS. 24-28 depict examples of stocks for which there was a recovery following a significant price drop in the stock price, and a recommendation of not filing a case would be a possible outcome of analysis using the CIOR system. FIGS. 29-36 depict examples of stocks for which there was not a recovery following a significant price drop in the stock price, and a recommendation of filing a case would be a possible outcome of analysis using the CIOR system. FIG. 36 depicts an exemplary and non-limiting embodiment of a generic pharmaceutical stock price compared to a benchmark index of the biomedical sector. In the example, the pharmaceutical stock experiences a decrease of approximately 50% in response to the commission and/or an allegation of fraud on or about Oct. 1, 2016. Note the delay in any recovery of the stock price over an extended period of time. In some embodiments, the delay may be approximately ninety (90) days. Analytics may be employed within the CIOR system to predict and/or recognize the occurrence of such fraud so as to permit an effective strategy of hedging based, at least in part, on a predicted response profile to fraud. In some embodiments, such analytics may employ the use of artificial intelligence to perform predictive analysis. Such analytics may be employed to predict which securities are artificially inflated due to fraud before news of such fraud, including curative information, is available in the market. Such analytics may also be used to analyze, predict and forecast future price fluctuations of a security, for example, the near-term and long-term probabilities of a price recovery of a stated value (e.g., 10% or greater), or some other variable deviation of interest to a user. In an example, the pattern of price fluctuations of a security leading up to a significant drop in price and/or the pattern of price fluctuations following a significant drop may be analyzed by the CIOR system to determine the nature of the anticipated or historical drop. For example, a pattern or set of patterns may be associated with executive-level personnel turnover, whereas a different pattern or set of patterns may be associated with insider trading. Knowledge of such patterns and their underlying causes may further enable the CIOR system to predict the degree to which a price recovery of a security is expected and/or the size of the predicted price recovery. Such knowledge may allow users to hedge investments and related decision making in advance of a significant price drop as well as during a period of expected price recovery following a significant price drop.

In embodiments, structured and unstructured data may be unified, for example at the data integration level. Such integrated data may offer a unique opportunity to create thousands of variables that may be utilized to predict the onset of a change in value to a stock or security resulting from fraud. These variables may include, but are not limited to, deviations from expected and peer behaviors in revenue recognition, executive compensation and expenses, sales and cost structures, supply chain inputs, corporate merger and acquisition activity, corporate governance structure, regulatory compliance, or some other variable type. Additional variables may include particular kinds of securities such as option chains, collateralized debt obligations, bond spreads, securities lending demand and insider selling, or some other variable related to a security. In addition to accessing structured data through licensed sources such as Bloomberg™ Sustainalytics™, Lex Machina™, Westlaw™, Stanford Class Action™, Clearinghouse™ Law360™ and the like, the CIOR system may also be used to create variables from unstructured data by ingesting, for example, textural and voice data from various proprietary and publicly available data sources, including but not limited to EDGAR™, analysts reports, recorded earnings calls, public relations materials, shareholder relations materials, and social media feeds and information on the World Wide Web. The processing of such data may occur within the cognitive layer of the CIOR system, as described herein. With more variables, the accuracy of prediction may increase exponentially. Through historic data, CIOR Analytics may learn patterns and predict with greater accuracy future probabilities and trends by drawing correlations, and other associations, between deviations from expected behaviors among the variables and, for example, historical instances of significant corporate stock price adjustments associated with public disclosure of those deviations. The CIOR system may also analyze similar deviations among the issuers of all publicly-traded securities in the world with market capitalization in excess of, for example, $250 million.

In embodiments, the presentation layer of the CIOR system, as described herein, may present a user with a set of data categories, variables, and other information on which a user may base subsequent analytics. The CIOR system's predictive layer may be used to identify missing data elements with greater accuracy. For example, the CIOR system may identify missing variables or data types that are required for the accurate performance of a specific analysis of interest. In an example, a user may be presented with an alert within the presentation layer indicating that there is insufficient data selected for a specified analysis type. In another embodiment, recommendations for data types, categories, variables and the like may be presented to the user in the presentation layer based on the data types that are required or recommended for a specified analysis type. For example, a user may want to use quarterly earnings data that is associated with a security as at least one component of an analysis to detect suspicious variable deviation(s), or the lack thereof. The presentation layer may provide the user an indication of the number of, for example, quarterly reports that are required to provide sufficient statistical power, confidence and the like to yield accurate analytic results. If the user lacks sufficient data or has only the incorrect data types selected, the CIOR system may provide a user a prompt, link, or other actionable item or icon to connect with a data source at which the necessary or advisable data may be found (e.g., EDGAR™, Bloomberg™, etc.). Such identification may be based at least in part on historical data stored and associated with the CIOR system relating to the specified analysis of interest. In embodiments, the identification of missing data, needed data and the like, may be performed at the request of a user and/or may be automatically performed by the CIOR system. In embodiments of the aggregated use of structured and unstructured data, that is cleansed and made accurate, may allow comparison of more variables for better insights to predict possible actionable securities fraud litigation that inevitably trails disclosure of the deviations and failures, and to predict the probability of instances in which an issuer's stock price is likely inflated due to failures to disclose deviations from expected behaviors or regulatory violations before those deviations or failures are publicly disclosed. Cleansing data may be an analytic option, for example in the cognitive analytic layer of the CIOR system. An example of data cleansing may include, but is not limited to, data standardization performed prior to submitting data for analysis. The CIOR system may predict stock price trends following such disclosures for better planning of funds based on historical stock price trends that are reactive to the disclosures.

In embodiments, the CIOR system may provide a technology-aided service to analyze the securities class action filing process, regardless of the entity that files the class action settlement claims. These "desktop analytics" services may have multiple objectives including risk mitigation and claims filing monitoring, and are primarily facilitated by the CIOR desktop analytics application ("DAA").

Virtually all investors will, at some point, be exposed to securities class action settlements, with the right to file claims in order to recover a portion of common settlement funds created to compensate aggrieved investors. In many such securities class actions, investors must submit claims to the designated claim administrators, along with transaction histories for every account eligible to participate in the settlements. The claim administrator evaluates each claim to determine eligibility and calculate each claimant's losses. Ultimately, the claim administrator calculates the appropriate payment for each claim and distribute that amount to the claimant. Due to the specialized nature of the class action claims recovery, larger institutional investors typically delegate responsibility for this process to their custodians or to third party filers, although some may file claims themselves.

The following terms may be used in reference to the DAA:
Filer: The party responsible for securities class action claim filing and generally managing securities class action recovery processes. This may be a third party, a custodian, or the investor itself (referred to as self-filing).

Recognized loss (RL): The metric frequently used to determine each claimant's recoverable losses in a securities class action. The calculations used to determine RL are unique to each case and are defined in a court-approved plan of allocation.
In securities class actions, losses are generally calculated by subtracting some values set by the plan of allocation from a higher pre-disclosure value. Hence losses are positive.
Common settlement fund: The money paid by the defendants and their insurance carriers aside to settle a class action, from which claimants are compensated for a share of their losses.
Payment: The actual payment made for each individual claim made by an investor. Typically, the payment amount is based upon a calculation using the claim RL.
Payment amount=RL*case pro rata (for RL cases)
Case pro rata=settlement fund (less expenses and legal fees)/sum of RL for all claims submitted for recovery in the securities class action settlement
Remittance: The process of remitting securities class action settlement funds from a filer to the client's account(s) at it custodian.
Claim spreadsheet: To calculate RL, claim administrators need a complete transaction history by account for all subject securities during the class period set by the plan of allocation, as well as an opening position for any account that held shares prior to the class period. This data is typically provided for each claim via spreadsheet submitted along with other claim documents.

The DAA, as described herein, may be a multi-faceted component of the CIOR system, and a service designed to ensure that class action filing processing is performed accurately and to assure that CIOR users receive the correct compensation for all filed claims. Furthermore, while CIOR allows users to employ various best practices, such as including the aggregation analysis, to allow users to optimize filings in order to seek to recover the maximum allowable payments, the DAA may help assure adherence to those practices.

The DAA may be built upon a database, or plurality of databases, that stores data including, but not limited to:
Case and case securities data.
Claim data, including account level analytics for each potential claim.
Claim history, storing every iteration of claim data throughout its lifecycle.
Transactions.
Payment data.
File maintenance (e.g., securities, accounts, clients, filers, etc.).

The DAA may utilize data from the client's file to track claim filings and monitor data changes. However, the DAA may also use additional data sources to verify the accuracy of several elements of the securities class action lifecycle including claim filing and RL calculation. One source of this data may be the custodian, which has a responsibility to keep accurate records. By utilizing a custodian's data, the DAA process may improve accuracy and effectiveness. The DAA may be flexible in the content, frequency, and format of the imported data, subject to a minimum threshold (i.e., includes the requisite fields for performing the analysis). This flexibility may allow the DAA to support multiple clients with different filers and different custodians without having to change its general operation. The DAA may identify flaws in custodial data and compare the application of multiple plans of allocation to client portfolios on the account and client levels, and then reconcile recoveries against expected entitlements.

The DAA may include automated processes to import diverse data sets, as well as processes to validate and normalize that data during the import process. Data (such as claim data) is subject to change over time and the DAA may not only update the respective records in the database, it may also build an auditable, comprehensive history record of all data updates. Ideally, the CIOR system may receive regular periodic data updates from the respective filers, but the DAA may also operate on an ad hoc basis.

In embodiments, one element of the overall DAA process may be to monitor incoming data from a filer and identify any anomalies or inconsistencies. The DAA import and posting process may include numerous processes to identify anomalies and report them. In addition to its data import capabilities, the DAA may also support reporting and data exports. The software may provide numerous reports to support its various processes. Additionally, these reports can support client facing information delivery and some may support filtering. When pre-built reports do not satisfy a requirement, the DAA may provide an export tool that builds a spreadsheet with data from any of the major data objects, supporting ad hoc research within, for example, an Excel™ file, or some other data storage format.

Audits may sample individual work flows or discrete use cases within each audited process to verify proper procedures and systems are functioning correctly. The DAA may function in a similar manner and support sampling of the discrete elements of the SAC lifecycle. Alternatively, the DAA may function more comprehensively and be capable of a more detailed (and potentially record-by-record) approach.

There are several fiduciary risks associated with the securities class action claim filing process, which the DAA may help mitigate. Any of these risks can impact an investor's recovery in securities class action settlements, and CIOR may provide oversight for the process and offer clients a tool to analyze related functions.

Many of the risks in the securities class action recovery processes are related to human error in the filing process or errors in the tools they use therein. In addition, there are a few opportunities for fraud in the claim filing lifecycle. Although highly unlikely, a filer could attempt to defraud an investor by withholding some or all of their settlement payment. Alternatively, for an investor who self-files (or a contingency filer with vested interest in a maximum return), an overzealous employee might intentionally manipulate a claim filing in order to fraudulently inflate trading losses and increase settlement payment. Accordingly, it is imperative that institutional investors, such as corporate or public pension funds, take reasonable precautions to make accurate filings in securities class action settlements, seek to assure receipt of proper compensation, and establish standards to protect organizational integrity and reputation.

The DAA may be designed to focus on risks, including but not limited to:
Missed filing: where an investor does not file a claim in a case to which it is entitled to compensation and thereby loses the opportunity to collect a settlement payment.
Incorrect filing: where an investor's claim documentation is incomplete or incorrect and does not accurately reflect the actual transaction activity for a specific security, which could inflate or deflate the recovery value of the claim. An error that understates an investor's loss may lead to a lower payment, while an error that incorrectly inflates loss (and potentially increases payments) might appear fraudulent, resulting in reputational damage.
Sub-optimal filing: an investor's claim filing is technically correct on an account level, but understates larger losses across the entire portfolio.
Payment issues: errors (or fraud) during the payment process that that yields a lower recovery.

The following list, organized by the above categories, identifies some of the primary risks for an institutional investor throughout the securities class action claim lifecycle. Each of these risks will be discussed in further detail along with the components of the DAA specifically designed to mitigate that risk.
Missed filing:
  Incomplete case list.
  Missing an account.
  Not filing in all accounts regardless of eligibility.
  Missed security holdings.
  Improper rejection.
Incorrect filing:
  Inaccurate filing.
  Missed transaction.
Sub-optimal filing:
  Missing a free transfer.
  Client and account filing:
    Analysis not performed.
    Incorrect analysis.
Payment issues:
  Missing payment.
  Incorrect payment amount/underpayment.
  Missed secondary payments.
  Remittance issues.

There is not one single source of securities class action case data, which makes building a comprehensive case database challenging. Most filers rely on third party providers for such case data and then supplement that list using further legal search tools, web searches, and industry contacts (e.g., claim administrators, litigation funders). This challenge is exacerbated by the recent growth of the volume of international cases (without a central repository of such data). In order to mitigate the risks of a filer missing a case, the DAA may associate every filer case record with CIOR's own case record. This may allow CIOR to run a report listing all known cases and verifying that a client's filer has a database record themselves for each case. Should a case appear to be missing from the filer list, CIOR system may contact the filer.

Most third-party filers file thousands of securities class action claims annually on behalf of many distinct clients and, although they are typically accurate and effective, some errors in the process are inevitable. One of the more common errors is a failure to file a claim for an individual account. A "missed account" could occur for numerous reasons (i.e., the account is closed, special account with data stored in a separate system, multiple custodians, confusion over filing responsibilities, and so forth). In this scenario, the filer files claims for one or more of an investor's accounts in a case, but misses one or more accounts with eligibility.

In embodiments, the DAA may use a multi-pronged approach to catch such missed account filings. First, using the periodic data updates from the filer, the CIOR system may use the DAA to analyze claims by case. If a filer has performed a prior analysis on a specific account, but their data does not reflect the account having a filed claim, the CIOR system may notify the filer and request a justification. Additionally, the DAA may store claim numbers for filed claims if/when provided by the filer. The presence of a claim number is verification of the claim receipt by the administrator. In cases where the filer passes along claim number data provided by the administrator, the DAA may provide a tool which clearly identifies the absence of a claim number for an eligible account.

In embodiments, the DAA may also support a thorough analysis of case eligibility using transaction data from the client's custodian(s). With this process, the CIOR system may obtain holdings and transaction data for the client in securities pertinent to the case. This data may then be imported into the DAA (and normalized). Using this official custodial data, the DAA may then perform several analyses for the client in this specific case. First, an eligibility analysis may be performed to identify any/all accounts with holdings and/or transactions in the litigated securities. Since CIOR system may consider accounts with such a history to be "eligible," this analysis may provide a baseline for the list of accounts that should have claims. The DAA may provide a tool that compares that list with the data from the filer and any variances are identified.

In embodiments, there may be a subset of missed cases where the objective is the same: to identify any accounts that the CIOR system considers eligible, but which may not have been filed. Since some filers will perform RL calculations before filing claims, it is possible for filers to skip an account because the filer's analysis indicates there is no RL, or the account may otherwise appear to be ineligible. Sometimes a filer's automated systems may trigger on an eligibility indicator, or otherwise erroneously neglect an account.

In embodiments, the CIOR system may advocate that a client account with holdings or transactions in any of a case's litigated securities should be filed, regardless of any additional interpretation of eligibility. This is best practices for a fiduciary to assure payment on all eligible transactions. Therefore, the DAA may apply an eligibility analysis to assure that all accounts with transactions file claims or that the transactions are included in a client-level filing to make sure that no claim filing opportunities are missed.

In an example, a missed security risk is similar to a missed case, but requires a more thorough analysis. Since many securities class actions settlements provide for recoveries on losses from more than one security, it is imperative that a filer's list of litigated securities for a specific case is complete. If a security is excluded from a filer's case-security list and the investor had transactions in that security, a claim filed without those transactions is incomplete or could be missed completely. A complete security list is important and the DAA may be able to identify any missed securities. Using the DAA, the CIOR system may track securities associated with every case and compare its list to the filings provided by the filer. Additionally, the DAA may download relevant holdings and trade data from the custodian for securities. Once that data has been imported and normalized, the DAA may run an eligibility analysis and compare it to filer claim data. Furthermore, by performing RL calculations in the DAA, the CIOR system may be able to identify any significant variances between its own RL calculations and those of the filer. Any such variances may be addressed with the filer and could potentially indicate missed trades due to a missed security.

Many claim rejections result from a claim administrator determination that a filed claim has no RL. In such a situation, the investor's claim is rejected for "zero recognized loss" and the investor will receive no payment. Another reason for rejection is late filing. Although claim administrators are very good at calculating RL (it is typically one of their primary responsibilities) and tracking filing dates, they process millions of claims annually and occasionally make mistakes. The DAA may seek to validate rejections and assure that they are accurate. The DAA may track rejection data for client claims and include analyses to validate rejections. The filing deadline analysis may verify that claim filing date was before the claim filing deadline. While the zero RL rejection analysis verifies that filer and/or CIOR RL calculations agree with a claim administrator's zero RL rejections. For filers that perform their own RL computations, this analysis can utilize filer values and CIOR RL values if computed (as a "backstop"). Alternatively, for filers that do not compute RL, the DAA's RL calculations may be used to verify zero RL rejections. Additionally, the DAA may provide a general rejection report, which lists all rejections (regardless of reason) to be evaluated by CIOR.

A missed transaction during the generation of the claim spreadsheet might either inflate or deflate losses (a missed buy will typically reduce losses while a missed sell may increase loss). While it may be relatively uncommon to miss one/some transaction(s) in a claim spreadsheet if including others, it is more common to miss an opening position and such an omission would typically reduce RL and erroneously reduced the settlement recovery.

In embodiments, the DAA may validate that opening balances and trades to properly account for in a claim spreadsheet. One example method to execute this step may be to check the actual data rows included in the claim spreadsheet against known client holdings data. Such holdings data may be stored in the DAA database or may be calculated dynamically from a complete set of transactions for a security. An aspect of the analysis may be to compare the period end holdings in the spreadsheet to those corresponding values in the DAA. Another example analysis may be to compare filer RL computations with those calculated by the DAA.

RL calculations are frequently made by breaking down transactions into "lots." This process (typically performed following FIFO rules) provides the cost basis for all sold, short, or unsold positions. Using these lots, the RL calculation typically calls for a comparison of the actual realized loss for the lot to various other metrics including inflation prices, price lookup tables, and holding prices. However, these computations are typically ignored/skipped when a free transfer transaction is the buy or sell transaction.

Many free transfers are represented in a transaction record with a price of zero and not the actual cost basis for the shares that are moved. This means that a lot with a free receive will have a zero price as the buy side of the equation and a lot with a free deliver will show a zero price on the sell side of the pair. The existence of such zero value prices typically causes that lot to be ignored during RL calculations. The consequence of ignoring the lot pairing is that if the investor actually incurred a loss on those shares, such a loss is not included in their total RL for their account transaction history, likely understating their true losses and probably reducing the settlement payment they receive.

Such free transfer transactions, which are common for large pension funds that use them as a way to balance the portfolios, can significantly impact RL and an investor's settlement recovery. To address this risk, sophisticated filers analyze the true cost basis of the shares that are moved across accounts by these free transfers and then reflect those costs correctly in transaction history for the shares. The most effective method to address free transfers is to identify the buy transactions (and their associated costs) that are moved via the free transfers and represent them in the target accounts with the correct cost basis. This is an accepted practice in securities class action claim filing and allows accurate RL calculation to assure the investor receives the correct settlement payment.

To optimize securities class action claim settlement recoveries, a sophisticated filer may identify free transfers and replace them—wherever possible—with the actual transaction and its proper cost basis. However, this is a complex process and few filers are able to properly execute this thereby deflating losses (and ultimately reducing recoveries).

In embodiments, the DAA may identify filings that include free transfers. In such cases, the filer has made a sub-optimal filing and should seek to amend the claim. The DAA may identify free transfers in either the client's claim spreadsheet or in transaction data stored in the DAA database. The DAA may also perform the free transfer process, which "moves" the cost basis for each associated transaction. After processing, the DAA may then produce a new/corrected claim spreadsheet for the filer to use in an amended filing.

For investors such as large pension funds with assets allocated across multiple accounts, the CIOR may analyze RL at both the account and client level. In this process, the filer or the CIOR system may aggregate all case-related transactions into a single account for all separate accounts sharing the same legal owner. Then RL may be calculated for that aggregate account and compared to the sum of RL in the individual accounts. If the sum for the RL of the individual accounts is greater than for the aggregate account, then each account should file a distinct claim. However, if the RL for the aggregate account is greater, then a claim for the aggregate account should be filed instead.

Many filers do not calculate RL making it impossible for that filer to perform an aggregation analysis or assure that their claim is being optimally filed. Second, RL computation is a complex matter and if there are errors in the filer calculations, it could lead to a wrong decision about an aggregated filing. The DAA may address both such scenarios to assure that a client's claims are filed optimally.

For filers who do calculate RL, the DAA may provide an aggregation analysis process that verifies that the correct decision was made by the filer using the filer's RL calculations. Additionally, the DAA may calculate RL and auditing the RL calculations made by the filer. This may reduce the risk of an incorrect aggregate filing decision, which could reduce client recovery. For filers who do not calculate RL, the DAA may provide the aggregation analysis so that an aggregate filing decision can be made and the client's claim can be filed optimally. FIG. 15 shows an abridged sample of the CIOR aggregation analysis utilized in this audit process.

Hundreds of thousands, and sometimes millions, of claims are filed in larger securities class actions settlements and this volume leads to problems with payments regardless of the efficiency of the administrators. The DAA may review a client's filed claims in any case that has disbursed to make sure that every claim that should be paid does receive a payment. The DAA may include multiple tools to support this settlement payment review. The payment report may analyze claims filed in a disbursed case for the client in order to make sure that any claim with RL, or otherwise not rejected, received a payment. Any claims without a payment (be it a first, or secondary payment) may be flagged for action so that the filer can contact the administrator and arrange for payment (usually a reissuing of the check). This audit assures that a client receives all of the settlement payment which they are due. FIG. 16 illustrates a payment and filed claims report as one example output from this process.

In the securities class action industry, payment reconciliation typically requires calculating the RL for each claim as well as the pro rata payment factor for the disbursed case. Typically, the payment amount is calculated by the claim administrator as the RL multiplied by the pro rata. For awards based on damaged shares, that payment is computed as damaged shares multiplied by the per share value. In both cases, the payment value is a clearly calculated value.

Payment reconciliation seeks to verify that all payments received indeed meet the expected amounts. For filers that calculate RL, the DAA may run payment verification analysis, which may calculate the difference between the expected payment amount (using the filer's RL computation) and the actual payment amount received. The DAA may allow each client to set specific tolerances for this variance and the audit flags any claim payments as to which those thresholds are exceeded (either positively or negatively). Once identified, the filer can communicate the issue to the claim administrator and work with them to determine the reason for the variance. In the event of an administrator error, the administrator will typically issue another check for the difference.

To further support this process, the DAA may utilize an RL computational capability to verify the expected payment amounts for those filers who calculate RL, or to perform the complete payment verification audit for those filers without such RL capability. FIG. 17 illustrates a payment and filed claims report as one example output from this process.

Many claim administrators retain a portion of the settlement fund when they make the first disbursement to leave a reserve fund to correct any errors or omissions in the first payment wave. Typically, this then requires that the administrator issue a second payment after addressing any issues with the first round of payments and settlement funds remain. Just like a first payment, these second (or multiple) payments are determined by RL but use a different pro rata based upon the remaining settlement fund balance.

A second payment analysis is very much like the regular payment analysis and payment verification and shares the same objectives. In this case, the DAA may identify cases with known second disbursement payments and runs those calculations to verify that every (non-rejected) claim receives a further payment and that the payment amount is calculated correctly.

Like many other cash related accounting processes, claim payments require reconciliation in order to verify that the client ultimately receives all of the payments due (regardless of where the claim administrators send the payments) and that those receipts were correctly allocated to the proper client account. This cash reconciliation is typically a custodial responsibility, but is challenging due to volumes of settlement payments as well as occasional ambiguity in the inbound financial instruments (checks, wires). The CIOR system may provide claim payment and remittance reports to allow custodian to better undertake such a reconciliation. Such reports may include relevant data to support remittance reconciliation, including case name, case number, claim number, claimant account, payment amounts, check number and dates (if known), administrator name, and wire information if relevant.

Embodiments of the securities claims identification, optimization and recovery system and methods of the CIOR system, disclosed herein, may include an insurance embodiment (hereinafter the "CIOR-Insurance" system). The CIOR-Insurance system may include a Risk Insurance Company ("MC") that may be a Delaware-domiciled captive insurance company formed under the Series Statutory Trust legislation. The express purpose of the MC is to provide reimbursement coverage to various institutional investors that are clients of a Management Entity. The Management Entity may be a Delaware limited liability company that is licensed as a registered investment advisor. Insurance may be provided through separate series statutory trusts (herein referred to as Series Trusts or ST). An ST may be associated with the CIOR Insurance system and known as, "Risk Group ST or DRG".

Glossary of entities and terms used for the risk insurance embodiments herein:

APLE: Adverse party legal expense coverage—the product of MC and its ST

DMLLC: Management Entity

RIC: Risk Insurance Company—formed as a Delaware Series Statutory Trust

RG ST: Risk Group Series Trust—ST formed by RIC and used for all participants of the Management Entity SPV: A non-insurance corporate vehicle that allows membership rights to institutional investors needing to participate in the APLE product in exchange for the rights to a claim.

ST: Series Trust—the same concept as the Series LLC captive, except it is modeled under the Delaware statutory trust platform.

There is a well-developed securities litigation industry in the United States in which publicly traded entities are sued in class actions for alleged stock fraud. Institutional investors (such as pension funds and insurance companies) participate in this industry as class members and, occasionally, class representatives. Damages are calculated to remediate the issuer's alleged misrepresentations or material omissions based on stock price decline of affected shares associated with public disclosure of curative information. The gross settlements in these US securities class actions range from $4 billion to $20 billion per year. Financial institutions (particularly those that manage client/policyholder funds) have a fiduciary duty to participate in these cases, at a minimum as passive class members, to recover some portion of losses incurred in the stock price drops.

To the extent institutional investors hold non-US equities, the fiduciary duties likely require them to seek to recover losses due to alleged securities fraud in those portfolios as well.

Prior to the United States Supreme Court's 2010 decision in Morrison v. National Australia Bank, US institutional investors could frequently recover for losses in both their domestic and overseas-purchased holdings as part of United States class actions. In the Morrison decision, the Supreme Court set territorial limitations on the application of United States securities laws and effectively eliminated overseas-purchased investments from US securities class actions. Accordingly, institutional investors seeking recovery for losses in their securities portfolios purchased outside the United States must now consider whether to join non-US cases against the issuers without the benefit of the US class action process.

The post-Morrison requirement that institutional investors look outside the US to recover losses due to alleged securities fraud imposes new risks. In particular, under US law, each party is presumed to pay its own attorneys' fees and most costs and thus, even if a securities fraud plaintiff loses, it does not pay the defendant's legal fees and costs. Under this standard, passive securities class action members have no risk of such adverse party costs. However, in most foreign (non-US) jurisdictions, the losing party is obligated to pay at least some or all of the prevailing party's legal costs. To many institutional investors, this loser—pays attorneys' fees and costs shifting creates unpalatable risk, leading them to reject foreign actions as a way to recover portfolio losses due to alleged securities fraud.

A DMLLC, as described herein, may provide the risk management and insurance structures that sufficiently reduce the risk of adverse party legal costs to enable institutional investors, particularly large US financial institutions, to participate in securities fraud litigation abroad. This is referred to herein as "adverse party legal expense coverage", or "APLE".

DMLLC may be a Delaware Limited Liability Company, or some other entity type, formed to, among other things, assist institutional investors in maximizing recoveries associated with securities litigation arising from portfolio holdings. DMLLC may monitor client portfolios for asynchronous activity, identify potential litigation recovery opportunities and manage the recovery process in domestic and international securities fraud cases. For non-US recovery opportunities, DMLLC may create a structure that would cover client risk associated with any APLE award against a DMLLC client.

RIC may offer DMLLC clients a pre-packaged risk mitigation feature covering current and future foreign securities fraud cases that meet highly demanding underwriting guidelines. This provides risk-averse DMLLC clients an attractive solution to streamline their consideration of foreign securities litigation risk and encourage greater efficiency in moving non-US cases forward.

For particularly high-risk jurisdictions, like the United Kingdom, a further client risk-mitigation approach includes a special purpose limited liability entity ("SPV") to act as assignee of client claims, which are paid limited liability membership interests in return. In short under this model, DMLLC clients seeking to recover in high risk foreign jurisdictions, like the United Kingdom, assign their claims to the SPV and receive in return "membership interest" to give them an equity interest in the litigation proceeds, while also providing the DMLLC clients the protection of a liability bar.

DMLLC may need insurance for the following categories of potential adverse party cost risk:

1. For known cases (where DMLLC clients and prospective clients currently have no insurance options); and
2. For future unknown cases in which DMLLC clients and prospective clients are exposed to loss due to fraud.

Insureds may be clients of DMLLC and hold member interest in the captive. In an embodiment, for coverage to apply to cases over $100,000 in limit where a separate Series Trust (ST) is used, the ST may have at least 12 insured to be established. The captive is intended to maintain a conservative, long-term approach to building surplus while protecting the exposures of its insureds. As surplus develops, various retentions and limits may be increased.

RIC may work with various high quality insurers to provide both a layer of reinsurance as well as a front for those jurisdictions requiring rated or well-established paper. Encrypted sharing technology may be used to ensure the management team has organized and timely information on which to base their decisions. In addition, the efficiency of service providers may be greatly enhanced, thereby lowering administration expense. Governance protocols that focus on accountability and sound business practices are the foundation for any successful captive insurance company. It is also possible RIC does not require a reinsurance arrangement, as some jurisdictions will allow a direct written policy from the captive.

RIC may be formed as the core of a Delaware Statutory Trust model. Risk Group ST may be the first series trust created to handle the small cases that only require low limits.

RIC may issue reimbursement policies. The typical exposure reimbursed may be that of adverse party legal expense exposure due to the "loser pays" litigation model found in most foreign jurisdictions.

In embodiments, MC may be associated with a plurality of service providers, including but not limited to, a captive manager, underwriting and risk management, legal counsel (insurance), legal counsel (trust law), audit/tax service, actuarial service, claims reimbursement, or some other type of service provider.

The after-the-event insurance market ("ATE") is prevalent in foreign jurisdictions, especially the United Kingdom, to address the "loser pays" model of legal expense cost shifting to the losing litigation party.

Most institutional investment funds are risk averse to securities fraud litigation in which the loser-pays model might impose additional expenses to their fund regardless of the merits of the underlying litigation. The RIC model addresses the need of institutional investment funds of all sizes that have suffered securities fraud losses on foreign-purchased equities and currently there is no other market in the world meeting these risk needs.

While there are numerous markets providing ATE policies to cover potential adverse party legal expense awards, there currently is not a risk financing platform that exists for insureds to fund, on an ongoing annual basis, against future needs for protection on adverse party legal expense risk.

The policies provided by the STs to institutional investment clients and members of SPVs may be in manuscript form. These policies document reimbursement coverages that (1) are not generally available within the commercial insurance markets or (2) may be excluded under standard commercial insurance forms (i.e., ISO policy forms). The only coverage needed may be protection against an adverse party legal expense ruling involving alleged corporate fraud.

Where excess reinsurance capacity is needed, the foreign cases may be limited to the United Kingdom, Australia, and Canada.

The proposed foreign litigation adverse party legal expense insurance may adopt carefully circumscribed "Securities Fraud" underwriting guidelines. In the United States, securities fraud cases arise from alleged misrepresentations or material omissions of material information upon which investors make decisions, the revelation of which causes a decline of the subject securities prices in presumably efficient markets. Such actionable misrepresentations or material omissions generally involve:

Publicly disclosing materially false information.
Withholding material information when it should be disclosed.
Acting on insider information.
Manipulating stock prices.
Misrepresentations in SEC (or foreign regulatory) submissions and financial statements.
Accounting fraud.
Other illegal activity that artificially inflates stock prices.

While the contours of United States securities fraud are hotly contested and frequently changing, APLE under this program be limited to only claims arising from non-US exchange purchased securities based on objectively identified underwriting criteria:

Significant asynchronous movement of the subject security based on regulatory action or curative disclosure leading to significant market losses that are not recovered within 90 days, and
Regulatory prosecution of the issuer and/or its officers or other government regulatory confirmation of fraudulent or misleading activity.

Such strict underwriting criteria may significantly limit the number of insured cases per year relative to the United States securities fraud patterns as well as reduce the risk of adverse party cost awards. The likelihood of losing an international securities fraud case and thereby incurring loser-pays exposure may be minimized by the following:

1. DMLLC may only insure non-US securities fraud cases if the local regulator has initiated its own investigation into the particular issuer and found wrongdoing by the entity and/or its officers or where there are like-kind objective indicia of corporate wrongdoing leading to the portfolio losses.
2. Almost all cases are settled prior to the case proceeding to trial and verdict. For settled cases there is no plaintiff adverse legal costs liability. In the US more than 95% of civil cases are disposed of before a verdict. Almost no investor-plaintiff securities fraud cases (fewer than 5 in the past 8 years) go to trial in the United States and this percentage is likely to lower in non-US jurisdictions.
3. For non-US securities fraud cases, legal teams are usually financed by litigation funders, which are more risk averse than the United States plaintiff securities class action firms. The financial interests of the litigation funders and that of the insurer are therefore aligned. The associated self-selection tends to eliminate marginal cases and in turn reduces the probability of adverse legal cost awards against investor plaintiffs.
4. In recent non-US securities fraud cases, multiple investors usually join together to sue the issuers and, in most jurisdictions, any adverse legal cost awards are likely to be shared in some proportion between the plaintiff parties. Hence, the adverse legal cost liability for a particular insured plaintiff is significantly less than the expected total liability and will vary depending on the number of plaintiff parties.

For unknown (future cases) the premium rate may be a function of:
1. Probability of a case.
2. Probability of a case proceeding to a court verdict (i.e. no settlement).
3. Probability of losing the case.
4. Factors affecting the maximum liability and how adverse legal expense is to be shared amongst the litigating parties.

Given the Supreme Court decision in Morrison, the number of securities fraud cases outside the United States may increase as US investors are forced to look overseas to recover for losses in foreign portfolios. The number of non-US cases in which each DMLLC client and prospective client may participate is dependent on the mix of foreign equities in their portfolios and not the overall size of the portfolios.

The premium should be less than a premium payable for a one-off United Kingdom securities fraud case as there is spreading of risk across multiple cases and multiple jurisdictions, most of which are less risky than the UK in terms of maximum adverse party awards.

There may be two insurance structures, one with a front and one on a direct basis. Reinsurance may become mandatory on larger risks to ensure adequate capacity is available to cover multiple cases in multiple jurisdictions.

To ensure sound financial integrity of the captive and to limit its exposure in the formative years, RIC may consider coverage on cases with two limit profiles, one on a small case, low limit basis, and one on a large case that needs high limits, rated paper, and adequate reinsurance protection. It is possible the reinsurance partner might participate across-the-board on a quota share basis.

Figure 10:
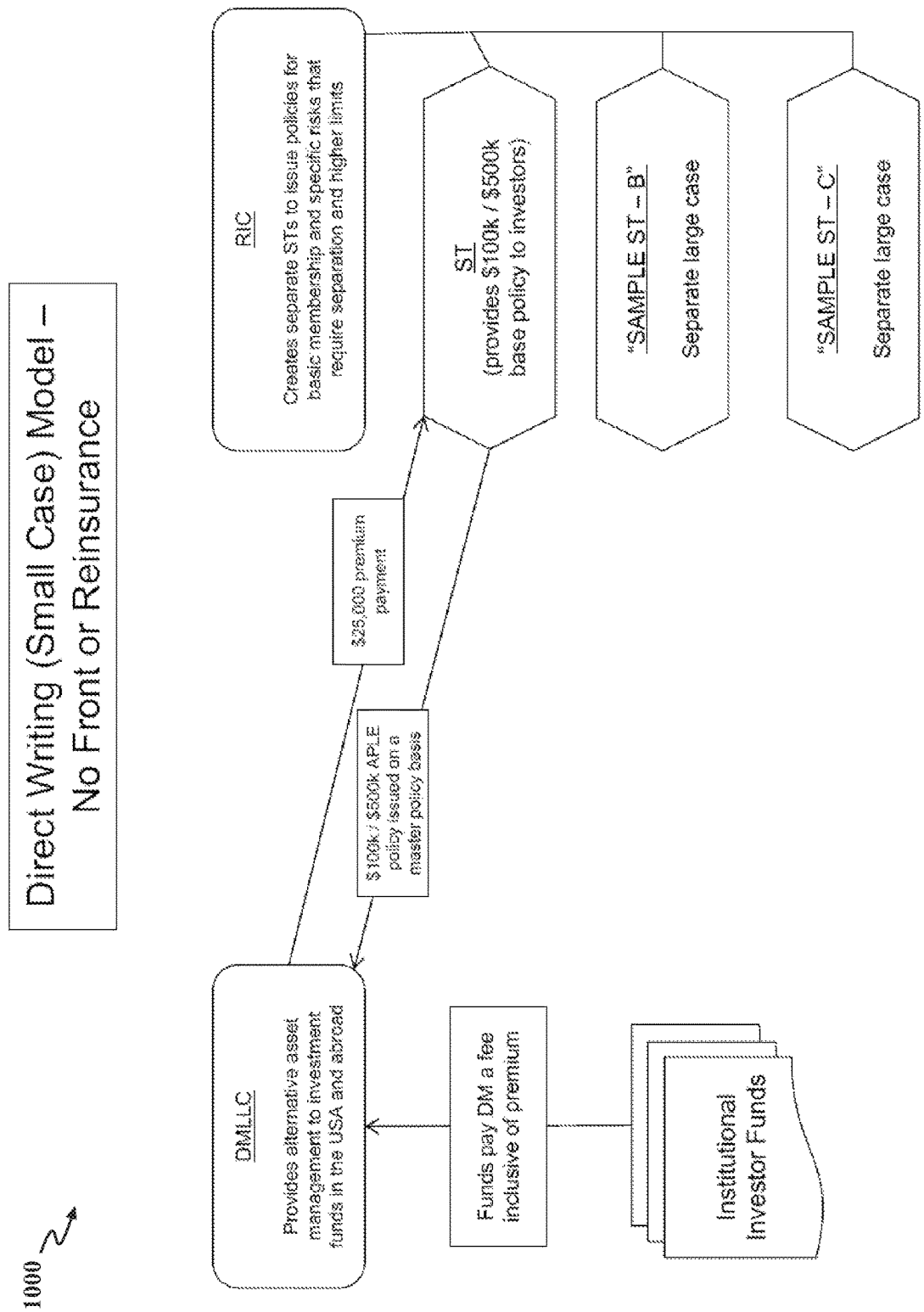
FIG. 10 depicts a direct writing small case model.

FIG. 10 depicts a direct writing small case model. In this example, the base policy limit of $100,000 per insured is expected to cover a significant portion of the potential claims. To further protect the captive, however, a $500,000 policy aggregate may be placed. In larger cases where a front and excess reinsurance capacity is needed, a specific ST will be created and those members who have exposure to that specific case will join that ST.

Figure 11:
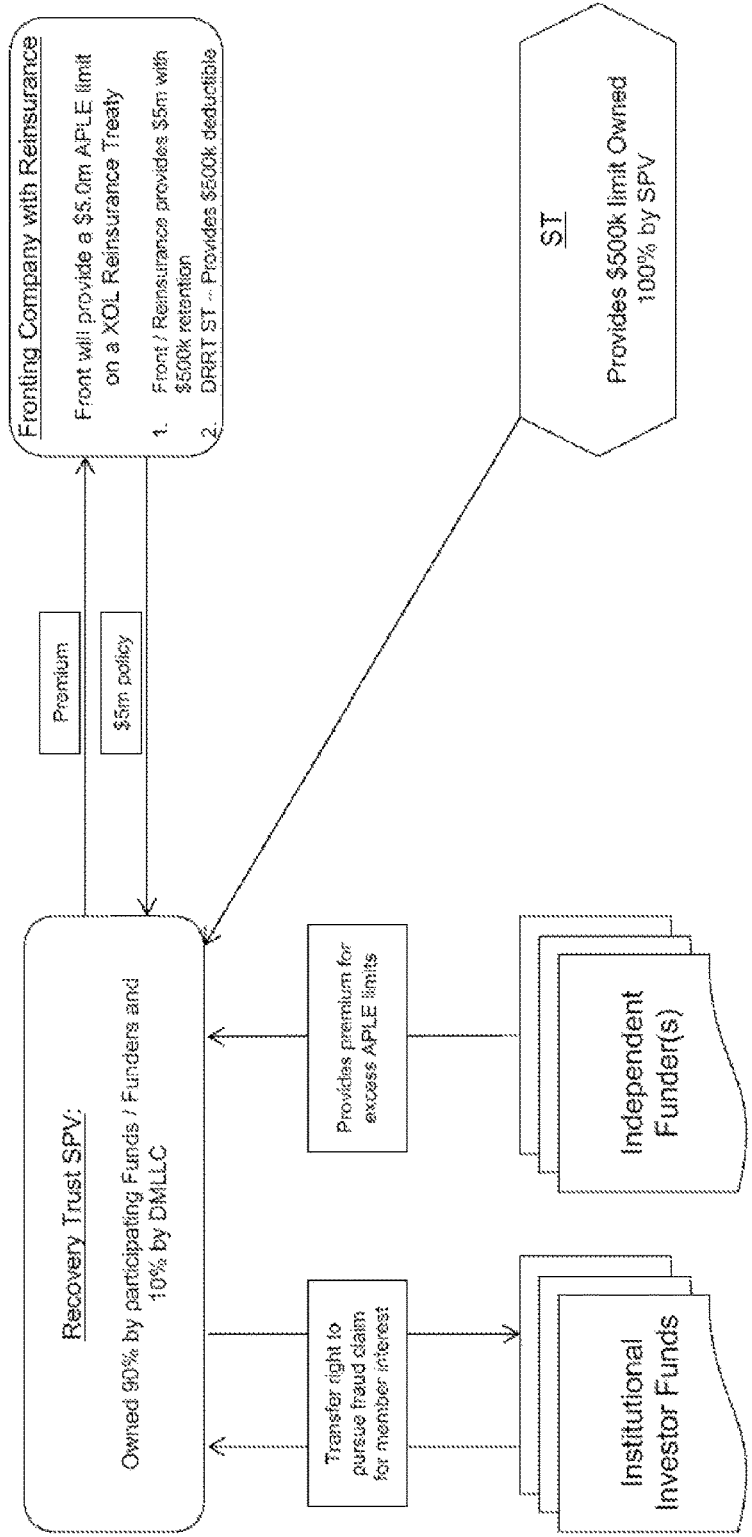
FIG. 11 depicts a direct writing large case model.

FIG. 11 depicts a large case model with a fronting carrier and reinsurance partner providing XOL of $5 m with a $500 k retention retained by the captive: RIC may also purchase a stop loss reinsurance layer in excess of the total limit to protect against an adverse verdict exceeding policy limits.

Figure 12:
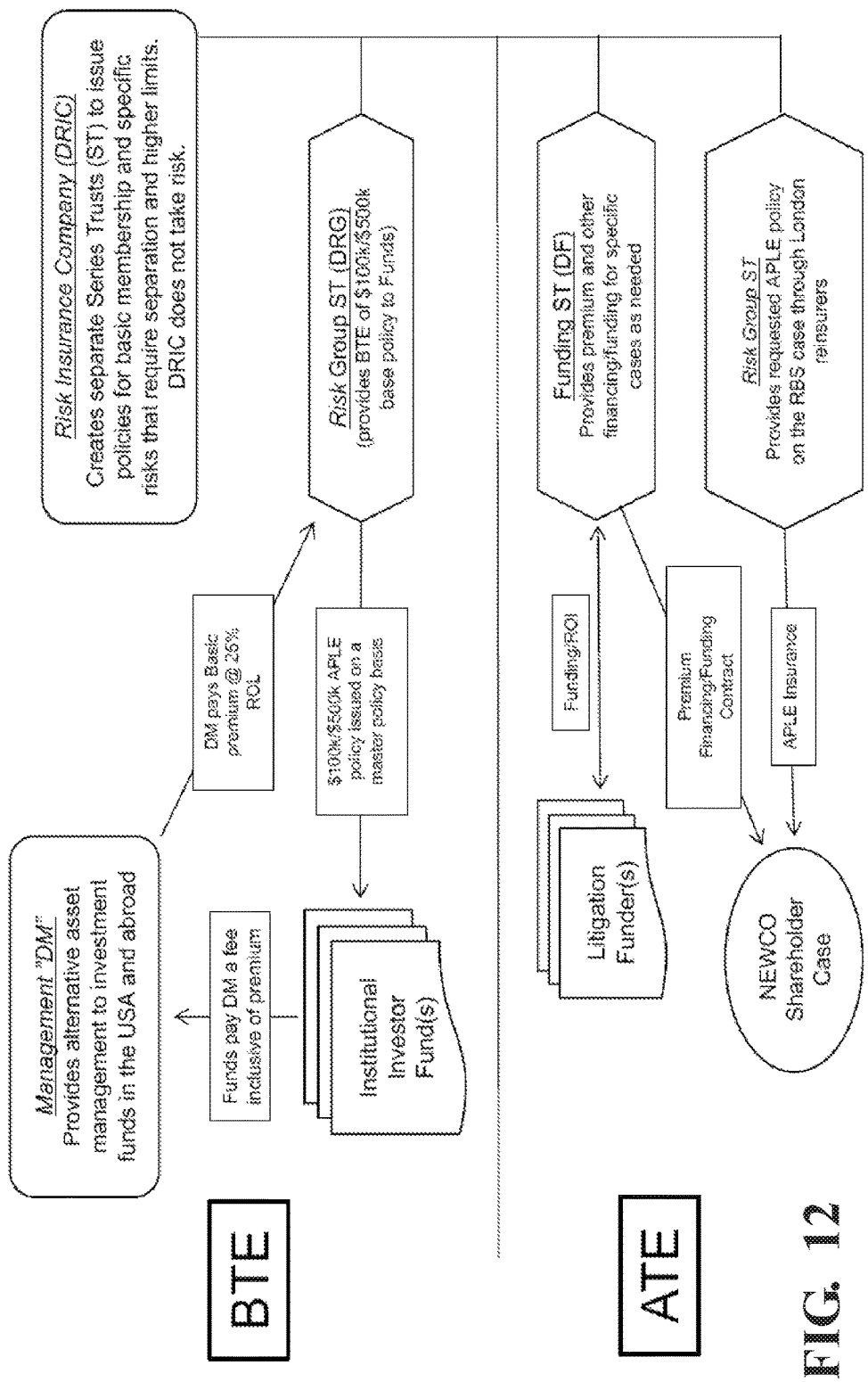
FIGS. 12-14 depict embodiments of before-the-event and after-the-event structures and relationships that may be supported by the securities claims identification, optimization and recovery system and methods.
Figure 13:
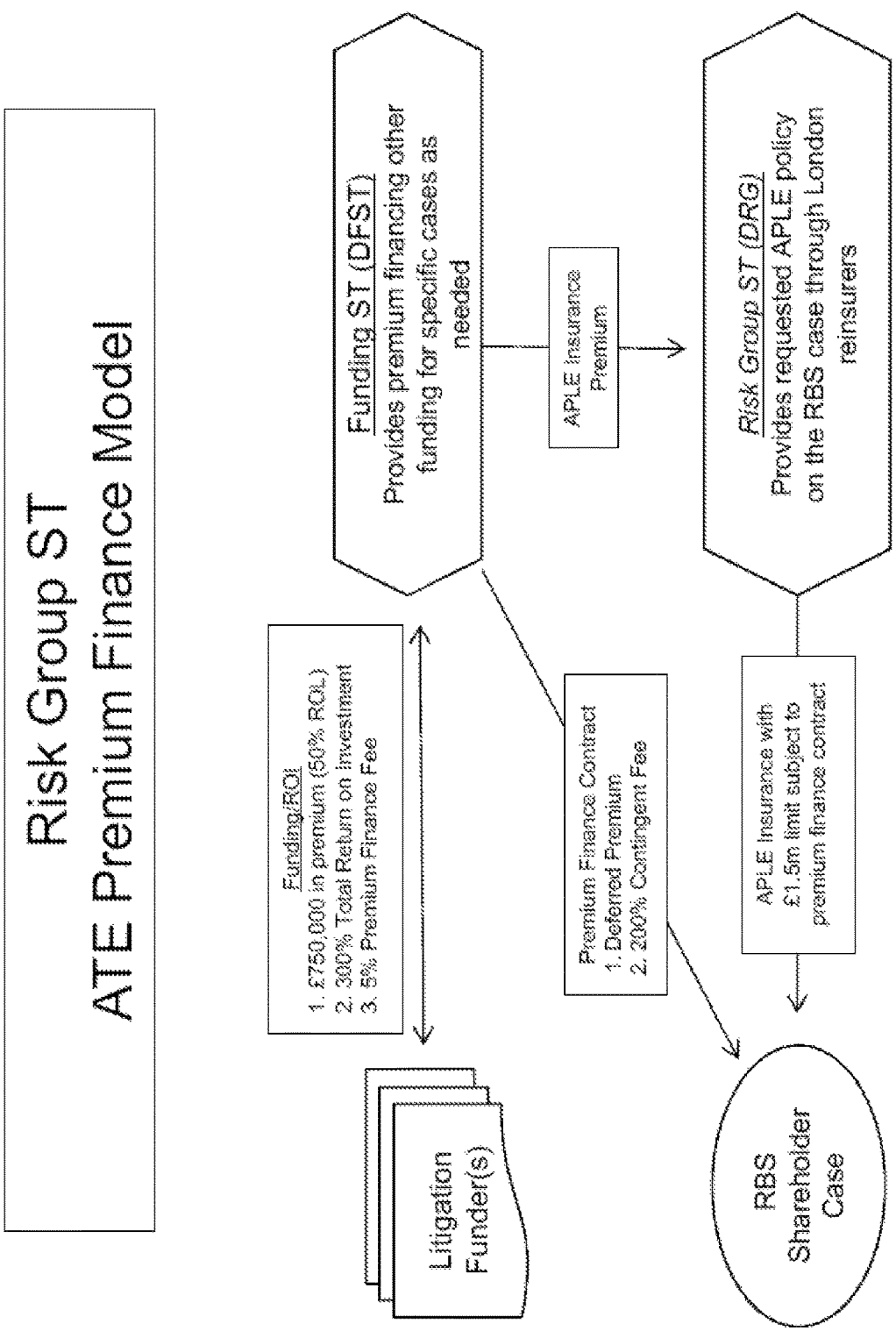
Figure 14:
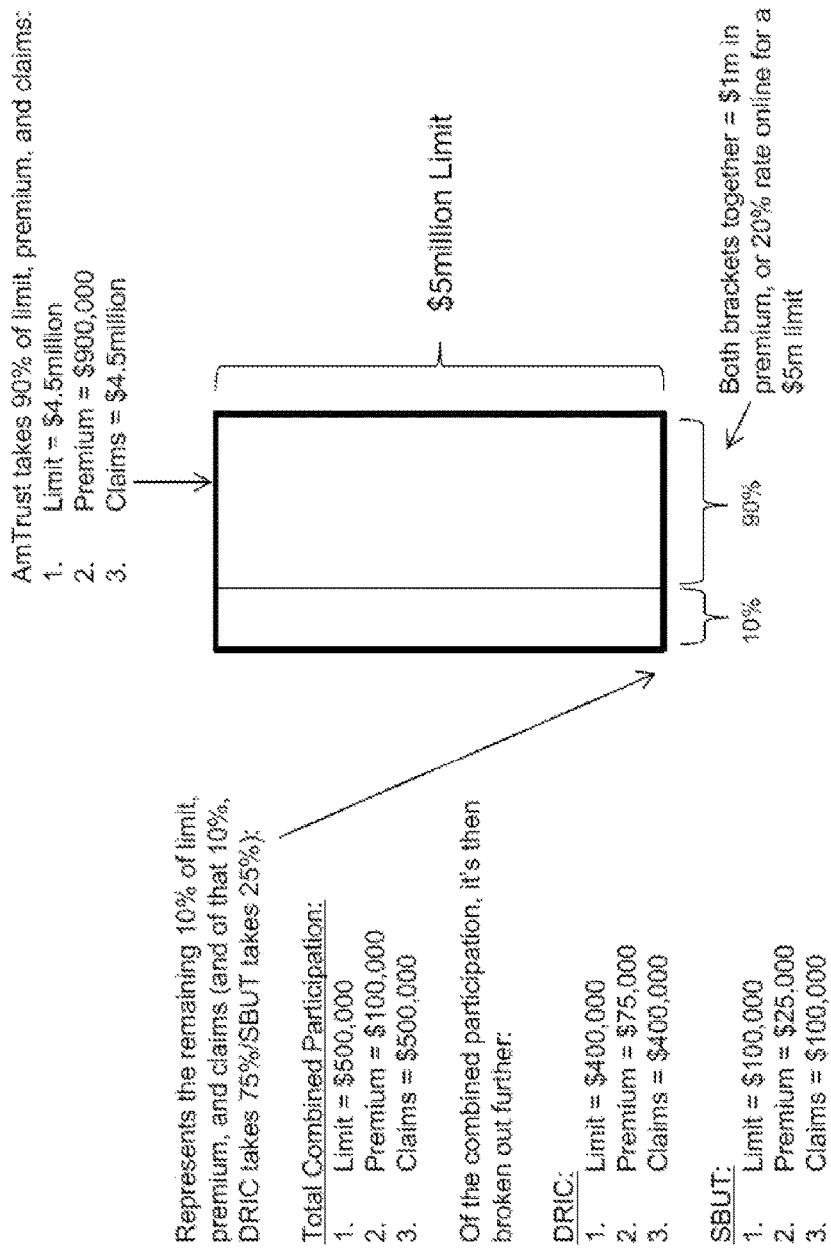
Figure 18:
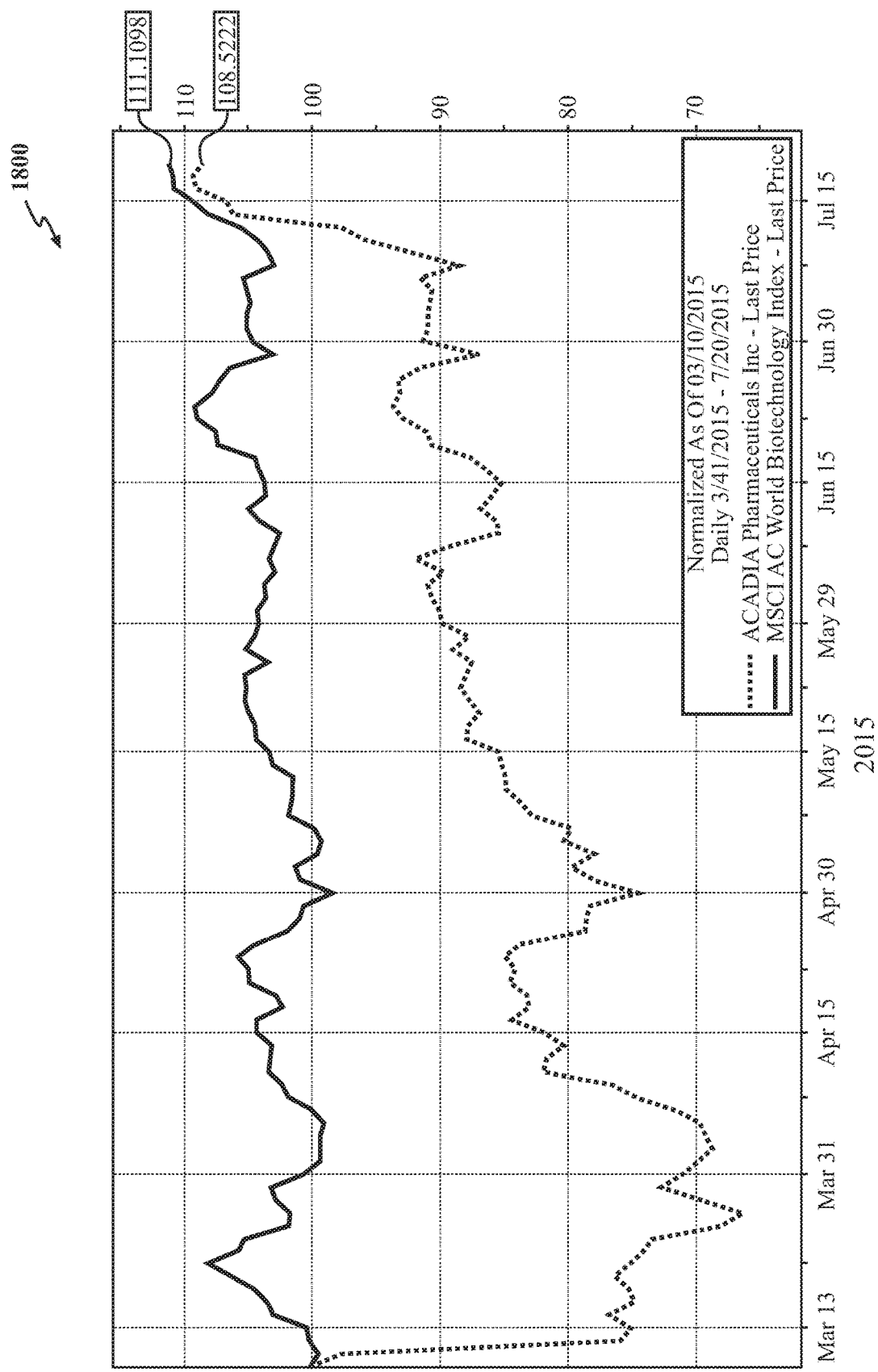
FIGS. 18-23 depict examples of stocks for which there was a recovery following a significant price drop in the stock price, and a recommendation of filing a case would be a possible outcome of analysis using the CIOR system.
Figure 19:
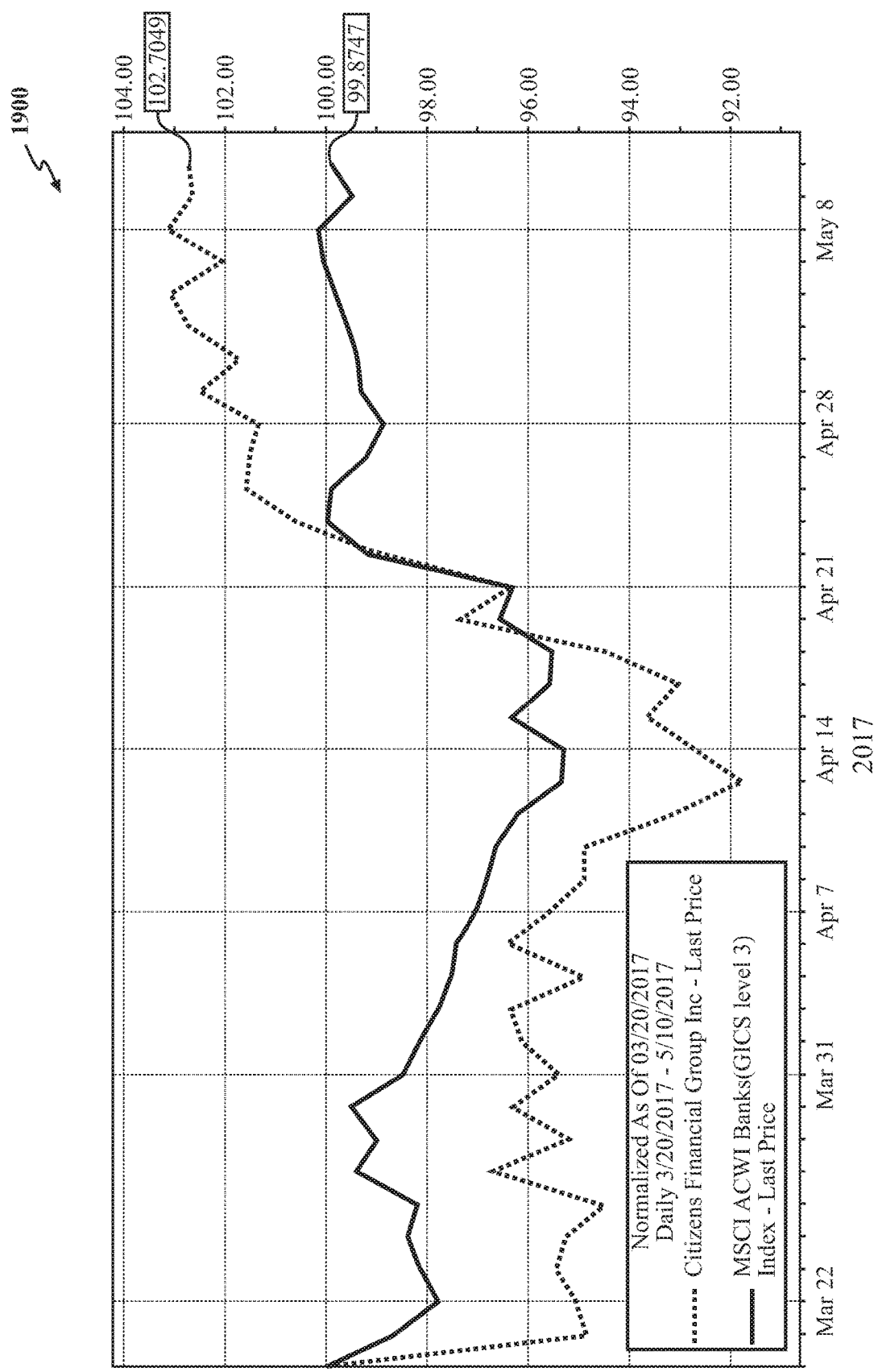
Figure 20:
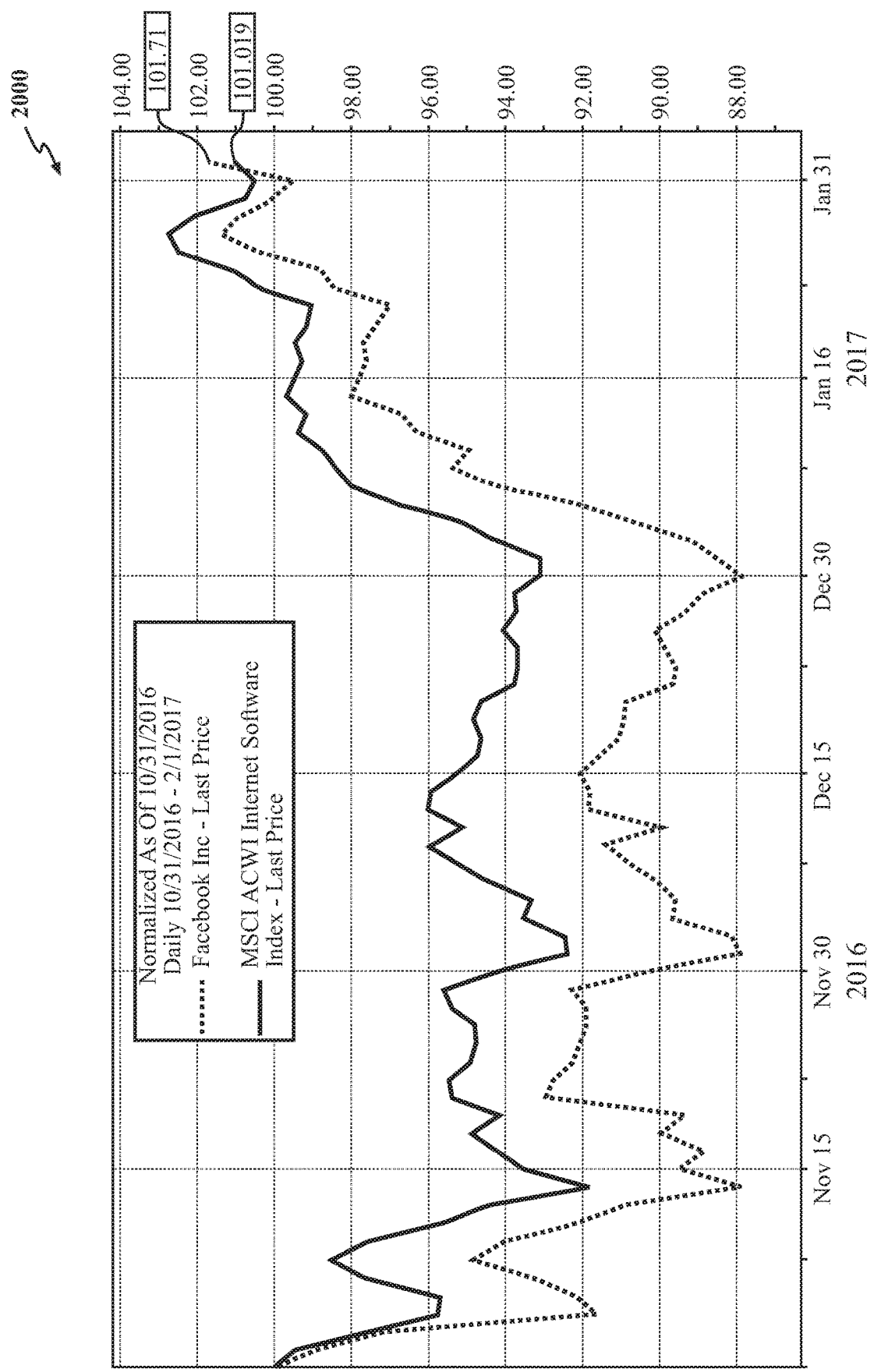
Figure 21:
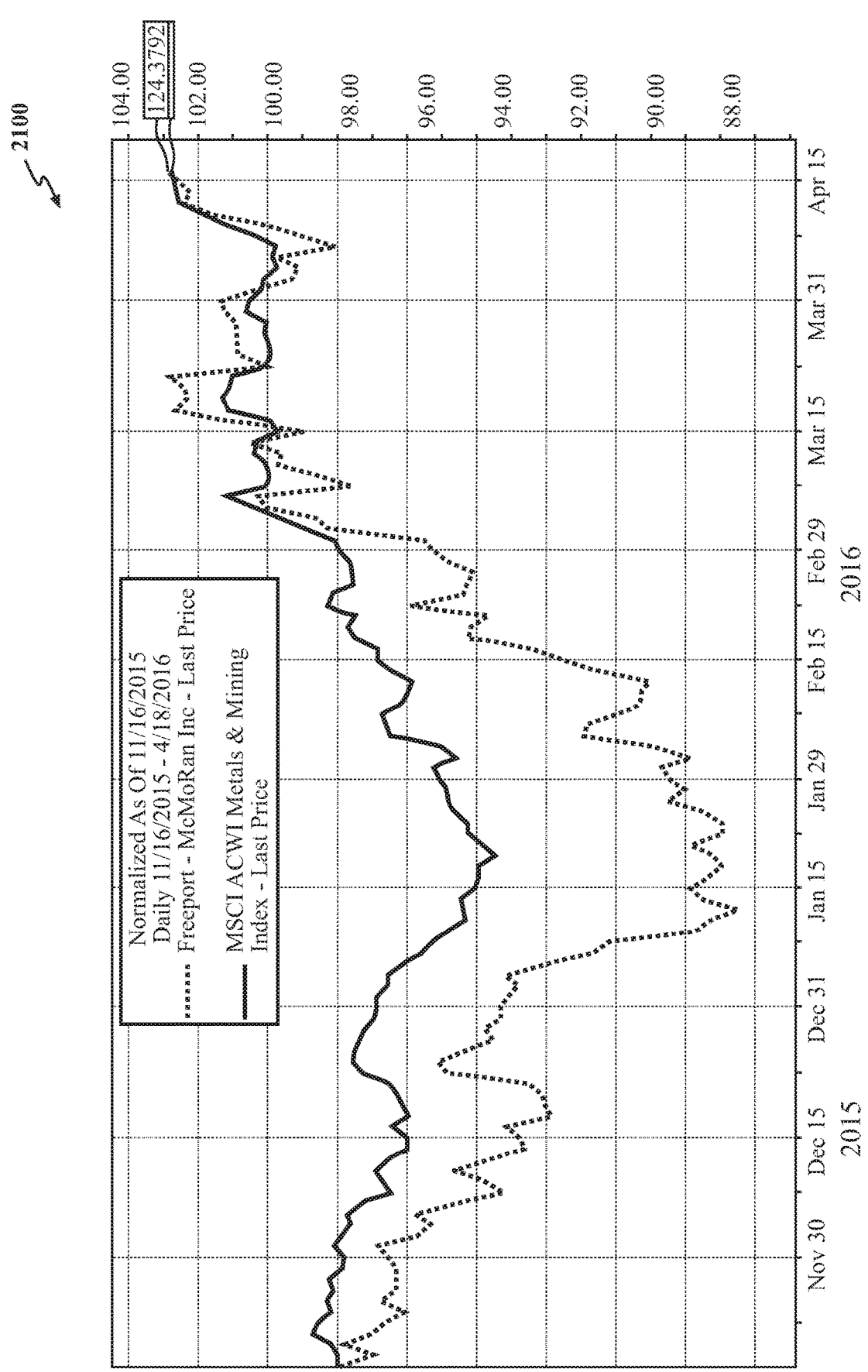
Figure 22:
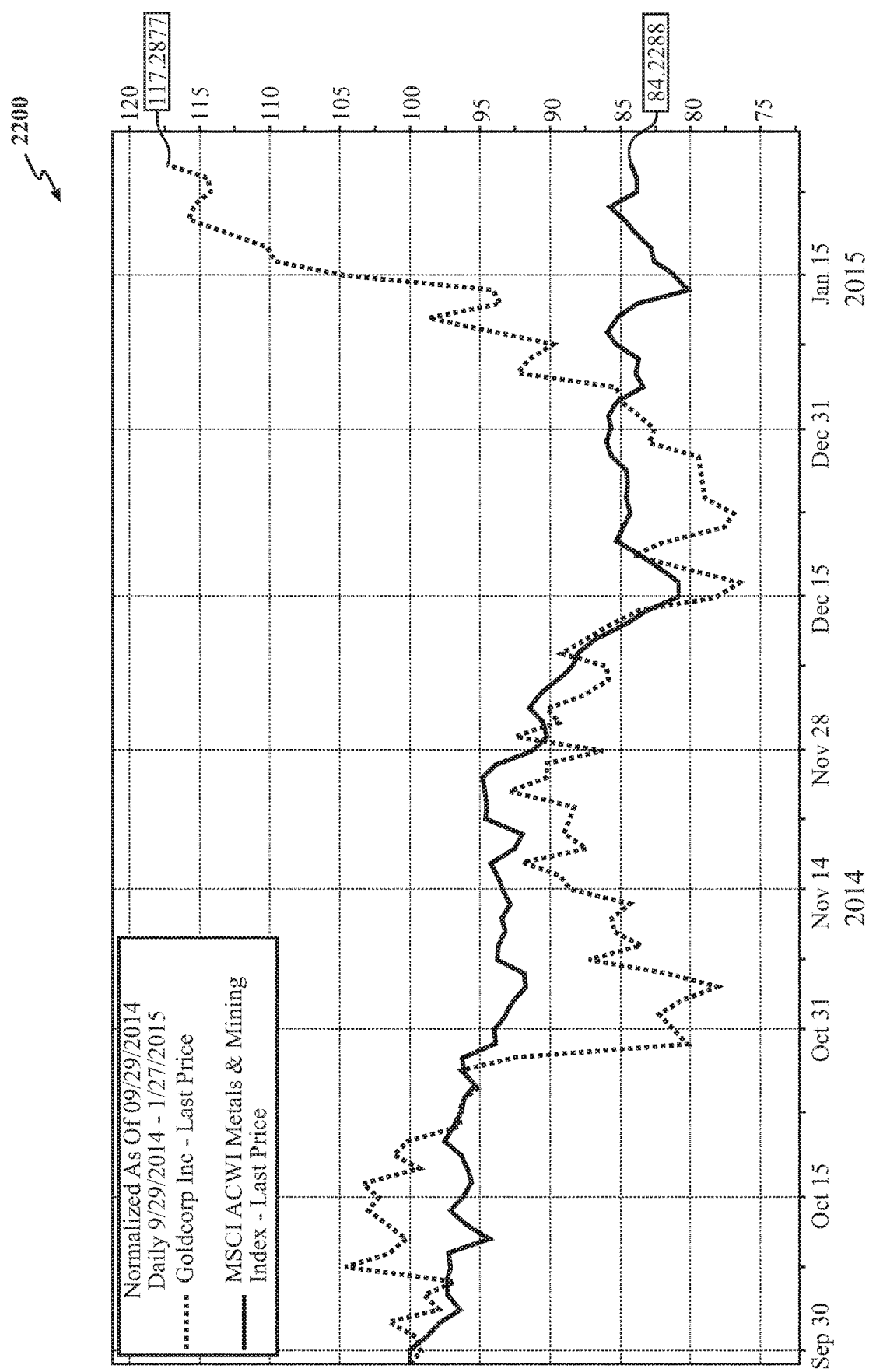
Figure 23:
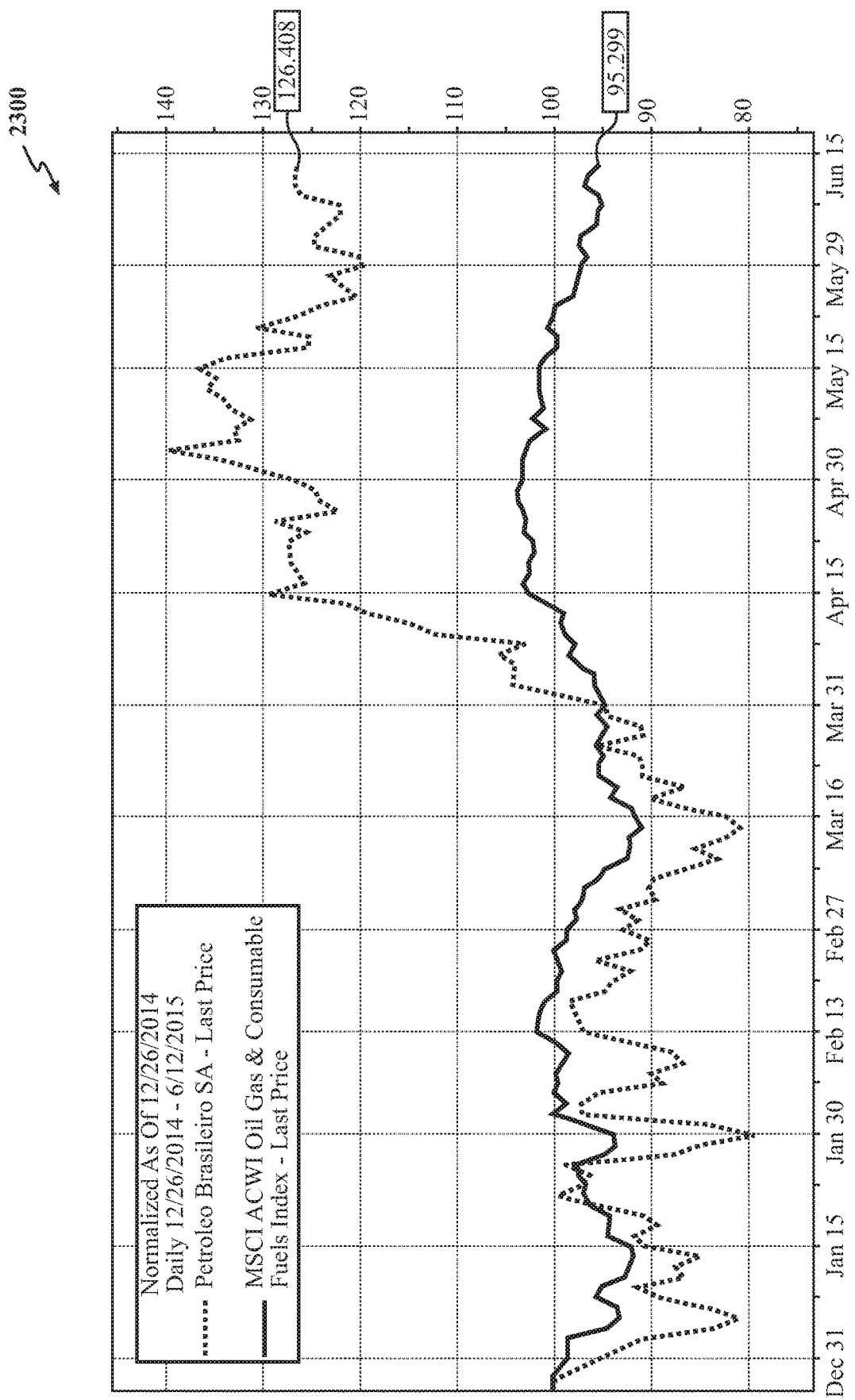
Figure 24:
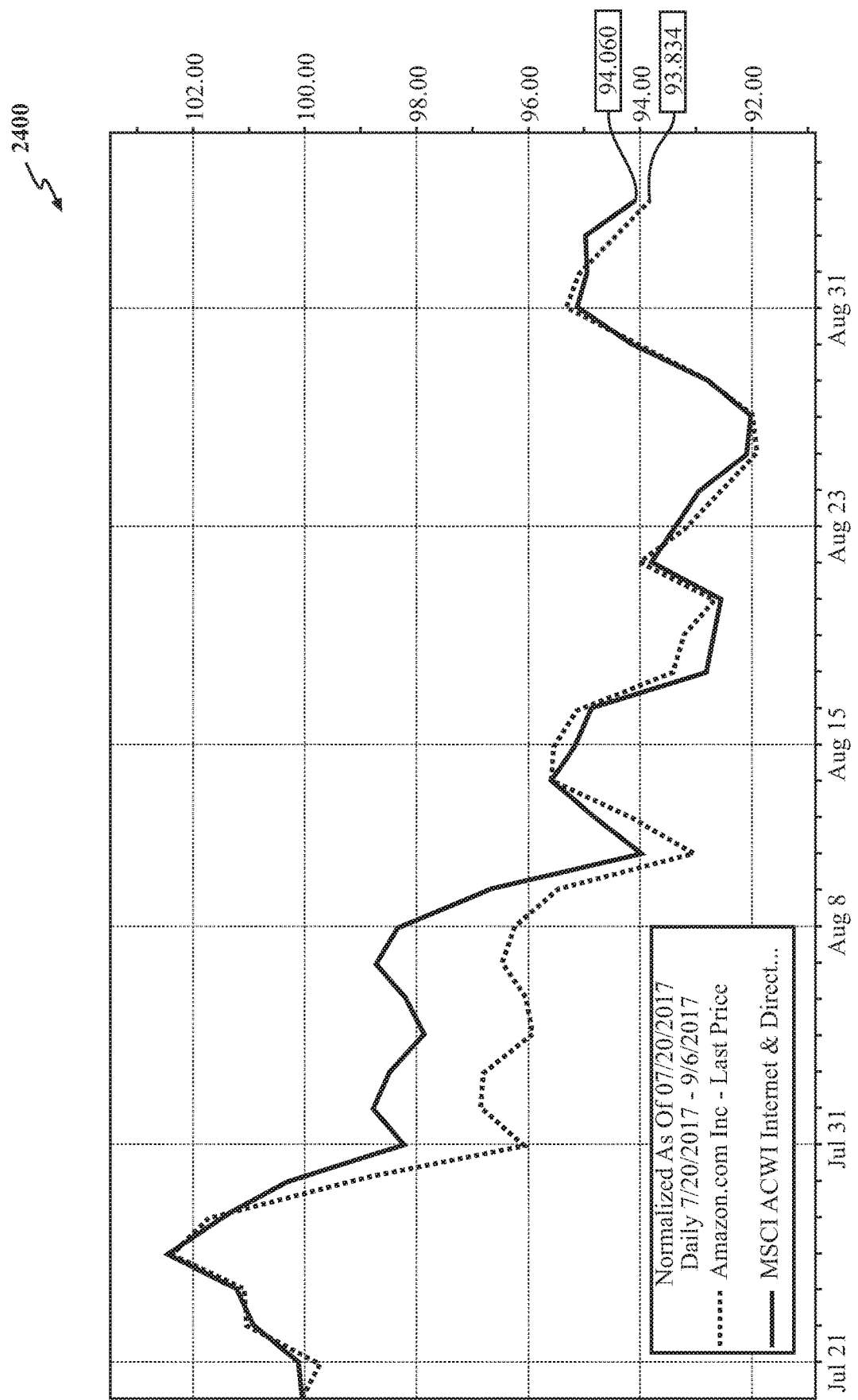
FIGS. 24-28 depict examples of stocks for which there was a recovery following a significant price drop in the stock price, and a recommendation of not filing a case would be a possible outcome of analysis using the CIOR system.
Figure 25:
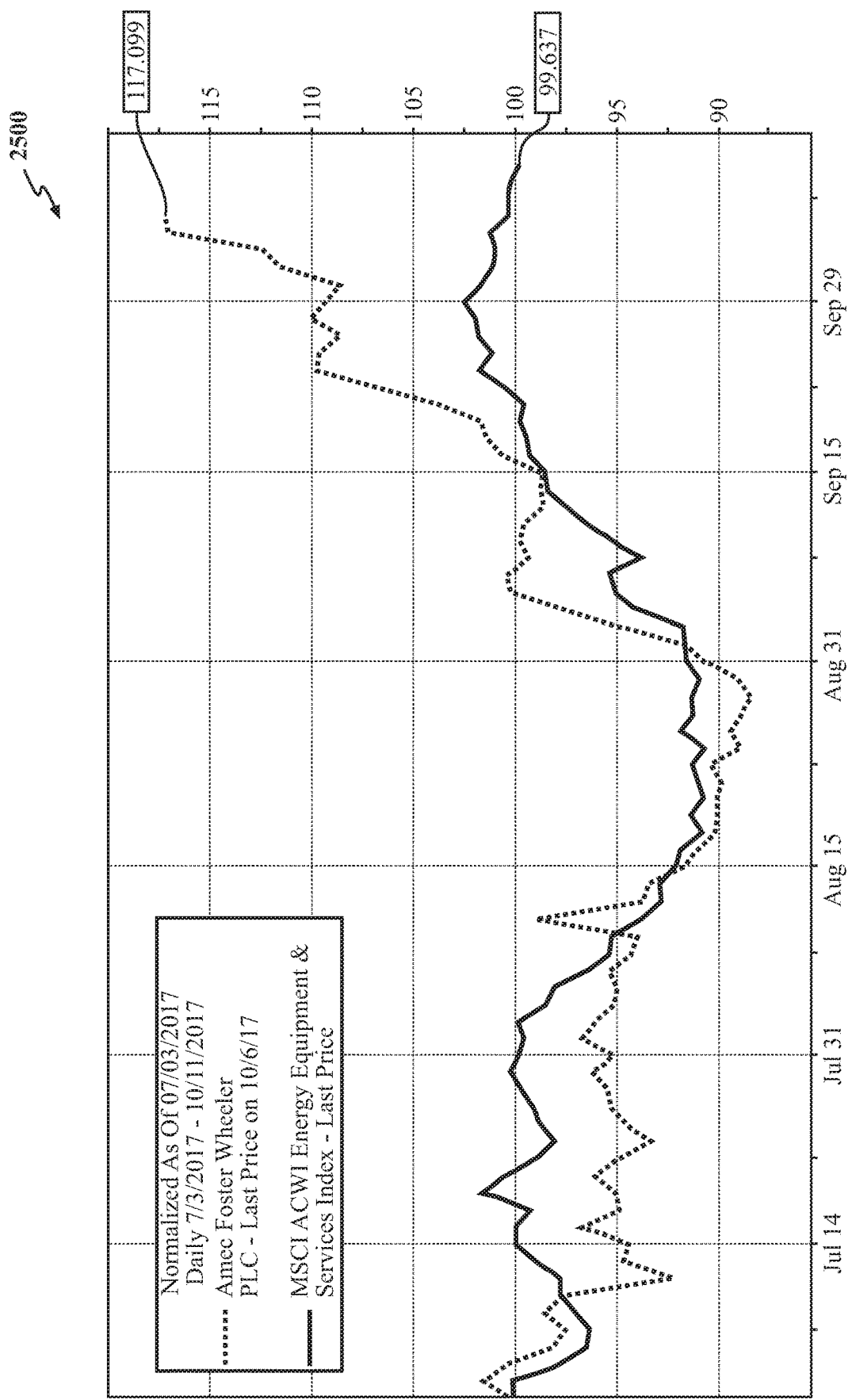
Figure 26:
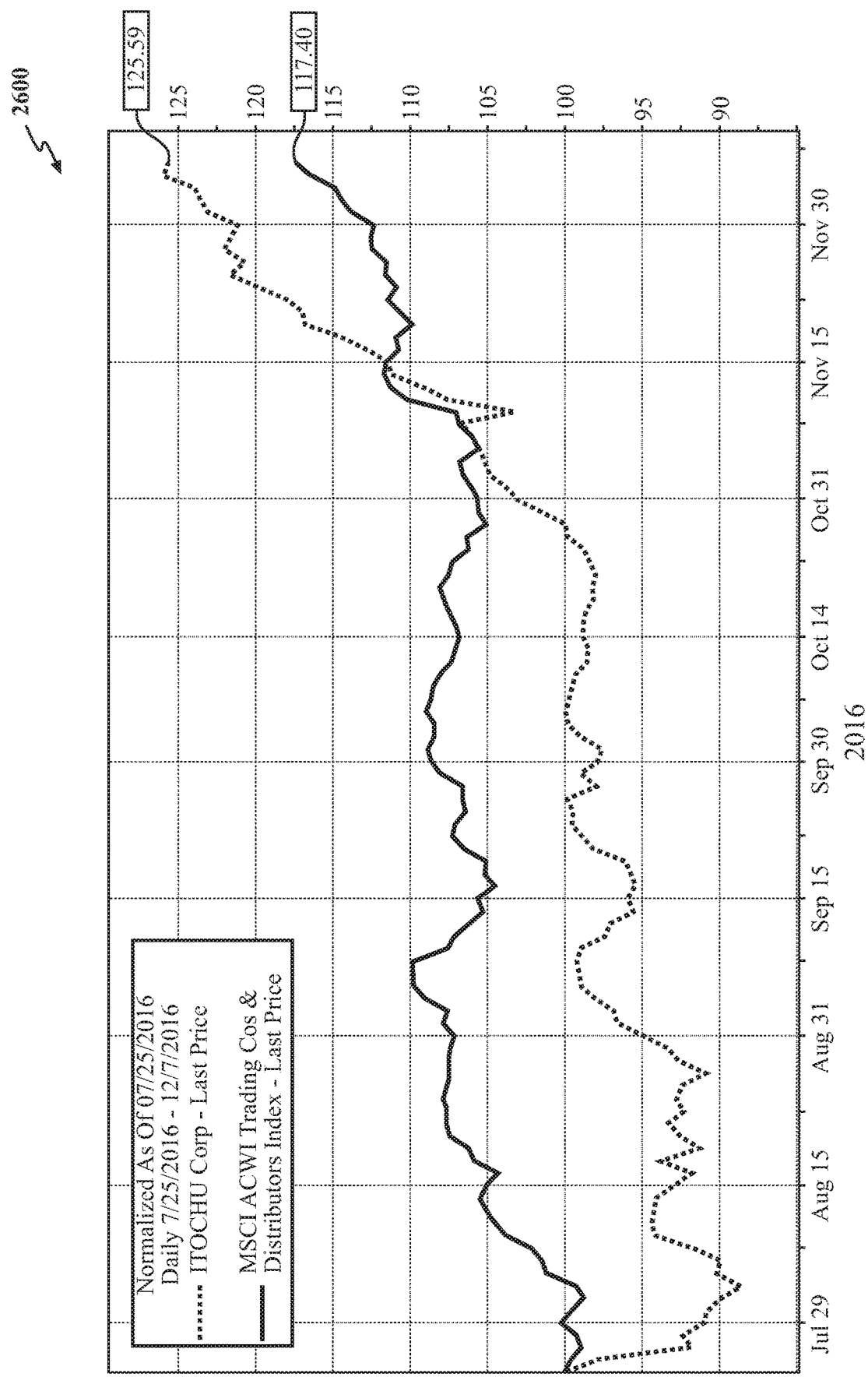
Figure 27:
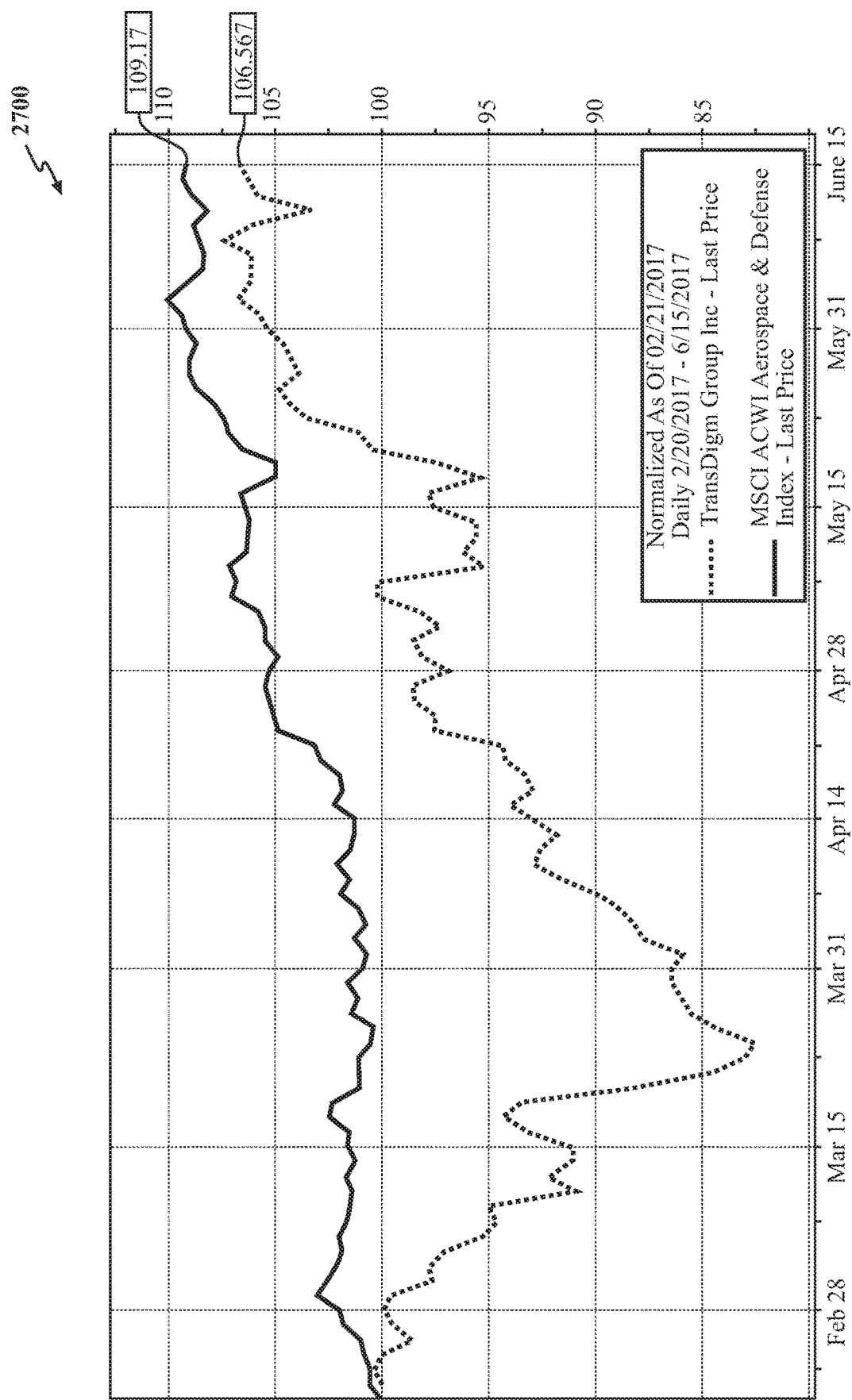
Figure 28:
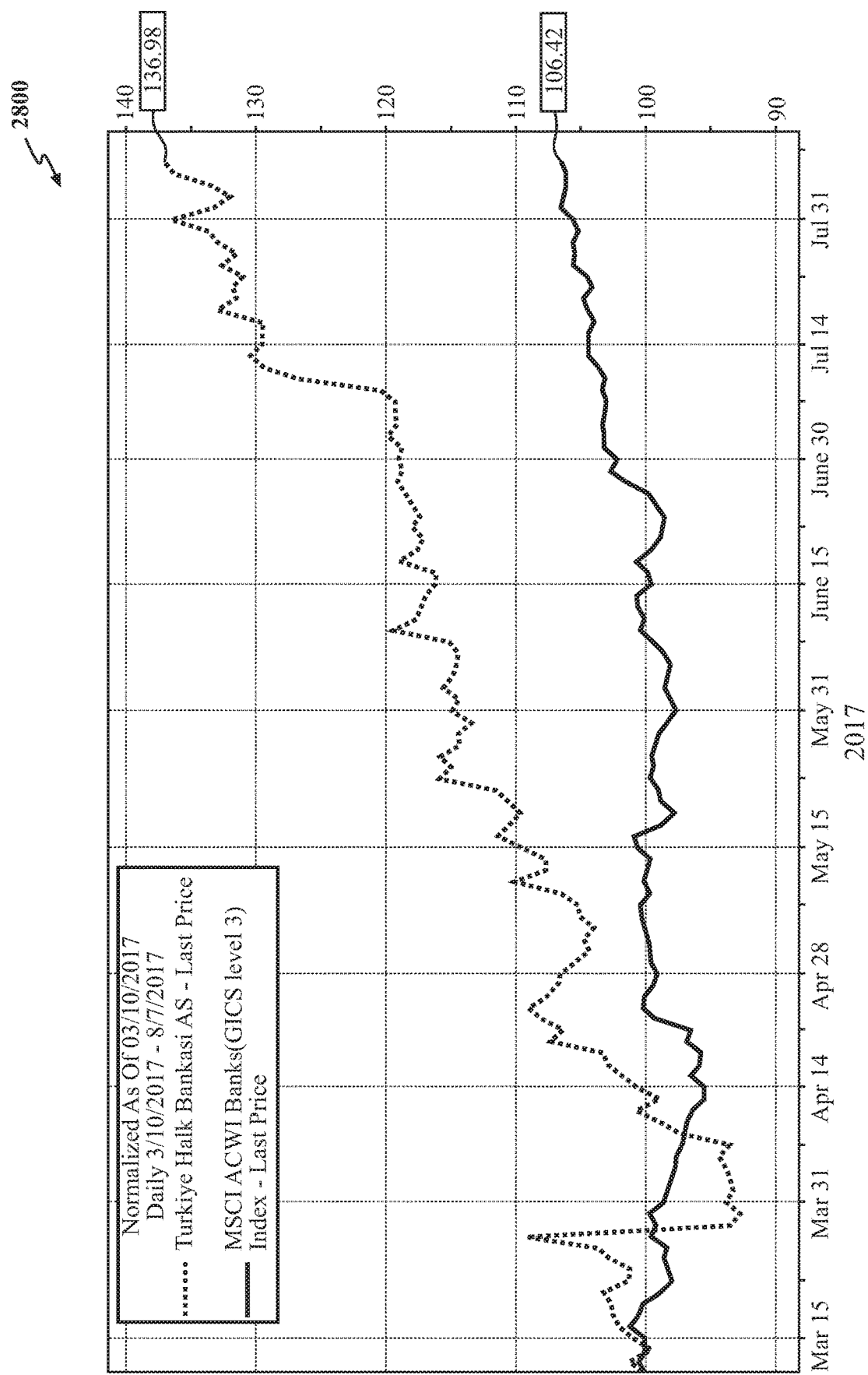
Figure 29:
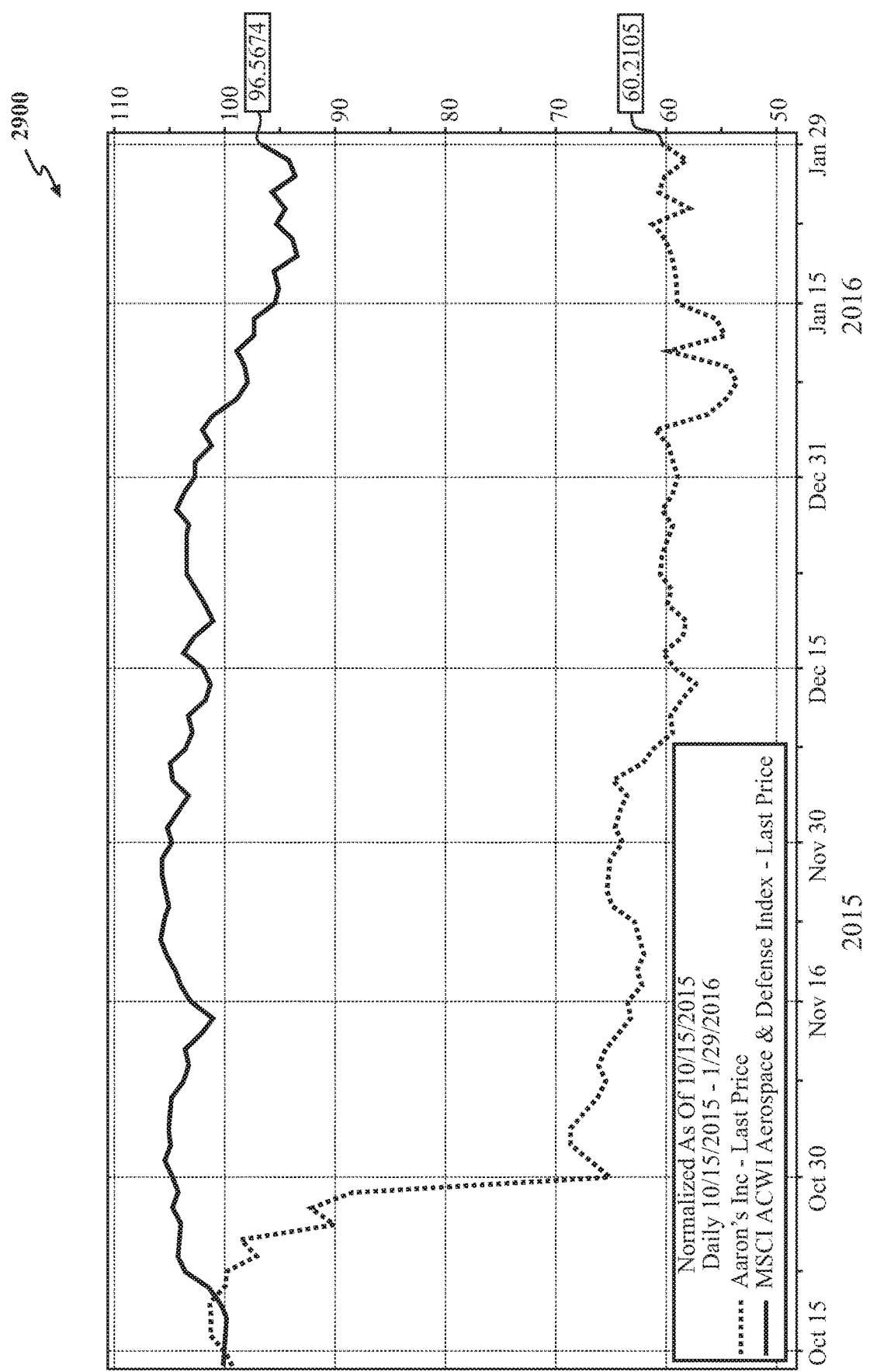
FIGS. 29-36 depict examples of stocks for which there was not a recovery following a significant price drop in the stock price, and a recommendation of filing a case would be a possible outcome of analysis using the CIOR system.
Figure 30:
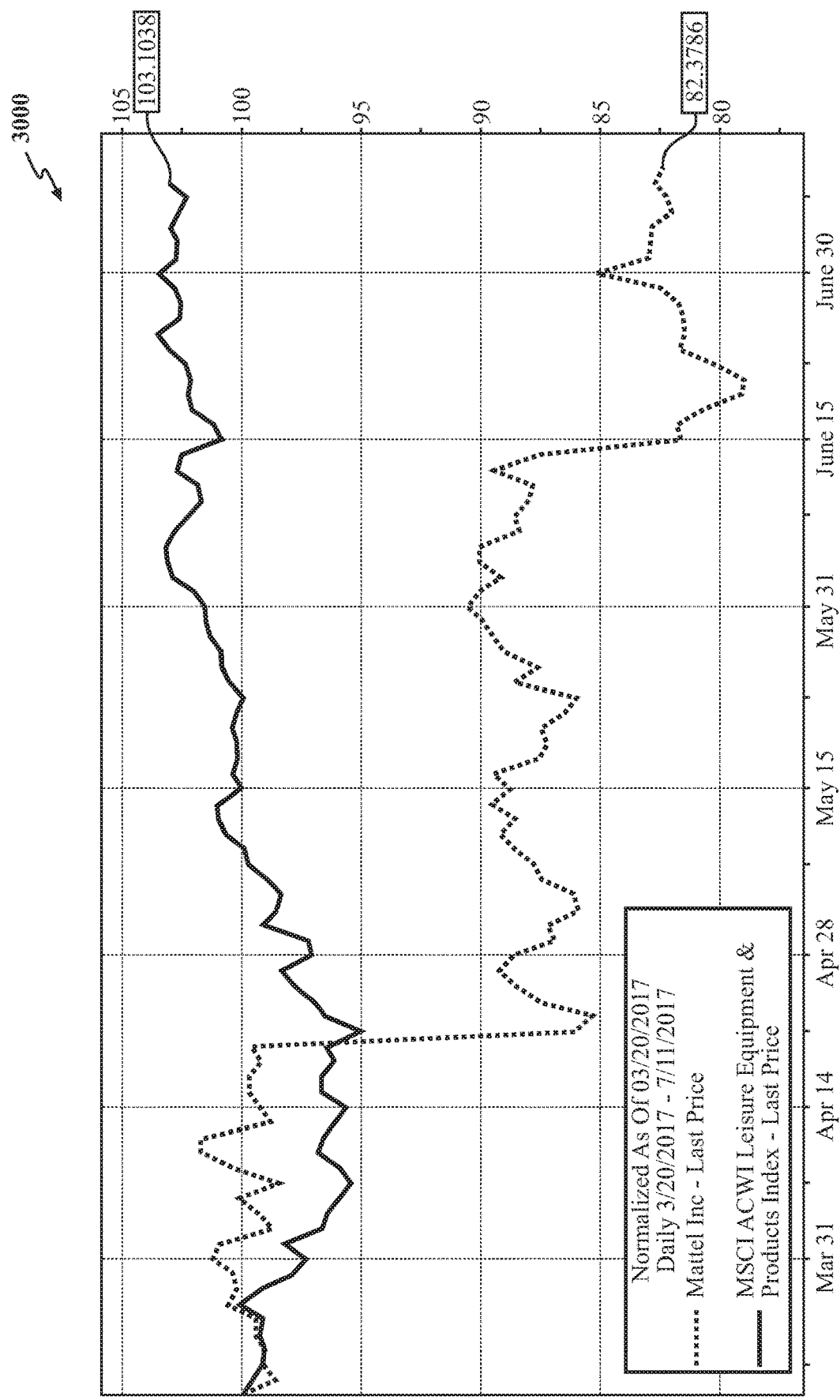
Figure 31:
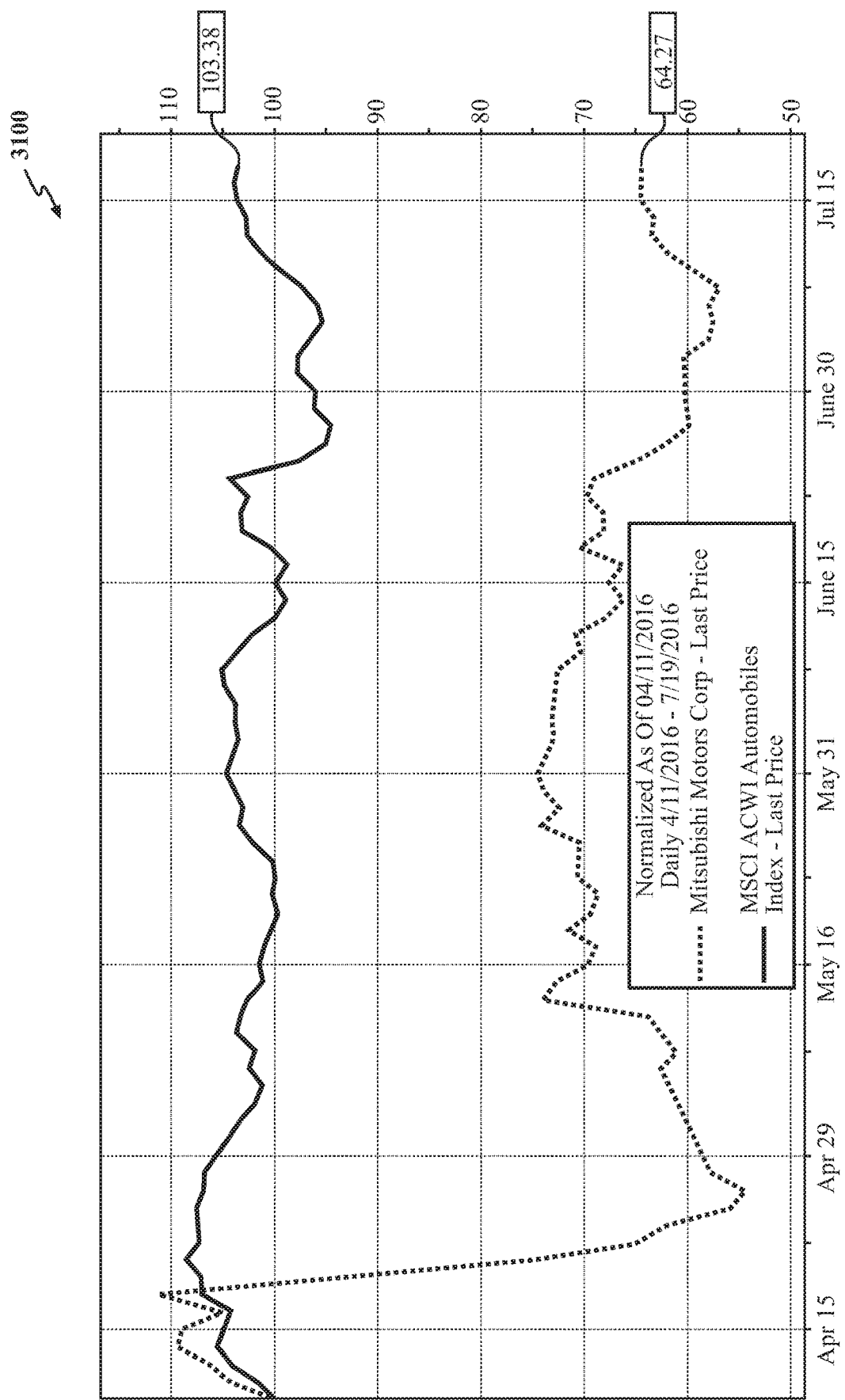
Figure 32:
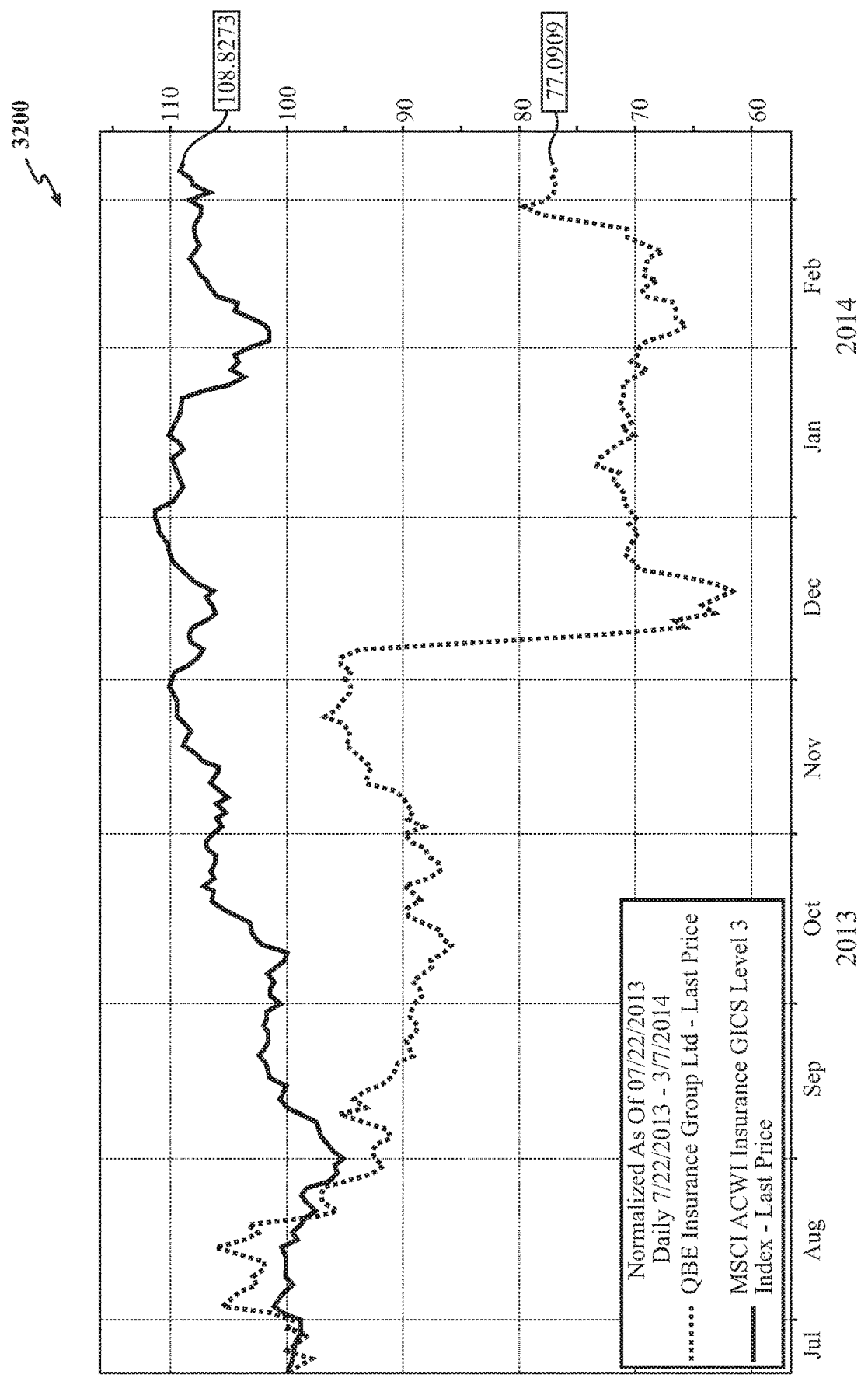
Figure 33:
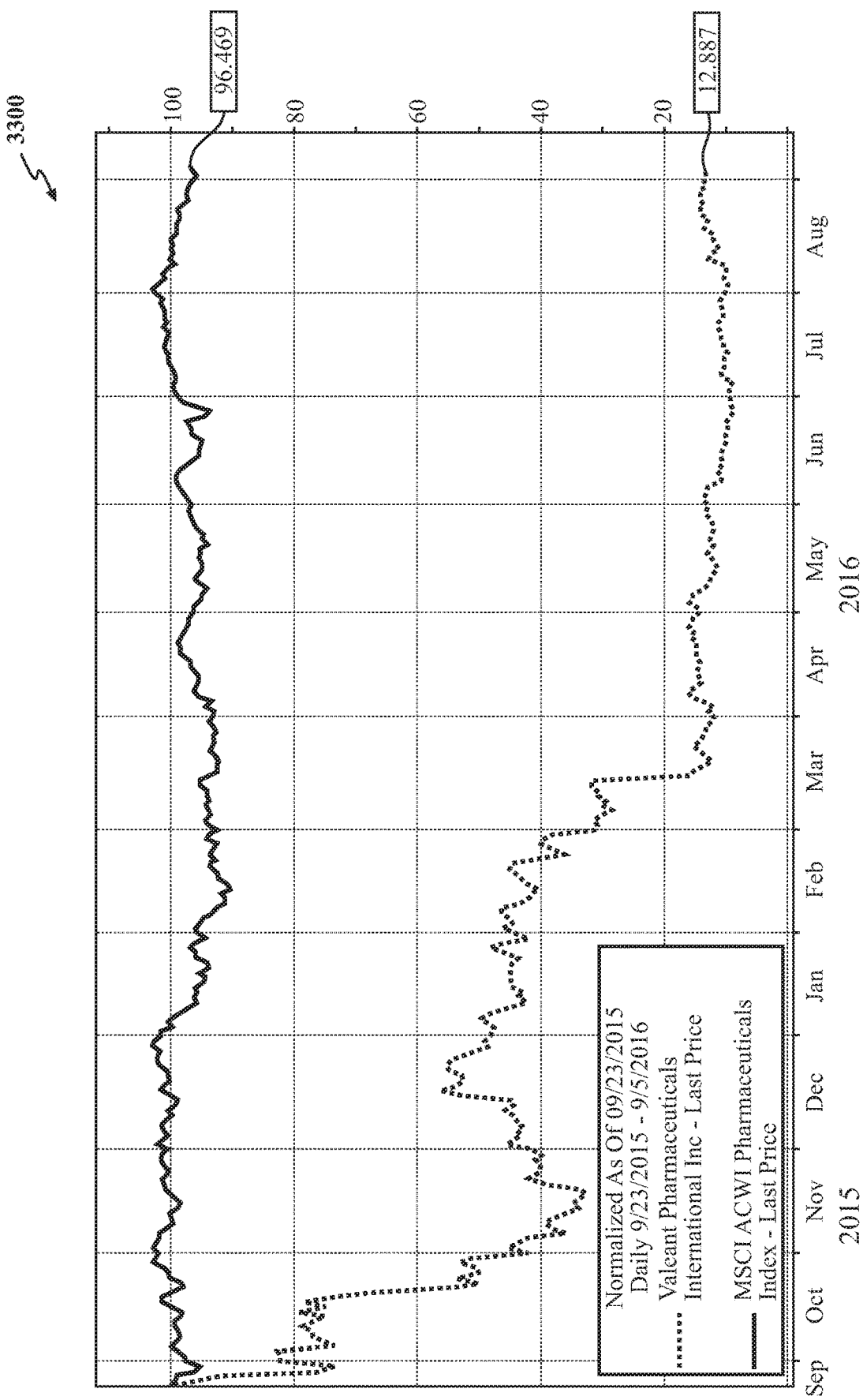
Figure 34:
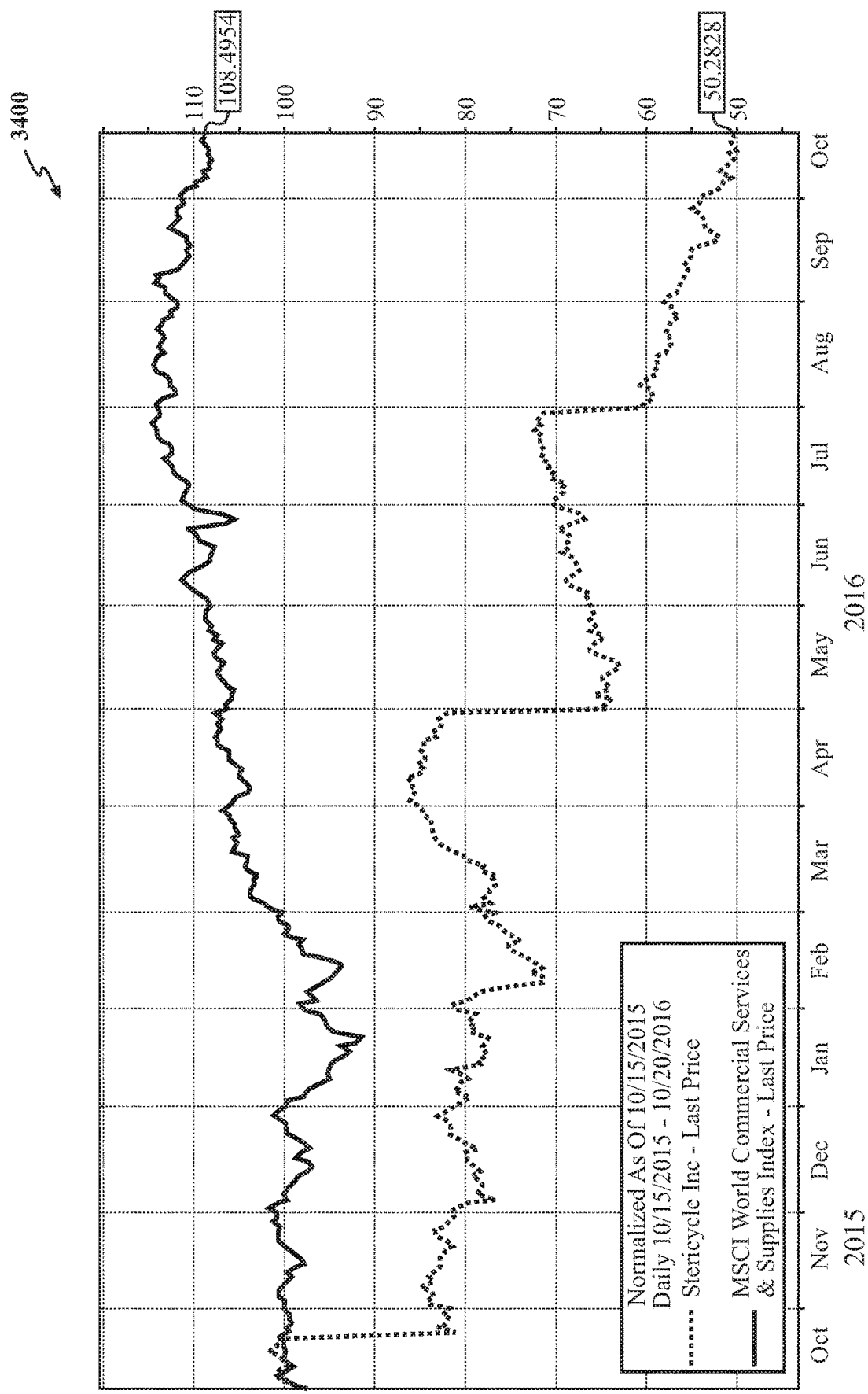
Figure 35:
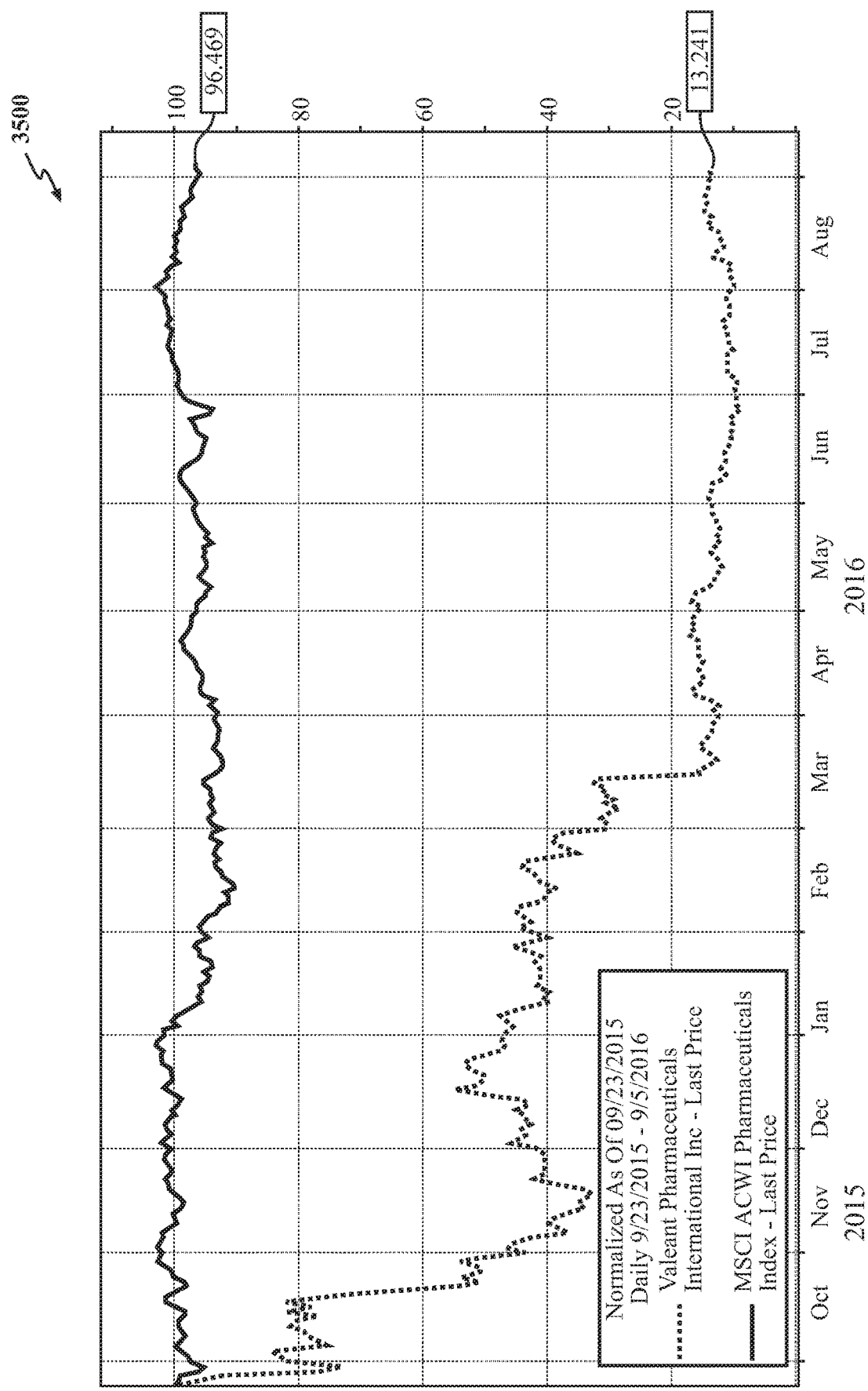

FIGS. 12-14 depict embodiments of before-the-event (BTE) and after-the-event (ATE) structures and relationships that may be supported by the CIOR, as described herein.

The methods and systems described herein may be deployed in part or in whole through a machine that executes computer software, program codes, and/or instructions on a processor. References to a "processor," "processing unit," "processing facility," "microprocessor," "co-processor" or the like are meant to also encompass more that one of such items being used together. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be or include a frequency division multiple access (FDMA) network or a code division multiple access (CDMA) network. The cellular network may include mobile devices, cell sites, base stations, repeaters, antennas, towers, and the like. The cell network may be one or more of GSM, GPRS, 3G, EVDO, mesh, or other network types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method comprising:
    creating an aggregated class action litigation claims database; wherein the aggregated class action litigation claims database comprises litigation claims data derived from a plurality of databases, and the litigation claims data describes a plurality of investors;
    creating, via a graphical user interface dashboard, a query of the aggregated class action litigation claims database for a class action claim criterion of interest, wherein the class action claim criterion of interest includes a measure of trade volatility;
    automatically repeating the query according to a schedule set by a user in the graphical user interface dashboard;
    specifying, via the graphical user interface dashboard, a query result criterion;
    generating an alert upon the occurrence of the query result criterion, wherein the alert comprises metadata relating to a nature of the query result criterion and at least one class action litigation claim to which it relates;
    transmitting the alert over a communication channel to a remote client device associated with the user based, at least in part, upon a destination address and a transmission schedule that is associated with the remote client device, wherein the alert activates the graphical user interface dashboard to cause the alert to display on the remote client device and to enable connection with the user interface dashboard when the remote client device is activated;
    generating a recommendation regarding at least one of:
        filing a new securities claim, or
        joining an existing securities claim; and
    generating a settlement analysis with respect to at least one of:
        filing the new securities claim, or
        joining the existing securities claim;
    wherein:
        the recommendation includes the settlement analysis,
        generating the settlement analysis comprises:
            generating a first settlement amount based at least in part on a first claim recovery methodology, and
            generating a second settlement amount based at least in part on a second claim recovery methodology,
        the settlement analysis includes the first and the second settlement amounts;
        the first recovery methodology is based at least in part on an aggregated basis; and
        the second recovery methodology is based at least in part on a disaggregated basis.

2. The method of claim 1, wherein the remote client device is a phone.

3. The method of claim 1, wherein the alert initiates an automated audit of at least one securities portfolio to determine the presence of an entity in the securities portfolio that is also associated with the at least one class action litigation claim.

4. The method of claim 1, wherein the aggregated class action litigation claims database includes public and private securities data sources.

5. A method comprising:
    creating an aggregated class action litigation claims database; wherein the aggregated class action litigation claims database comprises litigation claims data derived from a plurality of databases, and the litigation claims data describes a plurality of investors;
    creating, via a graphical user interface dashboard, a query of the aggregated class action litigation claims database for a class action claim criterion of interest, wherein the class action claim criterion of interest includes a measure of trade volatility corresponding to asynchronous activity, in a securities portfolio, with respect to one of a mean or median of a price change percent of a security in an industry index over a period of time;
    automatically repeating the query according to a schedule set by a user in the graphical user interface dashboard;
    specifying, via the graphical user interface dashboard, a query result criterion;
    generating an alert upon the occurrence of the query result criterion, wherein the alert comprises metadata relating to a nature of the query result criterion and at least one class action litigation claim to which it relates;
    transmitting the alert over a communication channel to a remote client device associated with the user based, at least in part, upon a destination address and a transmission schedule that is associated with the remote client device, wherein the alert activates the graphical user interface dashboard to cause the alert to display on the remote client device and to enable connection with the user interface dashboard when the remote client device is activated;
    generating a recommendation regarding at least one of:
        filing a new securities claim, or
        joining an existing securities claim; and
    generating a settlement analysis with respect to at least one of:
        filing the new securities claim, or
        joining the existing securities claim;

wherein:
the recommendation includes the settlement analysis,
generating the settlement analysis comprises:
generating a first settlement amount based at least in part on a first claim recovery methodology, and
generating a second settlement amount based at least in part on a second claim recovery methodology,
the settlement analysis includes the first and the second settlement amounts;
the first recovery methodology is based at least in part on an aggregated basis; and
the second recovery methodology is based at least in part on a disaggregated basis.

6. The method of claim 5, wherein the remote client device is a phone.

7. The method of claim 5, wherein the alert initiates an automated audit of at least one securities portfolio to determine the presence of an entity in the securities portfolio that is also associated with the at least one class action litigation claim.

8. The method of claim 5, wherein the aggregated class action litigation claims database includes public and private securities data sources.

\* \* \* \* \*